(12) United States Patent
Kelly et al.

(10) Patent No.: US 8,943,185 B2
(45) Date of Patent: Jan. 27, 2015

(54) NETWORKED GAMING SYSTEM HAVING A BROWSER MANAGER

(75) Inventors: Bryan M. Kelly, Alamo, CA (US); Pravinkumar Patel, Las Vegas, NV (US); Mettu R. Reddy, Marshfield, WI (US); Anthony E. Green, Henderson, NV (US); Robert W. Crowder, Jr., Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 190 days.

(21) Appl. No.: 13/403,818

(22) Filed: Feb. 23, 2012

(65) Prior Publication Data

US 2012/0172134 A1 Jul. 5, 2012

Related U.S. Application Data

(60) Division of application No. 12/267,477, filed on Nov. 7, 2008, now Pat. No. 8,137,200, which is a continuation-in-part of application No. 11/938,746, filed on Nov. 12, 2007, now Pat. No. 8,429,224, which is a continuation-in-part of application No. 10/751,006, filed on Dec. 31, 2003, now Pat. No. 7,762,885, which is a continuation of application No. 09/433,523, filed on Nov. 3, 1999, now Pat. No. 6,758,755, which is a continuation-in-part of application No. 09/040,654, filed on Mar. 17, 1998, now Pat. No. 6,007,426, which is a continuation of application No. 08/746,755, filed on Nov. 14, 1996, now Pat. No. 5,816,918.

(60) Provisional application No. 60/987,176, filed on Nov. 12, 2007.

(51) Int. Cl.
G06F 15/173 (2006.01)
H04L 29/06 (2006.01)
H04L 29/08 (2006.01)

(52) U.S. Cl.
CPC ............. *H04L 67/38* (2013.01); *H04L 67/12* (2013.01)
USPC ............. 709/223; 709/203; 709/217; 463/20; 463/42

(58) Field of Classification Search
USPC .......... 709/203, 217, 219, 223, 206; 715/740, 715/781; 463/1, 25, 43, 20, 40, 42
See application file for complete search history.

(56) References Cited

U.S. PATENT DOCUMENTS 5,762,552 A    6/1998  Vuong et al.
7,115,035 B2 * 10/2006 Tanaka ......................... 463/42
7,831,047 B2   11/2010 Rowe (Continued)

*Primary Examiner* — Ramy M Osman
(74) *Attorney, Agent, or Firm* — Brooke Quist; Marvin Hein

(57) ABSTRACT

An integrated browser manager and networked gaming system that provides server based dynamic content onto a content display area of one or more gaming machines is disclosed. The system includes: a browser manager, one or more application servers connected to the browser manager by a server-to-server (S2S) server and S2S web service, and one or more gaming machines are connected to the browser manager by a game-to-server (G2S) server and G2S web service. The browser manager includes a user interface application and a core service, wherein the user interface application generates a user interface display on a user control station. Each gaming machine includes a network interface to receive external content from the application server via the browser manager, and a content display area for displaying the external content.

43 Claims, 42 Drawing Sheets

(56) References Cited

U.S. PATENT DOCUMENTS

| | | | |
|---|---|---|---|
| 8,052,525 B2* | 11/2011 | Yang, II | 463/29 |
| 8,062,134 B2 | 11/2011 | Kelly et al. | |
| 8,065,394 B2* | 11/2011 | Crowder et al. | 709/219 |
| 8,171,423 B2* | 5/2012 | Olsen | 709/226 |
| 8,245,151 B2* | 8/2012 | Selig | 715/781 |
| 8,429,224 B2* | 4/2013 | Patel et al. | 709/203 |
| 8,764,566 B2* | 7/2014 | Miltenberger et al. | 463/40 |
| 2003/0008681 A1* | 1/2003 | Miethe et al. | 455/557 |
| 2003/0134678 A1* | 7/2003 | Tanaka | 463/42 |
| 2005/0166214 A1* | 7/2005 | Kaulgud et al. | 719/321 |
| 2005/0256923 A1* | 11/2005 | Adachi | 709/203 |
| 2006/0068917 A1* | 3/2006 | Snoddy et al. | 463/42 |
| 2006/0143285 A1 | 6/2006 | St-Denis | |
| 2006/0148565 A1 | 7/2006 | Gauselmann et al. | |
| 2006/0190838 A1* | 8/2006 | Nadamoto | 715/781 |
| 2006/0224963 A1* | 10/2006 | Katsuranis et al. | 715/728 |
| 2006/0287054 A1* | 12/2006 | Walker et al. | 463/17 |
| 2007/0077995 A1 | 4/2007 | Oak et al. | |
| 2007/0079252 A1* | 4/2007 | Ramnani | 715/781 |
| 2007/0101282 A1* | 5/2007 | Goossen et al. | 715/764 |
| 2007/0202955 A1* | 8/2007 | Frerking et al. | 463/42 |
| 2008/0058105 A1 | 3/2008 | Combs et al. | |
| 2008/0274785 A1* | 11/2008 | Byng et al. | 463/20 |
| 2009/0062014 A1* | 3/2009 | Gift et al. | 463/42 |
| 2009/0082109 A1 | 3/2009 | Sepich et al. | |
| 2009/0104954 A1* | 4/2009 | Weber et al. | 463/1 |
| 2009/0104965 A1* | 4/2009 | House et al. | 463/20 |
| 2009/0156282 A1 | 6/2009 | Mak | |
| 2009/0156303 A1* | 6/2009 | Kiely et al. | 463/29 |
| 2009/0305789 A1 | 12/2009 | Patil | |
| 2010/0041470 A1* | 2/2010 | Preisach | 463/25 |
| 2010/0085983 A1 | 4/2010 | Antonucci | |
| 2010/0169791 A1* | 7/2010 | Pering et al. | 715/740 |
| 2010/0325577 A1* | 12/2010 | Olsen | 715/792 |
| 2011/0029609 A1 | 2/2011 | Kavallierou et al. | |

* cited by examiner

NETWORKED GAMING SYSTEM HAVING A BROWSER MANAGER

CROSS-REFERENCE TO RELATED APPLICATIONS

This application is a divisional of U.S. patent application Ser. No. 12/267,477, filed Nov. 7, 2008, is a continuation-in-part of U.S. patent application Ser. No. 11/938,746 filed Nov. 12, 2007, which is a continuation-in-part of U.S. patent application Ser. No. 10/751,006 filed Dec. 31, 2003, which is a continuation of U.S. patent application Ser. No. 09/433,523 filed Nov. 3, 1999, now U.S. Pat. No. 6,758,755 issued Jul. 6, 2004, which is a continuation-in-part of U.S. patent application Ser. No. 09/040,654 filed Mar. 17, 1998, now U.S. Pat. No. 6,007,426 issued Dec. 28, 1999, which is a continuation of U.S. patent application Ser. No. 08/746,755 filed Nov. 14, 1996, now U.S. Pat. No. 5,816,918 issued Oct. 6, 1998, all of which are hereby incorporated by reference herein in their entirety. U.S. patent application Ser. No. 12/267,477 claims the benefit of U.S. Provisional Patent Application No. 60/987, 176 filed Nov. 12, 2007 and is with U.S. patent application Ser. No. 12/267,452, filed Nov. 7, 2008, now U.S. Pat. No. 8,062,134, issued Nov. 22, 2011.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

These disclosed embodiments pertain generally to gaming systems and methods. More particularly, the disclosed embodiments relate to a browser method and system for managing, monitoring, controlling, and modifying game- or gaming-related activities.

BACKGROUND

For some time, casino kiosks have been used to bring server-based content to users. Additionally, games on browsers have been utilized in the online and arcade markets. U.S. Pat. No. 5,816,918 by Kelly, entitled Prize Redemption System For Games, discloses a browser on a pay to play gaming machine for use in both arcades and casinos. Moreover, U.S. Pat. No. 6,645,068 by Kelly, entitled Profile Driven Network Game And Prize Redemption System, discloses further enablement of games and advertising for browser based gaming devices.

SUMMARY

Briefly, and in general terms, disclosed herein are systems and methods for providing one or more gaming machines having a primary display and a secondary display, as well as a Browser Manager operating system and method. A Browser Manager server is able to initialize and configure one or more browser windows on a gaming device display screen. The Browser Manager has the ability to configure specific URLs for each browser window, configure and Z-order depth for each window, set window size and position, and call functions on the browser pages. A browser client side application on a gaming device is capable of creating multiple windows on an electronic gaming device and responding to said server configuration or browser message commands.

Typically, the primary display is used to present the primary game of the machine, while the secondary display is used to present other applications including, by way of example only, and not by way of limitation: (1) pay-tables related to the primary game; (2) other games, such as bingo, keno, or sports book; (3) group play or group bonus games; (4) web pages, animation and graphics; and (5) player statistics and game statistics.

Other content may be provided by a central server, such as entertainment content in which the secondary display hosts a browser linked to the central server. All of these applications may be displayed and accessed from a single display using multi-sessions browser technology.

In one embodiment, the gaming machine is transformed into a multi-application device capable of playing a primary game, while multiple secondary games may be accessed and played on the secondary display. In one particular non-limiting embodiment, the primary game is a video poker game, while the secondary playable application is live bingo connected to the casino's bingo room. In another embodiment, the secondary display is used to present video or audio feeds of the bingo room. In addition, the player preferably is able to use his existing credits on the primary game to place wagers on the secondary game. In this regard, the player may use his player card to gain (previously authorized) access to the secondary game.

This embodiment provides the player with more play and gambling options without having to leave the gaming machine, which is turn translates into increased revenues for the casino. Such an embodiment also provides the platform configuration to transform a gaming machine into a full multi-media device.

In one embodiment, a Browser Manager operating system and method for use with game devices, systems, and methods is disclosed that enables users to perform browser activities from a gaming machine. In such embodiments, a system and method are described that include the downloading, packaging, and presenting server-side content, including third party application content, to the gaming machine, and specifically to its secondary display. One embodiment of the Browser Manager operating system includes two main modules or components: a Browser Manager and a Transaction Manager.

In an aspect of one embodiment, the Browser Manager communicates with the game provider on one hand to receive and package content, and communicates with the electronic gaming machine on the other hand to display this content and interact with the player through the browser window. By way of example only, and not by way of limitation, major functions of the Browser Manager include: (1) establishing a direct link to the electronic gaming machine; (2) establishing a direct link with the game provider to securely download content; (3) receiving and packaging the content; (4) transmitting the content to the secondary display or providing a URL to the content; (5) managing the browser layouts and active sessions; and (6) accepting wagers from the player and confirming wagers to the player.

In another aspect of one embodiment, the Transaction Manager functions as a mediator and negotiator between the application/game provider and the electronic gaming machine. The Transaction Manager may also acts as a banker in order to facilitate the placement, acceptance and disposition of wagers. By way of example only, and not by way of limitation, major functions of the Transaction Manager include: (1) enabling a service discovery method (SDM) that detects the presence of playable games in the casino; (2) enabling a registration method that allows the game provider to enroll with Transaction Manager; (3) enabling a registration method that allows the electronic gaming machine to enroll with the Transaction Manager; (4) interpreting the services and parameters of the game provided; (5) authorizing the player to place wagers based on player's permissions (using player-tracking system); (6) accepting wagers by negotiating with the game provider; (7) confirming wagers by printing a receipt at the gaming machine; (8) enabling disposition of the bet by confirming the win or loss through a cashier or cash-out booth; (9) mediating with the Browser Manager to authorize content from the game provider; and (10) logging all transactions.

In one embodiment involving a player at an electronic game machine, when the player inserts his player card, the Transaction Manager determines which applications the player is permitted to see. In this regard, the screen may be physically organized accordingly, and the content may be distributed to each player and session by the Browser Manager.

In another aspect of one embodiment, the permissions to access the different games or applications are based on the player's preferences or on prior authorization obtained from a casino game host. When the player selects a certain session, the application in that session may be brought to the foreground in a ready state. Thus, some embodiments may have multiple active sessions; therefore, the player can potentially play multiple games or browse multiple applications. However, if a certain application has not been played for a certain period of time, the session may become inactive and the application dropped. In some embodiments, the player may be able to re-activate the application by pushing an "enroll" or "log in" button.

For example, in one specific, non-limiting embodiment, a player engages in a game of video poker using the primary display. If the player is authorized to access tournament games, bingo, keno, and sports wagering, the display shows four different sessions hosting each of the different applications represented by four tabs at the bottom of the screen, which are labeled Tournament, Bingo, Keno, Sports, thus allowing the player to switch between the sessions and place wagers.

In another embodiment that implements a standard casino game (e.g., video poker, slots, and the like), a player is able to play the casino game just like the primary game. However, in the case of a group play game (e.g., tournament, bingo, keno, and the like.), the player may be able to place a wager and get a confirmation ticket printed at the electronic gaming machine. In such an embodiment, the Transaction Manager may confirm the wager and send a bar-coded confirmation to be printed on the electronic gaming machine's printer. The player may then place another wager or continue playing at the primary game or secondary game.

In still another embodiment, after a certain period of time, when the game for which the player has placed a wager is over, the player can take the ticket to a cashier who may verify the win or loss by scanning the bar-coded ticket using a scanner linked to Transaction Manager. If the ticket is a winner, the Transaction Manager may authorize the cashier to payout the amount of the win. In another embodiment, the player may be able to take the ticket to a kiosk station linked to the Transaction Manager to verify the win or loss, and cashout in the case of a win. In yet another embodiment, the player may be able to insert the ticket into the electronic gaming machine's bill validator to verify the win or loss. In this case, the electronic gaming machine may communicate with the Transaction Manager to verify the claim, and if a win, dispense a bar coded voucher that may be claimed like any other cash voucher. In still another variation of this embodiment, the amount of the win may be credited onto the electronic gaming machine on either the primary game or the secondary game.

In accordance with one or more aspects of the invention, a gaming machine is provided that presents a primary game in a primary display and server based dynamic content from a central server onto a secondary display.

In another embodiment of an integrated Browser Manager and networked gaming system, the integrated system provides server based dynamic content onto a content display area of one or more gaming machines. The system includes a Browser Manager, one or more application servers connected to the Browser Manager by a server-to-server (S2S) server and a S2S web service, and one or more gaming machines connected to the Browser Manager by a game-to-server (G2S) server and G2S web service.

The Browser Manager includes a user interface application and a core service, wherein the user interface application generates a user interface display on a user control station. Each gaming machine includes a network interface to receive external content from the application server via the Browser Manager. Additionally, each gaming machine includes a content display area for displaying the external content.

Further aspects, features and advantages of various embodiments of the disclosed embodiments may be apparent from the following detailed disclosure, taken in conjunction with the accompanying sheets of drawings.

BRIEF DESCRIPTION OF THE DRAWINGS

FIGS. 8-1 and 8-2 illustrate a block diagram that displays various servers in the network and how those servers communicate to the various client viewing devices or browser clients (e.g., iVIEW, Bally Alpha Gaming cabinet, and Plasma signs throughout the property);

FIG. 9 illustrates a block diagram using a browser on a regulated gaming device to ensure that the data presented is secure and not tampered with;

FIGS. 10-1 and 10-2 illustrate a block diagram of the network servers and providing a common tournament server for the Alpha electronic gaming machine floor tournament and the iVIEW tournaments;

FIGS. 11-1 and 11-2 illustrate a block diagram of the Z-order director application that can frame manage 1 to N browser windows on any device in the casino property, wherein the Z-order director determines the proper Z-order by player requests and casino business rules, wherein the Z-order director receives requests for focus from various clients and servers (e.g., Bally Broadcast Server), and wherein if the business rules allow, the proper browser screen comes into focus and delivers the proper media to the patrons.

FIG. 19 illustrates an example Browser Manager Main form panel generated by a Browser Manager (client) in a gaming network in accordance with one or more embodiments.

FIG. 20F illustrates an Application Registration panel generated by a Browser Manager (client) in a gaming network in accordance with one or more embodiments.

DETAILED DESCRIPTION OF THE PREFERRED EMBODIMENTS

FIGS. 1-20I illustrate generic game apparatus displays or electronic gaming machine (gaming machine) displays suitable for use with the Browser Manager operating system and method. A Browser Manager server is able to initialize and configure one or more browser windows on a gaming device display screen. The Browser Manager has the ability to configure specific URLs for each browser window, configure and Z-order depth for each window, set window size and position, and call functions on the browser pages. A browser client side application on a gaming device is capable of creating multiple windows on an electronic gaming device and responding to said server configuration or browser message commands.

Figure 1:
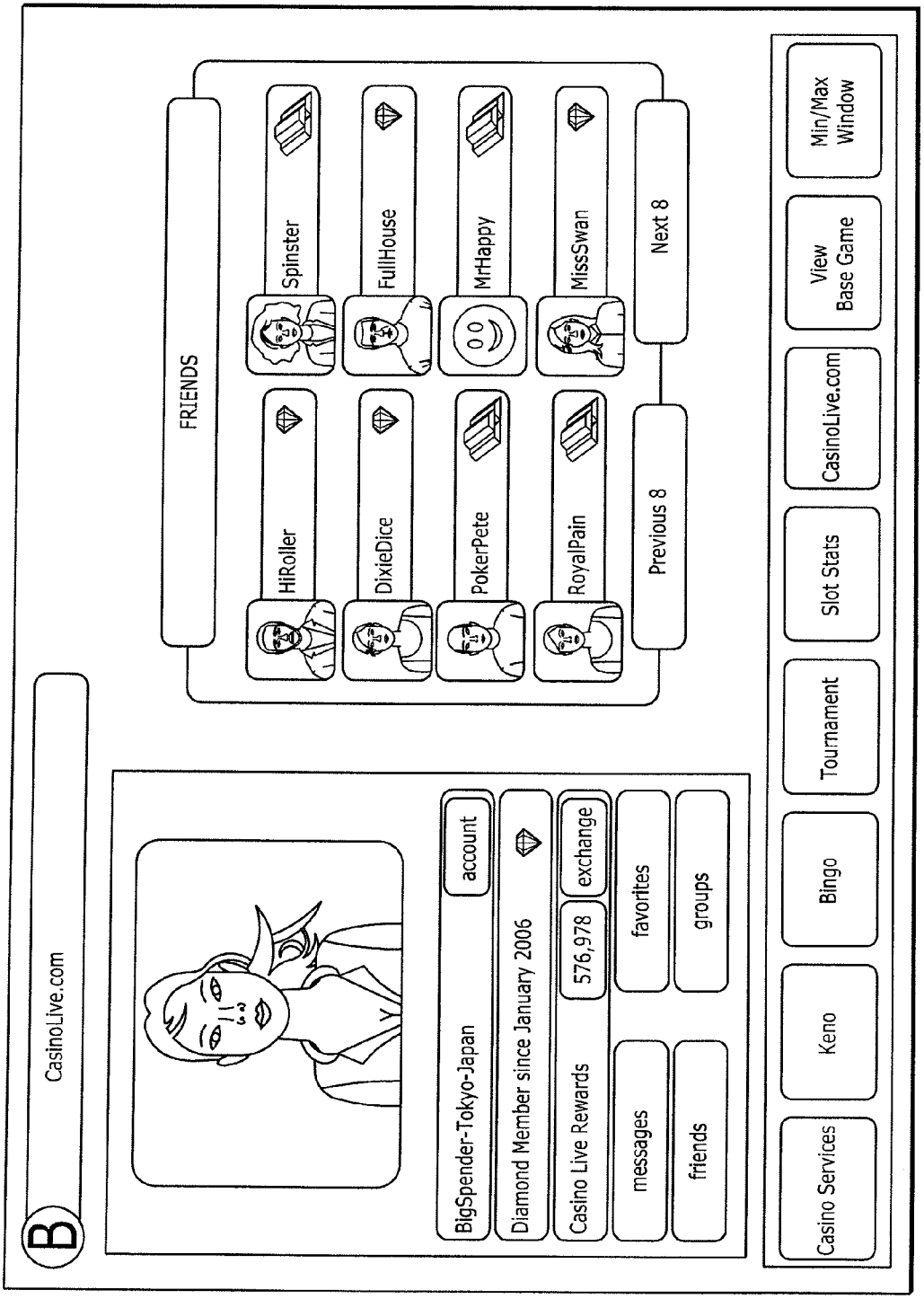
FIG. 1 is a screenshot of the browser client graphic user interface shown to a user on the gaming device, which enables a player to navigate from one browser screen to another using the buttons across the bottom of the screen, as well as view their patron account and/or the base game screen or a combination of both.

Referring now to the drawings, wherein like reference numerals denote like or corresponding parts throughout the drawings and, more particularly to FIG. 1, there is shown one embodiment of a network gaming environment that utilizes Browser Manager operating systems and methods of the disclosed embodiments. It should be noted that a variety of game architectures can be used to provide game play functions as well as access to other electronic gaming machines and servers through networks, as described below. The particular architecture shown is a generic architecture using components typical to game apparatuses suitable for use with the disclosed embodiments. An electronic gaming machine may take a variety of forms, including a video game apparatus having one or more display screens; a mechanical game having playing pieces and/or other moving mechanical parts; a personal computer system; a "network computer;" a television including or connected to a microprocessor (e.g. a "set top box") for the Internet or other information access, or another apparatus.

As described herein, the gaming machine 120 (See FIGS. 13-16E) is used by a player in a "gaming environment." This term is intended to refer to any location, public or private, in which games can be used. For example, public gaming environments include such places as arcades, stores, restaurants, bars, casinos, bowling alleys, stations, hotels, airports, airplanes, cruise ships, gymnasiums, health clubs, or other public places that can offer the electronic gaming machines 120 for use by players and which can provide prizes to players of the game apparatus. A "gaming environment" need not ordinarily provide games to the public. In other embodiments, a "gaming environment" may be a private place, such as a player's home or personal residence, office or other place of employment, private club, and the like.

A gaming machine 120, in accordance with the disclosed embodiments, may include a game processor, monetary input device, player input device(s), and game output device(s).

Game processor implements (e.g., controls, influences, coordinates, monitors, calculates, and the like) the functions of the gaming machine 120 during a game process and includes several input and output functions. The game processor controls the game apparatus by receiving inputs from a player, from other game apparatuses, from a server (described below), from a progressive bonus apparatus, and from other sources. The game processor also controls output signals to update the game process when appropriate. In addition, the game processor controls the Browser Manager operating system of the disclosed embodiments by calculating when prizes are awarded, calculating and updating prize lists and prize costs, and other functions, as described below. Game processor preferably includes a digital microprocessor or a similar controller device, and other electronic components. The operation of game processor is described in greater detail below. The game processor is preferably provided within a housing of gaming machine 120.

Monetary input device is used to receive the monetary input that is inserted by a player into the game apparatus in the gaming environment. For example, coins can be received in return for the player's use of the game apparatus. A coin deposit slot can accept standard currency coins, bills, or game tokens that may be available in the gaming environment, and also typically includes a coin return button and coin return slot. Once one or more coins are accepted, the coins are routed to a cash box and a signal is sent to game processor to increase the player's game credits, i.e., to indicate that one or more game plays have been paid. Coin slots and boxes suitable for use in gaming machine 120 are readily available on the commercial market.

Alternatively, other monetary input devices can be used, such as debit card or credit card readers well known to those skilled in the art, or "smart card" readers which can read and write electronic information to and from the card. For example, "E-cash," "cybercash" or other electronic monetary forms can be used. In other embodiments, user verification or validation can be input by the player, such as a player identification and/or password that, for example, allows a monetary value to be billed to a player or deducted from a player's monetary account at a bank or other institution. Herein, the term, "monetary input," is intended to also refer to other types of player validation for use of a game in addition to those forms mentioned above. In alternate embodiments located in non-public gaming environments (e.g., at a user's home), or for other applications, such as promotional uses of gaming machine 120, monetary input may not be necessary for the player to use gaming machine 120.

Input devices are used by a player or user to provide input to the gaming machine 120 to influence game events during a game process and to achieve one or more predetermined goals or tasks for scoring points and winning prizes or other types of awards. The input devices can also be used to select prizes within the Browser Manager operating system and method of the disclosed embodiments. Alternatively, separate input controls can be used for the prize functions of the gaming machine 120.

Player input typically includes game commands provided by controlling devices such as buttons, a keyboard, dials, joystick controls, a touch screen, a track ball, a mouse, a gun device, a steering wheel, foot pedals, speech input through a microphone, or any other input used in playing a game and providing selections. For example, the player can press a button to tilt a playing surface to guide a playing piece, move a joystick to control a graphical object displayed on a video screen, or toss a playing piece into a target aperture having sensors to detect the present playing piece. Each type of user input can provide a particular game command to the game processor, and the game processor interprets the commands and influences game states and game events in the game process accordingly.

Various other types of devices can also be included in gaming machine 120 as input devices to allow the processor to monitor the game. For example, sensors of various types can be employed to detect the paths of playing pieces directed by the player, detect when playing pieces have been dispensed, detect when a game is over, detect cheating actions by the player, and the like. Also, input devices such as buttons, switches, and the like allow the player of the game to make various selections concerning game play. For example, a player could select a one or two player game, a preferred award type, a progressive option, and the like, using additional controls on a front panel of the gaming machine 120.

Game output devices may influence the game and/or provide feedback to the player about the current state of the game process. For example, motors or solenoids can influence mechanical components of the game in response to player commands, such as tilting a playing surface, dispensing a playing piece, spinning a wheel, and the like. Feedback is perceived by the player preferably in the form of visual, auditory, and/or tactile feedback. A video display screen can provide visual feedback such as images to the player during the game process. Other visual output devices can include one or more score displays, lamps or other light sources positioned on or surrounding a "game space" (e.g., a play field or area of game action).

Game output devices such as speakers, buzzers, alarms, and other devices provide auditory feedback, such as sound effects during a game process, synthesized or recorded speech, and the like. Game output devices, such as motors, solenoids, or other actuators can provide forces on the game apparatus or on controls handled by the player to provide tactile feedback in the form of vibration, jolts, and the like. One or more of the game output devices can also be used to display information related to specific prizes that can be won by the player when using the gaming machine 120, as described below. Game output devices can also include a coin return slot for returning coins or tokens or providing other cash prizes after a game is played. Game processor preferably commands such feedback to the player by sending out control signals to the various output devices in gaming machine 120 when appropriate.

G2S (Game to Server) Browser Class

The browser class includes commands and events related to browser activity available on a gaming machine 120. The browser class is a single device class with one owner host, and zero or more guest hosts permitted.

The browser class uses a region of a display device of an electronic gaming machine (gaming machine). The metrics for the display device (egmDisplayWidth, egmDisplayHeight) are assumed to be relatively stable (infrequent changes); however the display device metrics may be changed if the browser class uses the following sequence: (1) disable the browser class device; (2) delete all browser windows; (3) change the display device metrics; and (4) optionally enable the browser class device.

The region of the display device used by the browser class device is indicated by the browser metrics. This region may change from one context to the next, as specified by the gaming machine 120. For example, the game selection screen may use a specified region, yet a game theme may use a differently sized region.

The browser class device allows browser windows to be set, added, modified, and deleted. Additionally, each browser window can be assigned scripts to execute. Once created, the browser windows can be refreshed, displayed, hidden, resized, or redirected to another web address.

Browser window state changes can be subscribed to by specifying one or more windowStatusSub elements for the specified window. Whenever the browser window transitions to the state, or an error occurs, the browserStatus command is sent to the host as a notification command (no response from the host is needed). The Browser window state changes that are not subscribed to may not be sent to the host.

Most of the browser class commands operate on multiple browser windows by providing a list of windows and related information; however, a single browser may be addressed by providing a list containing one window.

Request-Response Pairs

Figure 1A:
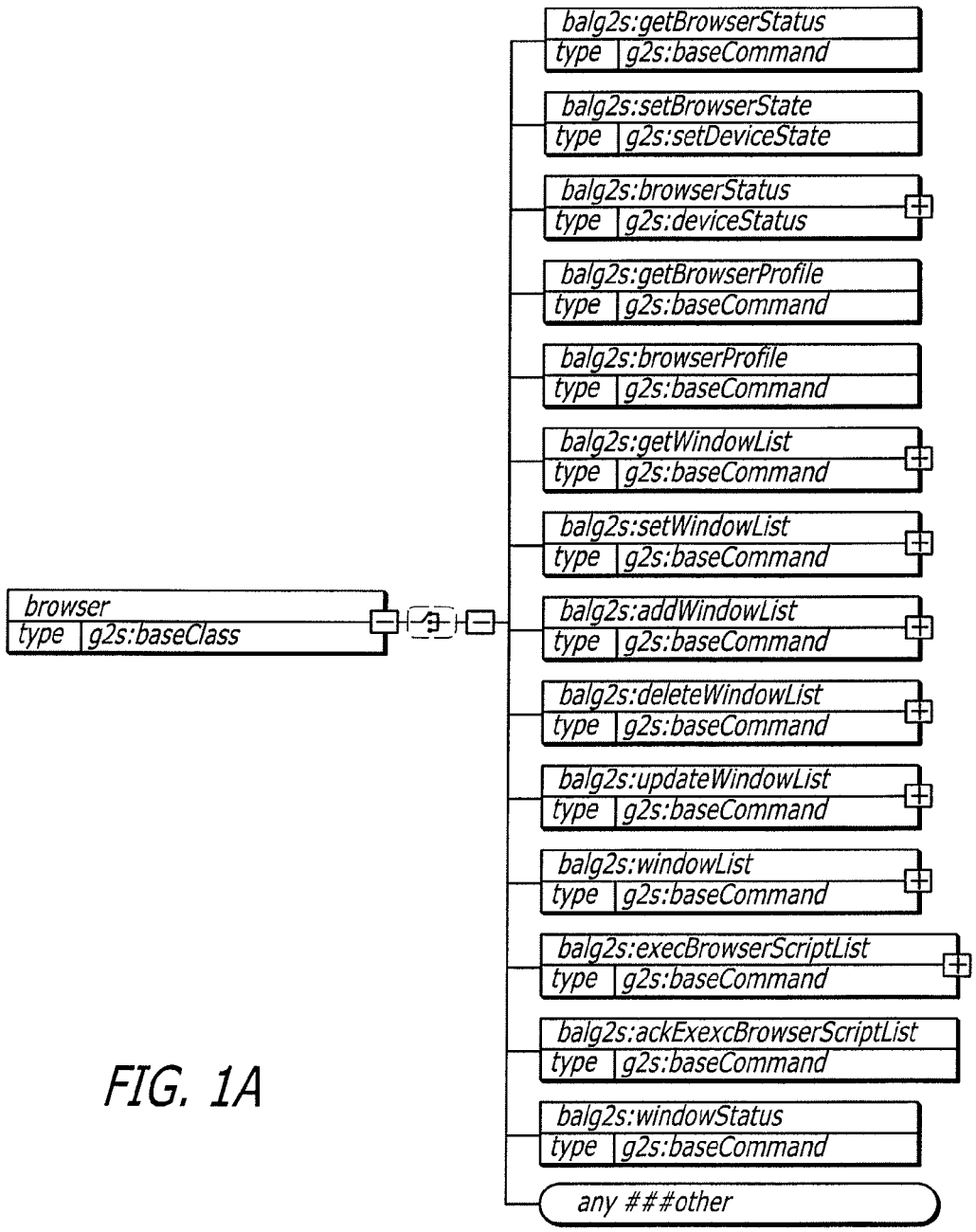
FIG. 1A is a diagram that illustrates the command structure of the browser class.
Figure 2:
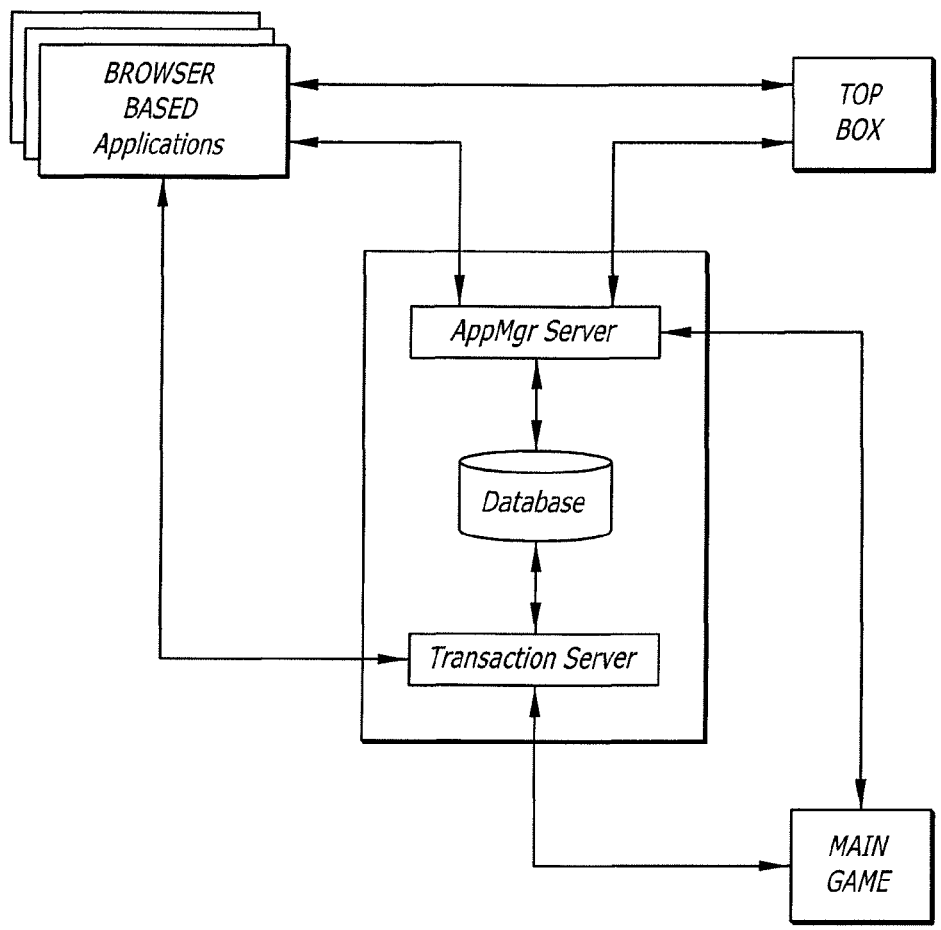
FIG. 2 is a block diagram of the various communication between a main game CPU, a Top Box Monitor, browser-based applications, and middleware application managers/transaction servers that allow the data to flow between all devices.
Figure 3:
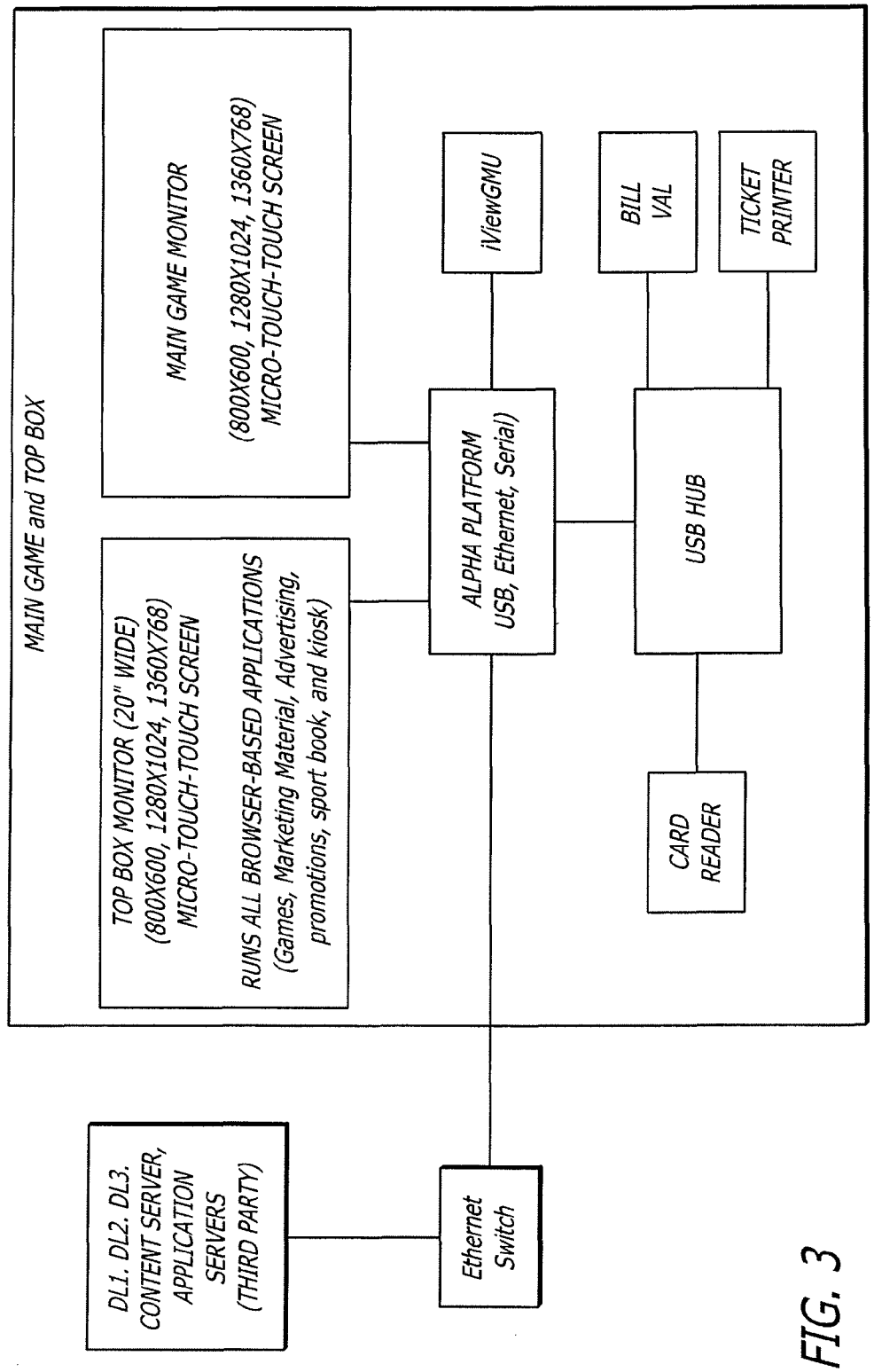
FIG. 3 is a block diagram that displays various components inside the gaming cabinet and how those components interconnect and communicate.

The following diagram highlights the command structure of the browser class, as shown in FIG. 1A.

The following tables organize the commands contained within the browser class into request-response pairs:

TABLE 1

Commands Originated By gaming machine 80

| Request | Response |
|---|---|
| windowStatus | none |

TABLE 2

Commands Originated By Host

| Request | Response | Owner | Guest |
|---|---|---|---|
| getBrowserStatus | browserStatus | Yes | Yes |
| setBrowserState | browserStatus | Yes | No |
| getBrowserProfile | browserProfile | Yes | Yes |
| getWindowList | windowList | Yes | Yes |
| setWindowList | windowList | Yes | No |
| addWindowList | windowList | Yes | No |
| deleteWindowList | windowList | Yes | No |
| updateWindowList | windowList | Yes | No |
| execBrowserScriptList | ackExecBrowserScriptList | Yes | No |

The browser class is a single-device class. deviceId 0 is reserved for class level functions.

getBrowserStatus Command

This command is used by a host to request the current status information of the device. The browserStatus command is sent in response to the getBrowserStatus command.

| getBrowserStatus | |
|---|---|
| type | g2s:baseCommand |

The getBrowserStatus element contains no additional attributes or elements.

setBrowserState Command

This command is used by a host to enable or disable the browser device. Disabling the browser device prevents the device from being active or started by an operator. The owner of the device can execute this command. A browserStatus command is sent in response to a setBrowserState command.

| setBrowserState | |
|---|---|
| type | g2s:setDeviceState |

TABLE 3 setBrowserState Attributes

| Attribute | Restrictions | Description |
|---|---|---|
| enable | type: Boolean use: optional default: true | Indicates whether the browser device is active. true = active and false = inactive. | browserStatus Command

This command is used by a gaming machine 120 to send the current status of the device to a host. The browserStatus command is sent in response to the setBrowserState and getBrowserStatus commands.

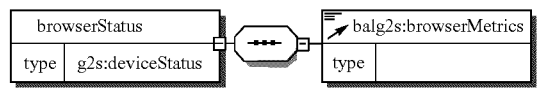

TABLE 4 browserStatus Attributes

| Attribute | Restrictions | Description |
|---|---|---|
| configurationId | type: configurationId use: optional default: 0 | Configuration identifier set by the host. |
| hostEnabled | type: Boolean use: optional default: true | Indicates whether the device has been enabled by the host (true/false). |
| egmEnabled | type: Boolean use: optional default: true | Indicates whether the device has been enabled by the gaming machine 80 (true/false). |

TABLE 5 browserStatus Elements

| Element | Restrictions | Description |
|---|---|---|
| browserMetrics | minOcc: 1 maxOcc: 1 | Contains the attributes that define the browser position and size (metrics). |

TABLE 6 browserMetricsElements

| Attribute | Restrictions | Description |
|---|---|---|
| coordX | type: int use: required | Horizontal position (in pixels) of the browser's top left corner. |

TABLE 6-continued browserMetricsElements

| Attribute | Restrictions | Description |
| --- | --- | --- |
| coordY | type: int use: required | Vertical position (in pixels) of the browser's top left corner. |
| sizeW | type: int use: required | Width of the browser in pixels. |
| sizeH | type: int use: required | Height of the browser in pixels. | getBrowserProfile Command

This command is used by a host to request the profile information of the device. The browserProfile command is sent in response to the getBrowserProfile command.

| getBrowserProfile | |
| --- | --- |
| type | g2s:baseCommand |

The getBrowserProfile element contains no additional attributes or elements.

browserProfile Command

This command is used by a gaming machine 120 to send the device profile to a host. The browserProfile command is sent in response to the getBrowserProfile command.

| browserProfile | |
| --- | --- |
| type | g2s:baseCommand |

TABLE 7 browserProfile Attributes

| Attribute | Restrictions | Description |
| --- | --- | --- |
| configurationId | type: configurationId use: required | Configuration identifier set by the host. |
| restartStatus | type: Boolean use: required | Status of the device at restart: true = enabled false = disabled |
| useDefaultConfig | type: Boolean use: required | Indicates whether the default configuration for the device may be used when the gaming machine 80 restarts. |
| requiredForPlay | type: Boolean use: required | Indicates whether the device is required for play: true = enabled false = disabled If set to true, the device may be installed and operational before the gaming machine 80 can enable itself for play. If the device is not installed or operational, the egmEnabled attribute should be set to false. |
| egmDisplayWidth | type: int use: required | Width of the gaming machine 80 display in pixels. |
| egmDisplayHeight | type: int use: required | Height of the gaming machine 80 display in pixels. |

Standard configuration option that may be included in the standard option configuration group—BAL_browserOptions—for a browser class device.

getWindowList Command

This command is used by a host to read the set of browser windows in the browser device. The windowList command is sent in response to the getWindowList command.

The command can request that all browser windows be returned in the response by omitting the windowSelect element, which has the effect of a wildcard for all browser windows. Alternatively, the command can request that one or more specific browser windows be returned in the response by specifying the specific sesWindowId's in a list of windowSelect elements.

Possible error codes are:

BAL_BRX001: Command references an unknown sesWindowId.

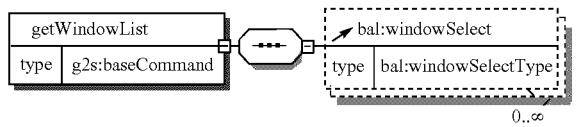

TABLE 8 getWindowList Elements

| Element | Restrictions | Description |
| --- | --- | --- |
| windowSelect | minOcc: 0 maxOcc: ☐ | Contains a list of window specifications to return to the host. NOTE: omission of this element specifies that all windows should be in the response. |

TABLE 9 windowSelect Attributes

| Attribute | Restrictions | Description |
| --- | --- | --- |
| sesWindowId | type: sesWindowId use: required | Unique browser window identifier. | setWindowList Command

This command is used by a host to assign the set of browser windows in the browser device. The windowList command is sent in response to the setWindowList command. When processed, this command may replace all previously assigned browser windows with the browser windows specified in this command.

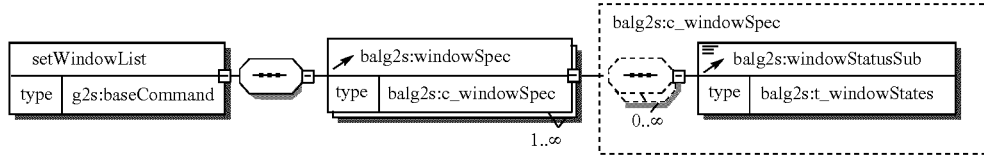

TABLE 10 setWindowList Elements

| Element | Restrictions | Description |
| --- | --- | --- |
| windowSpec | minOcc: 1<br>maxOcc: ☐ | Contains a list of window specifications to assign to the browser. |

TABLE 11 windowSpec Attributes

| Attribute | Restrictions | Description |
| --- | --- | --- |
| sesWindowId | type: sesWindowId<br>use: required | Unique browser window identifier. |
| coordX | type: int<br>use: required | Horizontal position (in pixels) of the window's top left corner. |
| coordY | type: int<br>use: required | Vertical position (in pixels) of the window's top left corner. |
| coordZ | type: int<br>use: required | Z-order (front to back) of the window. |
| sizeW | type: int<br>use: required | Width of the window in pixels. |
| sizeH | type: int<br>use: required | Height of the window in pixels. |
| visible | type: Boolean<br>use: required | Indicates if the window is visible. |

TABLE 11-continued windowSpec Attributes

| Attribute | Restrictions | Description |
| --- | --- | --- |
| url | type: transportLocation<br>use: required | A Universal Resource Locator (URL) addressing the content for the window to display. |

TABLE 12 windowSpec Elements

| Element | Restrictions | Description |
| --- | --- | --- |
| windowStatusSub | type: windowStates<br>minOcc: 0<br>maxOcc: ☐ | Identifies a windows state that may be sent to the host via the windowStatus command. Note: This is an optional element of type windowStates, and has no attributes. | addWindowList Command

This command is used by a host to add browser windows to the existing set of browser windows in the device. The windowList command is sent in response to the addWindowList command. When processed, this command may append the newly added windows to the windowList.

Possible error codes are:

BAL_BRX002: Command references an existing sesWindowId.

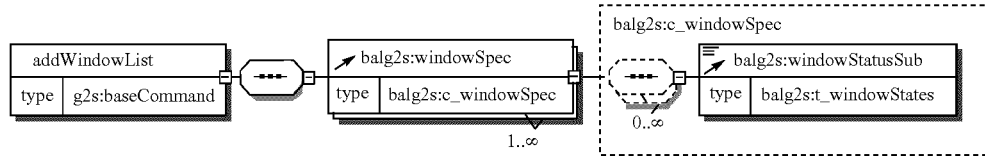

TABLE 13 addWindowList Elements

| Element | Restrictions | Description |
| --- | --- | --- |
| windowSpec | minOcc: 1<br>maxOcc: ☐ | Contains a list of window specifications to add to the browser. |

NOTE: the windowSpec element attributes are defined in Table 11.

deleteWindowList Command

This command is used by a host to remove a set of browser windows from the browser device. The windowList command is sent in response to the deleteWindowList command.

Possible error codes are:

BAL_BRX001: Command references an unknown sesWindowId.

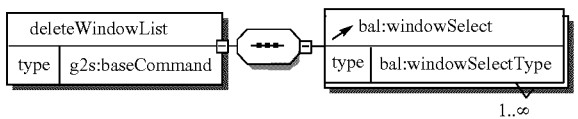

TABLE 14 deleteWindowList Elements

| Element | Restrictions | Description |
| --- | --- | --- |
| windowSelect | minOcc: 0<br>maxOcc: ☐ | Contains a list of window specifications to return to the host. NOTE: omission of this element specifies that all windows should be in the response. |

NOTE: the windowSelect element attributes are defined in Table 9.

updateWindowList Command

This command is used by a host to update the set of browser windows in the browser device. The windowList command is sent in response to the updateWindowList command. When processed, this command may update the attributes specified while retaining values for attributes that are omitted from the command.

Possible error codes are:

BAL_BRX001: Command references an unknown sesWindowId.

TABLE 15 updateWindowList Elements

| Element | Restrictions | Description |
| --- | --- | --- |
| windowUpdate | minOcc: 1<br>maxOcc: ☐ | Contains a list of windows to update within the browser. |

TABLE 16 windowUpdate Attributes

| Attribute | Restrictions | Description |
| --- | --- | --- |
| sesWindowId | type: sesWindowId<br>use: required | Unique browser window identifier. |

TABLE 16-continued windowUpdate Attributes

| Attribute | Restrictions | Description |
| --- | --- | --- |
| coordX | type: int<br>use: optional | Horizontal position (in pixels) of the window's top left corner. |
| coordY | type: int<br>use: optional | Vertical position (in pixels) of the window's top left corner. |
| coordZ | type: int<br>use: optional | Z-order (front to back) of the window. |
| sizeW | type: int<br>use: optional | Width of the window in pixels. |
| sizeH | type: int<br>use: optional | Height of the window in pixels. |
| visible | type: Boolean<br>use: optional | Indicates if the window is visible. |
| url | type: transportLocation<br>use: optional | A Universal Resource Locator (URL) addressing the content for the window to display. |

TABLE 17 windowUpdate Elements

| Element | Restrictions | Description |
| --- | --- | --- |
| windowStatusSub | type: windowStates<br>minOcc: 0<br>maxOcc: ☐ | Identifies a windows state that may be sent to the host via the windowStatus command. Note: This is an optional element of |

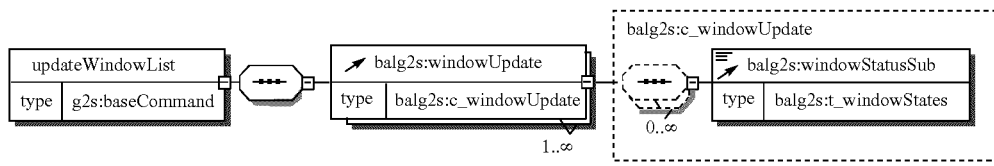

TABLE 17-continued windowUpdate Elements

| Element | Restrictions | Description |
| --- | --- | --- |
| | | type windowStates and has no attributes. | windowList Command

This command is used by the gaming machine 120 to send the current set of browser windows to a host. The windowList command is sent in response to the getWindowList, setWindowList, addWindowList, deleteWindowList, and updateWindowList commands.

When the windowList command is sent in response to the getWindowList command, the contents of the windowList may match the specified browser windows from the getWindowList request. In all other cases, all of the browser windows may be present in the windowList response.

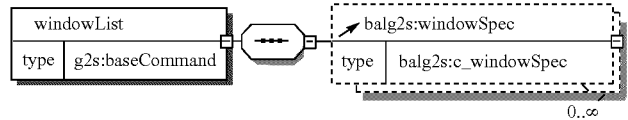 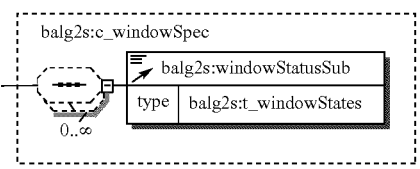

TABLE 18 windowList Elements

| Element | Restrictions | Description |
|---|---|---|
| windowSpec | minOcc: 1<br>maxOcc: ☐ | Contains a list of current window specifications within the browser. |

NOTE: the windowSpec element attributes are defined in Table 11.

execBrowserScriptList Command

This command is sent by a host to execute scripts in the context of the browser windows within the device. The ackExecBrowserScriptList command is sent in response to the execBrowserScriptList command.

Possible error codes are:

BAL_BRX001: Command references an unknown sesWindowId.

BAL_BRX001: Command references an unknown script function or script type.

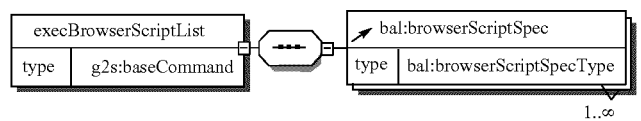

TABLE 19 execBrowserScriptList Elements

| Element | Restrictions | Description |
|---|---|---|
| browserScriptSpec | minOcc: 1<br>maxOcc: ☐ | Contains a list of window identifiers with associated scripts to execute. |

TABLE 20 browserScriptSpec Attributes

| Attribute | Restrictions | Description |
|---|---|---|
| sesWindowId | type: sesWindowId<br>use: required | Unique browser window identifier. |
| scriptType | type: browserScriptType<br>use: required | Identifies the type of script referenced by the 'function' attribute. |
| function | type: string<br>use: required | Identifies a script to execute in the context of the browser window. | ackExecBrowserScriptList Command

This command is used by gaming machine 120 to send the host an application level acknowledgement that the execBrowserScriptList command was processed. The ackExecBrowserScriptList command is sent in response to the execBrowserScriptList command.

The acknowledgement does NOT imply that the scripts have been executed; it indicates that the scripts have been queued up for execution.

| ackExecBrowserScriptList | |
|---|---|
| type | g2s:baseCommand |

The ackExecBrowserScriptList element contains no additional attributes or elements.

windowStatus Command

This command is sent by gaming machine 120 to notify the host that a browser window has changed state. The purpose of this command is to notify the host when a page has started, or has finished loading its content, and the like. The windowStatus command is a notification command, thus has no response from the host.

The windowStatus command is sent when there are window status subscriptions that correspond to the windowState, or an error occurs in the browser window.

| windowStatus | |
|---|---|
| type | g2s:baseCommand |

TABLE 21 windowStatus Attributes

| Attribute | Restrictions | Description |
|---|---|---|
| sesWindowId | type: sesWindowId<br>use: required | Unique browser window identifier. |
| windowStatus | type: windowStates<br>use: required | Identifies the state of the browser window. |
| url | type: transportLocation<br>use: optional<br>default: <empty> | An optional Universal Resource Locator (URL) addressing the content for the window to display. |
| httpStatusCode | type: egmMessage<br>use: optional<br>default: <empty> | Contains an optional HTTP status code. |
| errorText | type: egmMessage<br>use: optional<br>default: <empty> | Contains an optional text description of the browser window error. Note: used when there is a non-empty value in the errorCode attribute. |

Data Types

The following table lists the data types specific to the browser class:

TABLE 22 browser Class Data Types

| Data Type | Restrictions | Description |
| --- | --- | --- |
| sesWindowId | type: int minIncl: 1 | A unique window identifier. |
| browserScriptType | type: string | An identification of the script type. |
| windowStates | type: string enum: see Table 23 | Window states that are subscribed to by the host, and notified with a windowStatus command. |

TABLE 23 windowStates enumerations

| Enumeration | Description |
| --- | --- |
| BAL__none | No window states are subscribed. |
| BAL__anyError | An error has occurred in the browser window. |
| BAL__openUrl | Window is opening a URL. |
| BAL__pageStarted | Page start state is reported. |
| BAL__pageFinished | Page finished state is reported. |

Error Codes

The following table lists the error codes specific to the browser class:

TABLE 24 browser Class Error Codes

| Error Code | Standard Error Text |
| --- | --- |
| BAL__BRX001 | Command references an unknown sesWindowId. |
| BAL__BRX002 | Command references an existent sesWindowId. |
| BAL__BRX003 | Command references an unknown script function or script type. |
| BAL__BRX004 | Command contains invalid window position or size. |
| BAL__BRX005 | Command contains an invalid window status subscription. |

Event Codes

The following table lists the event codes specific to the browser class:

TABLE 25 browser Class Event Codes

| Event Code | CB | BR |
| --- | --- | --- |
| BAL__BRE001 electronic gaming machine Disabled Browser Device | | S |
| BAL__BRE002 electronic gaming machine Enabled Browser Device | | S |
| BAL__BRE003 Host Disabled Browser Device | | S |
| BAL__BRE004 Host Enabled Browser Device | | S |
| BAL__BRE005 Host Changed Browser Config | | S |
| BAL__BRE006 electronic gaming machine Changed Browser Config | | S |
| BAL__BRE101 Browser Metrics Changed | | S | evaluate(state)

The egmEnabled and egmState attributes are both determined from multiple factors.

If all of the faults for a device have been cleared then the egmEnabled attribute for the device can be set to true. If any one fault still exists then the egmEnabled attribute may be set to false. Thus, after a fault is cleared, the gaming machine may evaluate all of the attributes that contribute to the state of the egmEnabled attribute. If anyone of them shows a fault then the egmEnabled attribute may remain false. This is communicated in the following documentation by using the convention "evaluate(device.egmEnabled)".

Likewise, the egmState attribute of the cabinetStatus reflects the aggregate state of all devices in the gaming machine 120. If the requiredForPlay attribute in the profile of a device is set to true then if either the egmEnabled or hostEnabled attribute of the device is set to false, the egmState may reflect that the gaming machine 120 is disabled. Similarly, if the egmLocked or hostLocked attribute of a device is set to true then the egmState may reflect that the gaming machine 120 is locked out. If any one device is in such a state then the egmState may reflect that the gaming machine 120 is disabled or locked out, as appropriate. Thus, after a device has been enabled or a lockout has been cleared, the gaming machine 120 may evaluate the state of all active devices within the gaming machine 120 to determine the proper value of the egmState attribute. At the same time, the deviceClass and deviceId attributes of the cabinetStatus may be updated to reflect the appropriate device. This is communicated in the following documentation by using the convention "evaluate(cabinet.egmState)".

BAL_BRE001 Electronic Gaming Machine Disabled Browser Device

This event is sent by the gaming machine 120 after the browser device has been disabled at the electronic gaming machine.

TABLE 26

BAL__BRE001 Device State, Meter, Log Changes and Related Commands

| | Details |
| --- | --- |
| Device State Changes | browser.egmEnable = "false" evaluate(cabinet.egmState) |
| Meter State Changes | None. |
| Log State Changes | None. |
| Related Commands | None. |

BAL_BRE002 Electronic Gaming Machine Enabled Browser Device

This event is sent by the gaming machine 120 after the browser device has been enabled at the gaming machine 120.

TABLE 27

BAL__BRE002 Device State, Meter, Log Changes and Related Commands

| | Details |
| --- | --- |
| Device State Changes | browser.egmEnable = "true" evaluate(cabinet.egmState) |
| Meter State Changes | None. |
| Log State Changes | None. |
| Related Commands | None. |

BAL_BRE003 Host Disabled Browser Device

This event is sent by the gaming machine 120 after the browser device has been disabled by a setBrowserState command issued by a host.

TABLE 28

BAL_BRE003 Device State, Meter, Log Changes and Related Commands

| | Details |
|---|---|
| Device State Changes | browser.hostEnable = "false" evaluate(cabinet.egmState) |
| Meter State Changes | None. |
| Log State Changes | None. |
| Related Commands | None. |

BAL_BRE004 Host Enabled Browser Device

This event is sent by the gaming machine 120 after the browser device has been enabled by a setBrowserState command issued by a host.

TABLE 29

BAL_BRE004 Device State, Meter, Log Changes and Related Commands

| | Details |
|---|---|
| Device State Changes | browser.egmEnable = "true" evaluate(cabinet.egmState) |
| Meter State Changes | None. |
| Log State Changes | None. |
| Related Commands | None. |

BAL_BRE005 Host Changed Browser Config

This event is sent by the gaming machine 120 after the configuration options for the browser device have been changed remotely by a host. The event may be sent after the "configuration changes applied" event is sent by the configuration device.

TABLE 30

BAL_BRE005 Device State, Meter, Log Changes and Related Commands

| | Details |
|---|---|
| Device State Changes | None. |
| Meter State Changes | None. |
| Log State Changes | None. |
| Related Commands | None. |

BAL_BRE006 Electronic Gaming Machine Changed Browser Config

This event is sent by the gaming machine 120 after the configuration options for the browser device have been changed locally at the gaming machine 120. The event may be sent until the operator commits the configuration changes.

TABLE 31

BAL_BRE006 Device State, Meter, Log Changes and Related Commands

| | Details |
|---|---|
| Device State Changes | None. |
| Meter State Changes | None. |
| Log State Changes | None. |
| Related Commands | None. |

BAL_BRE101 Browser Metrics Changed

This event is sent by the gaming machine 120 after the browser metrics have changed. This event provides a means for a host to be notified of the browser metrics change and to subscribe to the event with the device status data, which may provide the new browser metrics values.

TABLE 32

BAL_BRE101 Device State, Meter, Log Changes and Related Commands

| | Details |
|---|---|
| Device State Changes | The browserStatus.browserMetrics element attributes for coordX, coordY, sizeW, and SizeH may be updated to the new values. |
| Meter State Changes | None. |
| Log State Changes | None. |
| Related Commands | None. |

Figure 5:
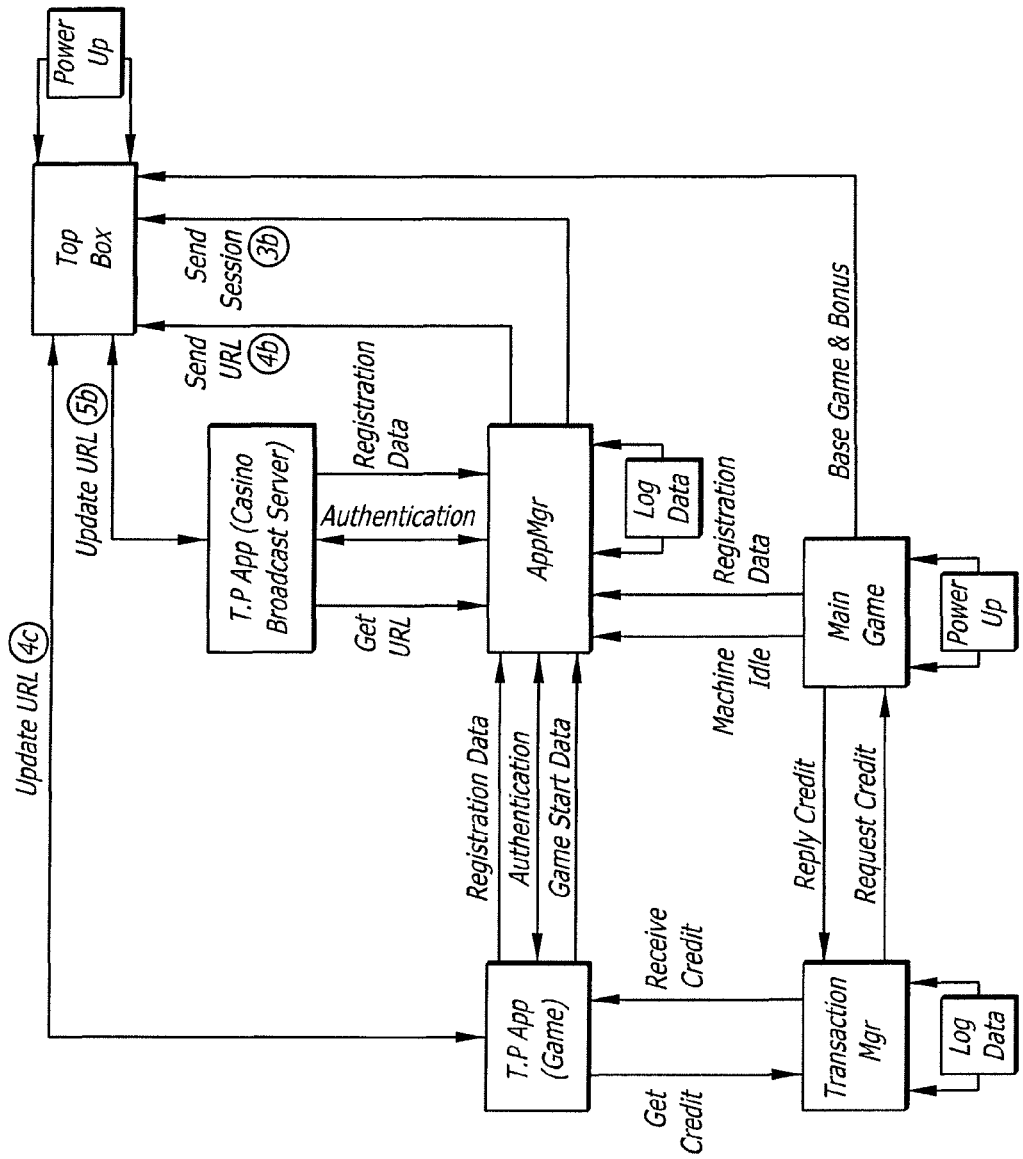
FIG. 5 is a logical flow diagram that displays communication between all clients and servers using the Browser Manager and browser client software and protocol.

Referring now to FIG. 5, in sequence 1A and 2A, when the main game on the gaming machine 120 powers up, it registers with Browser Manager 100 by sending specific information such as the game IP address, the screen resolution and available browser space. The Browser Manager 100 then logs the information in a database table.

With respect to the type of applications, a distinction is made between browser content that is static or dynamic. Static content is handled by a (or third party) Broadcast Server (as labeled in the diagram) and normally does not necessitate player input and does not involve money transactions. The static content is normally informational but may include static pay tables. On the other hand, dynamic content refers to playable applications (games) that are transmitted to the secondary display and involve player input and wagering. This is labeled T.P. Application (game) in the diagram.

Referring now to sequence 1b, 2b, 3b, 4b, and 5b (static content), on startup, the application (bingo, keno, and the like) registers with Browser Manager 100 by sending specific information such as the application parameters (number of windows needed, window coordinates, and Z order). The Browser Manager 100 then logs the information in a database table. An authentication process may follow to make sure the application source is secure. The Browser Manager 100 notifies the gaming machine 120 top box (secondary display) by sending it session data including window coordinates and application URL.

Referring now to sequence 1c, 2c, 3c, 4c, 5c, 6c, 7c, 8c, 9c, and 10c (dynamic content), the same registration and authentication process occurs. In this case, there is an application server 110 providing the game content and allowing the player to place wagers and receiving credit. All transactions are logged by the transaction server. The transaction server acts as an intermediary between the application server 110 and the gaming machine 120/player.

In one embodiment of the Browser Manager operating system, the design of the browser on the gaming machine 120 incorporates additional technology components, such as adding and using the Mozilla browser in the Alpha OS. In some embodiments, Macromedia Flash support can be added through a plug-in.

With respect to browser configuration, using a config text file (/games/video.cfg), the games can specify whether they want to enable a browser region and specify the region in pixels. This file is also used by games using the OpenGL video server (glvideo).

\# OpenGL=Supported, Required, Unsupported

OpenGL=Unsupported

\# Screen0 640×480 Single Screen

\# Screen1 800×600 Single Screen

Screen2 1024×768 Single Screen
Screen3 1280×1024 Single Screen
Screen4 1600×1200 Single Screen
Screen5 640×480 Dual Screen
Screen6 800×600 Dual Screen
Screen7 1024×768 Dual Screen
Screen8 1280×1024 Dual Screen
Screen9 1600×1200 Dual Screen
Screen=Screen6
used to instruct glvideo to start in dualscreen mode
game has to be written for both screens
DualScreen=yes
Browser variables. Whether enabled, and dimensions in pixels
Browser=Enabled
BrowserX=0
BrowserY=0
BrowserW=800
BrowserH=600
Video Y, in dual screen specifies video's Y offset from the top
VideoY=600

Browser Server on Electronic Gaming Machine

An IPC server ("BrowserSvr") may be added to the OS that may have the capability to launch multiple browser windows and perform various operations on them; such as positioning, sizing each of them, opening URLs in those windows, and closing any of them. This server may link to the Mozilla libraries in the sandbox.

libbrowser:

The libbrowser (gameapi/libraries/libbrowser) library contains the interface for clients to communicate with the browser server.

A client application wishing to interface with the browser server may include the following header file: gameapi.xx.xx\libraries\libbrowser\BrowserAPI.h This header may contain functions to communicate with the server. For example, it can ask the browser server to open a new browser window and return the handle to that browser window. The handle returned is used to identify the browser window in other calls that perform a specific operation on that window.

There are two types of browser windows currently defined: Normal and modal. The default type is normal. A modal window is used when a message is to be displayed that prevents the user from interacting with any other Browser windows. Creation of a modal browser window is almost the same as the creation of a normal window, except for the window type. Being that the modal window is a regular browser window, the content inside a modal browser window is completely server-controllable. Any other browser windows may not receive user input until the modal window is closed.

The Browser API may also allow clients to register callbacks for error conditions and prompts encountered while reading content on pages.

Header Definitions

```
#define BROWSER_SERVER_NAME       "sdg.browser.1"
namespace BrowserAPI
{
    void Init (const char * clientName = NULL);
    void Kill ( );
    /** Open a new browser window */
    void NewBrowserWindow(int x, int y, unsigned int w, unsigned int h,
    HBROWS& hWin, int type=WND_NORMAL,int z=0, const char *url=0);
    /** Set attributes of browser window */
    void SetBrowserWndAttribs(HBROWS hWin, int x, int y, unsigned int w, unsigned int h,
    int z, const char *url);
    /** Set z-order of browser window */
    void SetBrowserWinZOrder(HBROWS hWin, int z);
    /** Load a URL in the browser window */
    void SetBrowserURL(HBROWS hWin, const char *url);
    /** Set the browser window position & size */
    void MoveBrowser(HBROWS hWin, int x, int y,unsigned int w,unsigned int h);
    /** Set the visibility of the window */
    void ShowBrowser(HBROWS hWin, bool bShow);
    /** Close the window */
    void CloseBrowser(HBROWS hWin);
    /* Execute script function on page. */
    void ExecJavascriptFn(HBROWS hWin, const char *jsurl);
    /** Get the browser window XID*/
    void GetBrowserWindowXID(HBROWS hWin, unsigned long& xid);
    /** Register for browser errors e.g. Http errors*/
    typedef void (*MozErrorCB)(HBROWS hWin,const char *url, int errCode);
    void RegisterMozErrors (MozErrorCB yourFunction);
}
```

Messages used by the library to communicate with the server:

```
gameapi.xx.xx\libraries\libbrowser\BrowserMsgs.h
enum
{
    cmdNewBrowserWin        = 0x0001,
    cmdCloseBrowserWin      = 0x0002,
    cmdSetBrowserURL        = 0x0003,
    cmdSetBrowserPosSize    = 0x0004,
    cmdBrowserShow          = 0x0005,
    cmdSetName              = 0x0007,
    cmdSetWndAttribs        = 0x0009,
    cmdURLError             = 0x000A,
    cmdSetBrowserZOrder     = 0x000C,
    cmdExecjscript          = 0x000E,
    cmdGetBrowserWinXID     = 0x000B,
    cmdRegMozErrors         = 0x0011,
};
```

Usage Examples

```
#include "BrowserAPI.h"
BrowserAPI::Init("browsclient");
HBROWS hWin = 0, hWin2=0;
BrowserAPI::NewBrowserWindow(20,20,600,400,hWin,WND_NORMAL,10,"mozilla.org");
BrowserAPI::ShowBrowser(hWin,true);
......
//move first window
BrowserAPI::MoveBrowser(hWin,200,40,500,200);
//open second window
BrowserAPI::NewBrowserWindow(50,300,400,100,hWin2,WND_NORMAL,50,"gnu.org");
BrowserAPI::ShowBrowser(hWin2,true);
On some event, change Browser 2's URL
BrowserAPI::SetBrowserURL(hWin2, "somesite.com");
//execute a script function called StartFlash( ) on second Browser window.
BrowserAPI::ExecJavascriptFn(hWin2, "StartFlash(5)" );
//close the first browser window
BrowserAPI::CloseBrowser(hWin);
```

Figure 4:
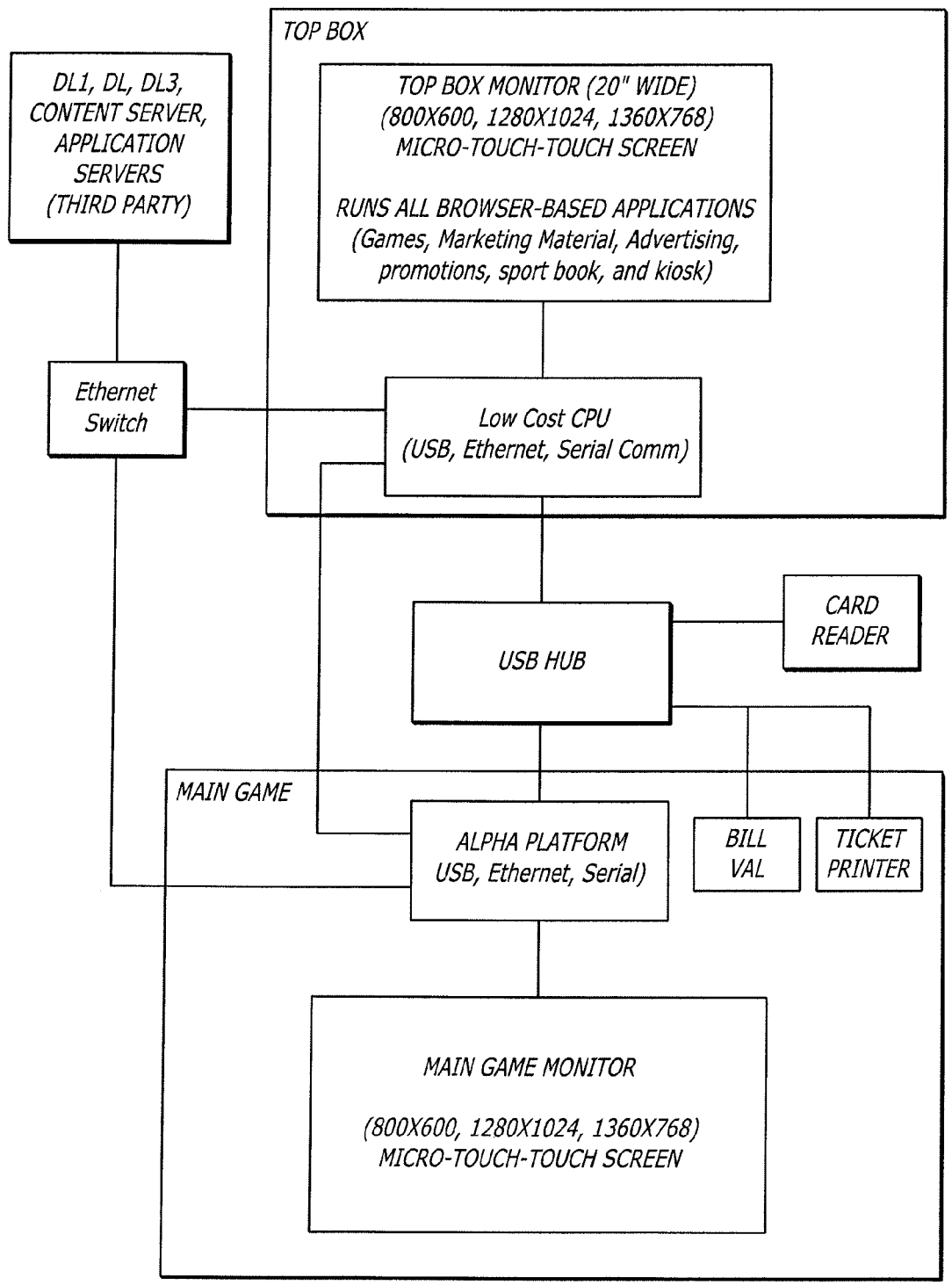
FIG. 4 is a block and logical flow diagram that displays various components inside a gaming machine and those components interconnect and communicate to each other and the servers.

Referring to FIG. 4 and FIG. 5, touch events are described. The OS reads the events for the primary monitor via the serial port. The Browser is expected to run on a secondary/top monitor, which may have a USB controller plugged into a USB port on the h/w. A USB touch server may be added to the OS that may read the touch events through the USB port and convey them to the BrowserSvr. The BrowserSvr may forward the events to the Mozilla libraries. An extension has been written to the Mozilla embedding library that may convert the touch event to a mouse event and send it to the appropriate browser window In one embodiment of the Browser Manager operating system True Type font is utilized. In one specific, non-limiting example, using Mozilla's XFT capability, smooth (anti-alias) True Type fonts can be displayed. Adding of True Type fonts to the OS Flash requires investigation into their licensing, since many True Type fonts are not freely redistributable. Bitstream Vera fonts may be included on the OS Flash(/usr/share/fonts/bitstream-vera) since they are free fonts and can be freely redistributed with any commercial software product.

During system boot up, detection of how many monitors are present is required. The starting of X windows will depend on this. G2S browser support classes that will communicate with G2S host(s) and with the BrowserSvr. Base G2S support is required as the transport medium and device registration for the browser class. Flash animations do not receive browser events. A flash to Javascript bridge API would be used to send data from the OS into the flash content. The Browser window opacity will be supported. This allows visibility through one or more windows to ones behind the others.

Browser Application System

In one embodiment of the Browser Manager operating system, a browser application system presents design considerations for Browser Manager 100. The Browser Manager 100 may control the Browser layouts and panels presented to the player in Browser windows on the Player Terminal (gaming machine 120). The technologies used for testing are open source, cross-platform.

Web Server: Apache

In another aspect of one embodiment, a web page scripting language with database connectivity is utilized; PHP (alternatives being ASP[Microsoft], JSP[Sun], and the like).

Database: MySQL or Microsoft SQL Server 2005

Browser Manager

Figure 5A:
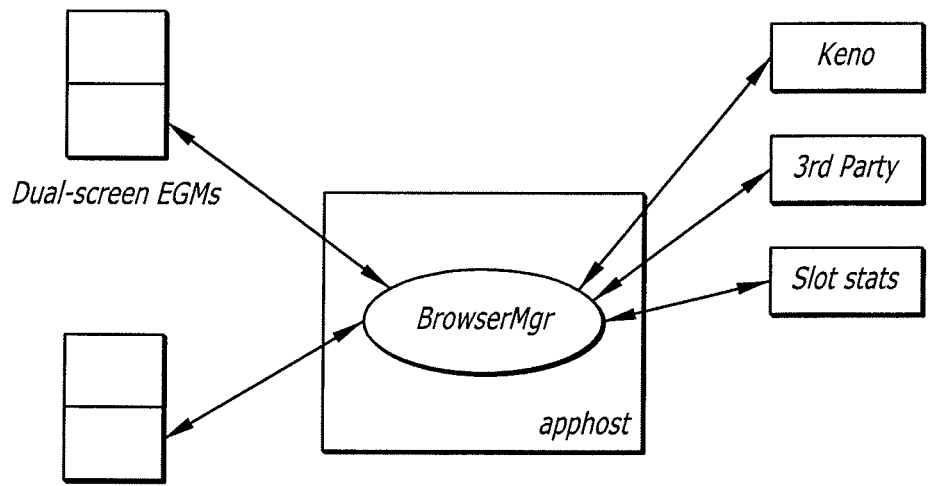
FIG. 5A illustrates a Browser Manager in communication with additional servers and with the Player Terminals on the floor.

The Browser Manager 100 is an application that sits on a host server, communicates with app/game/third party servers and with the Player Terminals on the floor. The Browser Manager 100 runs on a server 'apphost,' as shown in FIG. 5A.

If apphost/Browser Manager 100 is down, no Browser-based services may be available. Alternatively, it has a backup/redundancy system that may kick in when apphost goes down. The splash screen residing on the OS flash may be used when Browser Manager 100 is unavailable.

The apphost can keep a list of the application servers 110 in a table 'tblApps'. Adding an application server 110 for the first time could be done by the system administrator manually adding the record into the table (or through a flat file that could be then loaded into the table). During the addition process, the application/Game Servers would provide an offline page that may reside on the apphost, which Browser Manager 100 can use in the event the application/game host goes offline.

The information in the tblApps table may be periodically updated by the individual application/Game Servers by communicating with the Browser Manager 100. For example, if the keno server wanted to change the icon image or text representing it in the panel, it would send down the request to the Browser Manager 100 with an updated icon URL and text, and the Browser Manager 100 would update the record in the table.

The application/Game Servers and Player Terminals would send a Heartbeat message regularly to the Browser Manager 100 to let it know they are online and ready. The Browser Manager 100 would update its tables with online/offline statuses accordingly. The Browser Manager 100 may be implemented as a Windows application, or cross-platform[Java] with database connectivity.

Location of Applications

| | |
|---|---|
| Database: | appsdb. |
| TABLE: | tblApps |
| AppID and AppName: | Unique id and name assigned to application. |
| Description | Description of the application. |
| AppHost | Address to communicate with the application host. |
| IconImg and IconTxt | Icon image and text that are used to represent the application in the Panel. The icon image could live on the application/Game Server. |
| OfflineIconImg | In case the application/Game Server is down, a fallback icon image on the apphost. |
| AppURL | URL that points to the live application. |
| OfflinePage | In case the application/Game Server is offline, use this page to indicate offline status. |
| Status | Bit indicating whether application/Game Server is online. |

| App ID | App Name | Description | App Host | IconURL | Offline IconImg | IconTxt | AppURL | Offline Page | Online |
|---|---|---|---|---|---|---|---|---|---|
| 0 | Casino Services | Services offered by resort | svcshost: 3200 | svcshost://img/services.gif | apphost:/Services_offline.gif | Casino Services | svcshost://services.html | apphost:/Services_offline.html | Y |
| 1 | Keno | Browser based Keno | Kenohost: 3200 | kenohost://img/kenoicon.gif | apphost:/keno_offline.gif | Play Keno | kenohost://keno.php | apphost:/keno_offline.html | Y |
| 2 | Bingo | Browser based Bingo | Bingohost: 3300 | bingohost://img/bingoicon.gif | apphost:/bingo_offline.gif | Play Bingo | Bingohost://bingo.cgi | apphost:/bingo_offline.html | Y |
| 3 | Tournament | | Tnmthost: 3310 | tnmthost://img/tournament.gif | apphost:/tourn_offline.gif | Play Tournament | tnmthost://tour.html | apphost:/tourn_offline.html | Y |
| 4 | Slot Stats | Statistics for slots | statshost: 3320 | statshost://statsicon.gif | apphost:/stats_offline.gif | Check Stats | statshost://stats.html | apphost:/stats_offline.html | N |
| 5 | PPV | PayPer View | Ppvhost | ppvhost://ppvicon.gif | apphost:/ppv_offline.gif | Pay Per View Video Clips | Ppvhost://ppvall.html | apphost:/ppv_offline.html | Y |

Storing some of the application/game's information in the Browser Manager's table and keeping it updated regularly, reduces the amount of data transferred from the Application/Game Servers every time the application/game is invoked on a Player Terminal (i.e., gaming machine 120).

Registration and Player Terminal (PT) Enrollment with Browser Manager

On Player Terminal (i.e., electronic gaming machine 120) startup, the Browser Manager 100 could send an enrollment (or registration) message to the Browser Manager 100 passing it information such as the primary game, IP address, the screen resolution the Player Terminal is in, and the Browser Space available. The Browser Manager 100 stores this in a table tblPTinfo. As time passes, if players insert their card into the Player Terminal, that card info can be entered in the PlayerID field.

TABLE 33

'tblPTinfo'

| | |
|---|---|
| PT ID, PT IP | PT identifier and IP address |
| PrimaryGame | Primary game on PT |
| ResX | Screen resolution X |
| ResY | Screen resolution Y |
| Browser SpaceW | Available Browser space width |
| Browser SpaceH | Available Browser space height |
| PlayerID | Player ID if available |
| Online | Is PT online |

Description: This table is used to keep track of the Player Terminals on the floor and the state that they are in.

pages with multiple images are needed, then custom php scripts could be written and entered into a table as shown below. The scripts could also read in the resolution of the Player Terminal and generate pages with different sized images.

Table 34: Tblgamepaytables

Description: This table is managed by the system administrator and is used to associate primary games with paytable graphics for the secondary screen.

GameID: Identifier to the Player Terminal's primary game. Used for mapping to paytable graphics on the secondary screen.

PrimaryGame: Name of the Player Terminal's primary game.

Script: Active script that presents the primary game related content (e.g. paytables) on the secondary screen.

Image: A primary game image for use with a generic script (glass.php) that just displays one image in an HTML page.

| GameID | PrimaryGame | Script | Image |
|---|---|---|---|
| 1 | FourAlarmBonus | glass.php | images/fabpaytable.gif |
| 2 | Blazing7s | glass.php | images/b7paytable.gif |
| 3 | AuctionFever | auctionfever.php | |
| 4 | Poker | Poker.php | |

Example: If a Player Terminal with the FourAlarmBonus game is booted up.

Figure 5B:
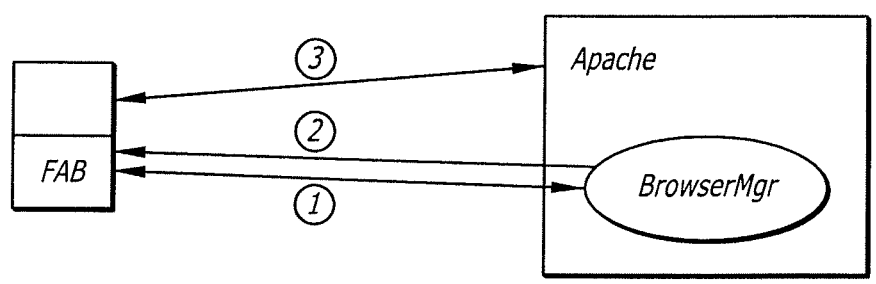
FIG. 5B illustrates the interaction of the Player Terminal and Browser Manager.

As shown in FIG. 5B, the interaction of the Player Terminal and Browser Manager is presented. (1): Player Terminal (PT) boots up. PT: Browser Manager sends an enrollment message

| PT ID | PT IP | PrimaryGame | ResX | ResY | Browser SpaceW | Browser SpaceH | Player ID | Online |
|---|---|---|---|---|---|---|---|---|
| 1 | 10.10.3.31 | AuctionFever | 800 | 600 | 800 | 600 | | Y |
| 4 | 10.10.3.55 | Poker | 1280 | 1024 | 1280 | 1024 | | Y |
| 20 | 10.10.3.43 | Roulette | 1360 | 768 | 1360 | 768 | | y |
| 50 | 10.10.3.20 | Blazing7s | 1024 | 768 | 1024 | 768 | | y |

The Primary Game information can be conveyed to the Dynamic Glass Server to display paytable or other graphics. The Dynamic Glass Server could use a collection of PHP scripts connected to a database and a set of images. In the most basic cases where the secondary display is just an HTML page with one image, and maybe some standard text, a generic script glass.php could be used. If more elaborate to the Browser Manager with information about itself e.g. Enroll(GameName, screen resolution, Browser space). (2): Browser Manager replies with a layout and a URL for the secondary display 1 0 70 100 30 0 BANNER apphost/glass.php?gameID=1 Browser Manager creates one Browser window and hands it the URL. (3): The Browser window loads apphost/glass.php, which looks up tblGamePayTables and generates the paytable page with the gif. Had it been the AuctionFever or Poker game that booted up, the Browser Manager would have replied with apphost/auctionfever.php. If the script was resolution dependant, then, for example, apphost/poker.php?ResX=1024&ResX=768.

In the atypical event, that a game does not have an entry in the tblGamePayTables table, a default banner URL could be sent.

Browser Layouts

In one embodiment of the Browser Manager operating system, Browser Layouts present a flexible scheme that may allow multiple and different screen layouts. The example below shows three sample layouts with the information stored in two tables (tblPanes and tblLayouts).

Table tblPanes contains a list of the pane configurations used with x,y,w,h values in percentages. Translation to pixels may be done on the individual Player Terminals, which could have different resolutions under different games.

Table tblLayouts contains the layouts with each pane in the layout as a separate row. Panes of type PANEL indicate which pane the result of the panel selections may be shown in. For example, in the table below, Pane 2 contains the Panel, and its child is Pane 1. Therefore, any windows controlled by the Panel are defined to appear in Pane 1.

Sliding/Popup Windows

In some embodiments of the Browser Manager operating system, to avoid having to resize panes, windows and content, popup windows could be used. In this regard, consider several Player Terminals on the floor showing paytables on the secondary screen. A department at the resort (gaming/dining/entertainment) works on a promotion and creates a page (W:800, H:200), that it needs to display at the top/bottom of the second screen. It can request the Browser Manager 100 to show a popup window for all/a selection of Player Terminals. The Browser Manager 100 sends the command down to the Player Terminals, which show the popup window with the promotional URL in a Browser window. This window can start flattened on one axis and expands steadily in size in about 1-2s, until it reaches the final size (800,200). A smooth transition like this would be less visually jarring, than having a popup window suddenly show up on screen. The Player Terminal: Browser Manager 100 would control the window resizing between the initial and final window sizes. Having browser window transparency may be good to use for popups too.

Screen Resolutions

In one embodiment of the Browser Manager operating system, the presence of Player Terminals with different

| A few Example screen layouts -> | | | | | 0 | | 1 | | 3 | 4 |
|---|---|---|---|---|---|---|---|---|---|---|
| | | | | | | | 2 | | 5 | |
| | | | | Full screen Splash/Banner | | 1: App/Game 2: Panel | | 3: App/Game 4: Panel, 5: Banner/Ad | | |
| Table: tblLayouts | | | | Table: tblPanes (values in percentages) | | | | | | |
| LayOutID | PaneID | Type | ChildPaneID | PaneID | X | Y | W | H | | |
| 0 | 0 | | | 0 | 0 | 0 | 100 | 100 | | |
| 1 | 1 | | | 1 | 0 | 0 | 100 | 70 | | |
| 1 | 2 | PANEL | 1 | 2 | 0 | 70 | 100 | 30 | | |
| 2 | 3 | | | 3 | 0 | 0 | 70 | 80 | | |
| 2 | 4 | PANEL | 3 | 4 | 70 | 0 | 30 | 80 | | |
| 2 | 5 | | | 5 | 0 | 80 | 100 | 20 | | |

Adding a new layout means adding new or reusing existing panes in the 'tblPanes' table, and then making the appropriate entries in the 'tblLayouts' table. If there is no panel in the new layout, the Type fields may be blank. A GUI tool could be developed that allows the system administrator to create, edit, and manage layouts in the database.

Dynamic layouts, as opposed to the static layouts mentioned above are considered within the scope of the disclosed embodiments. For example, in a one pane layout, say a second, or third pane and windows are to be added for marketing/promotional purposes. Dynamic panes and layouts sound appealing and would render tblPanes unnecessary. However, as the panes grow and shrink, the Browser windows wouldn't automatically resize images. The above assumes that there may be one rectangular region dedicated for Browsers, divided up into panes. There may be instances where there is no such dedicated region, and Browser windows may be shown at any location; such as a single widescreen, with a couple of Browser windows displaying promotions, at arbitrary locations.

screen resolutions needs to be taken into account when dealing with content and layouts. The content can be designed to take up all available Browser space, but there is no inherent capability of a Browser to scale content. For example, a game with graphics for an 800×600 window may not be automatically scaled by the Browser to larger graphics in a 1280×1024 window. However, the html could be altered at source to display a scaled image.

Figure 5C:
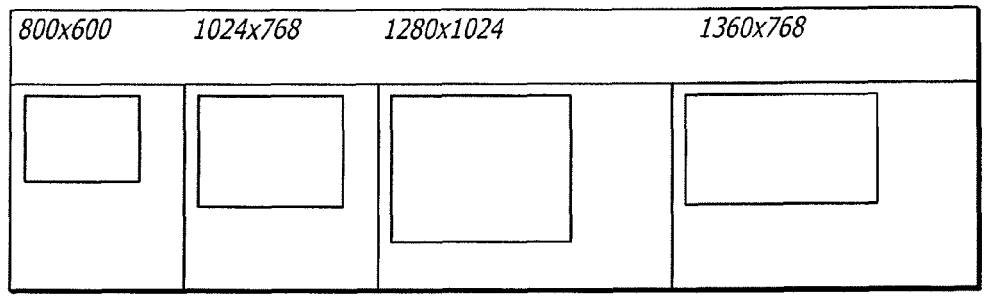
FIG. 5C illustrates possible screen resolutions with relative sizes shown to scale.

Possible screen resolutions are shown in FIG. 5C. Relative sizes are to scale.

Browser content developers may need to design their content to utilize Browser space efficiently. Banners/Splash screens can be easily designed for multiple resolutions using HTML elements. However, displaying fixed width content like Flash games may be less straightforward. An option may be to develop games with different resolutions and have the Browsers load the appropriate resolution games.

Custom Panels

Figure 5D:
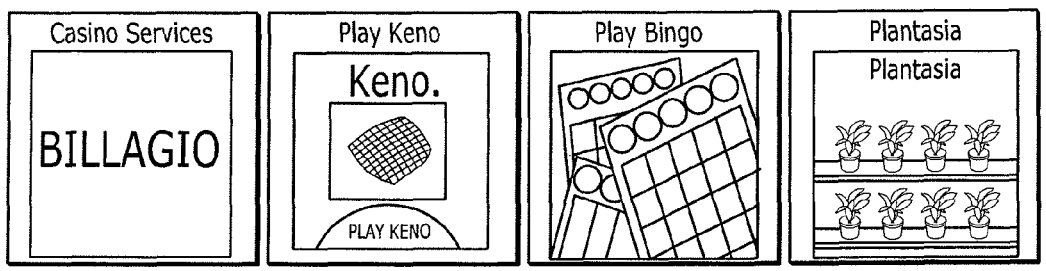
FIG. 5D illustrates a generated web page with buttons and embedded JavaScript, in response to the Browser Manager pulling up the icon and URL information for the specified applications.

To generate a custom panel, a PHP script could be used that takes application names as arguments, connects to the applications database, pulls up the icon and URL information for the specified applications from tblApps, and generates a web page with buttons and embedded Javascript; which the Browser may then display on the Panel window, as shown in FIG. 5D.

URL(apphost://apps.php?NumApps=4&App1=Casino%20Services&App2=Keno&App3=Bingo&App4=Plantasia)

Figure 5E:
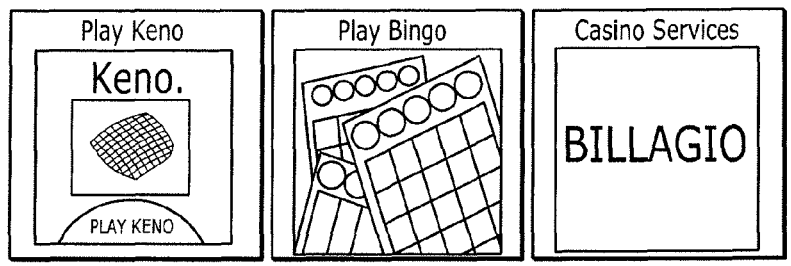
FIG. 5E illustrates a generated web page with buttons and embedded JavaScript, in response to the Browser Manager pulling up different URL information.

If it was a different player with a different set of games, or some other reason, the Browser Manager 100 could send down a different URL, as shown in FIG. 5E.

apphost://apps.php?player=123456&NumApps=3&App1=Keno&App2=Bingo&App3=Casino %20Services resulting in a different panel as shown in FIG. 5E.

The script also handles dimensions of buttons, background and the like. When the player chooses an application by selecting the application button, there needs to be some way of depicting that, which is the currently selected application. Non-limiting examples include either by showing the button in a depressed state or a different color and the like.

Players would be identified by their ID/Tracking number, if present. To determine what options are to be presented to the player, there needs to be some mapping of Player ID to applications (e.g., through a table).

Mapping Layouts to Content

In one embodiment, the Browser Manager 100 needs to map content URLs to layouts. There is a standard predefined sequence of layouts and content URLs presented. Alternatively, the layout may it be dynamic, player, and preferences based.

Startup

For example, on a Player Terminal (ID-20) startup, the Browser Manager 100 could send a default Banner URL

| Numwindows | | | | | | |
|---|---|---|---|---|---|---|
| x | y | w | h | z | type | url |
| 1 0 | 70 | 100 | 30 | 0 | BANNER | apphost/welcome.php |

This banner/splash would be server driven and employ client-pull or server-push techniques to display different paytable/promotional/marketing web pages. Normally, a browser window is told to open to a specific URL and then the client window pulls the content down using HTTP POST or HTTP GET function calls. The push function may also be used by a third party server to fire Javascript functions on the HTML page.

Initiating Browser Applications

In one embodiment of a Browser Manager operating system, a browser application is initiated in response to some event (e.g., player inserts card/player inserts money/some event at host). Through some logic, (e.g., a rule-based system that determines the screen space negotiation) the Browser Manager 100 decides or is instructed to use Layout 1 and present four applications in the panel. A specific, non-limiting example of the panel URL is as follows:

apphost://apps.php?NumApps=4&App1=Casino%20Services&App2=Bingo&App3=Keno&App4=SlotStats The Browser Manager 100 looks up Layout1 in tblLayouts, sees that there is a panel defined, and for each application, defines a separate window in the child pane. So for four applications, it opens up four stacked windows in the child pane, with the application URLs pulled up from tblApps. If the Game/Application Server 110 is offline, the Browser Manager 100 sends the offline URL.

Figure 5F:
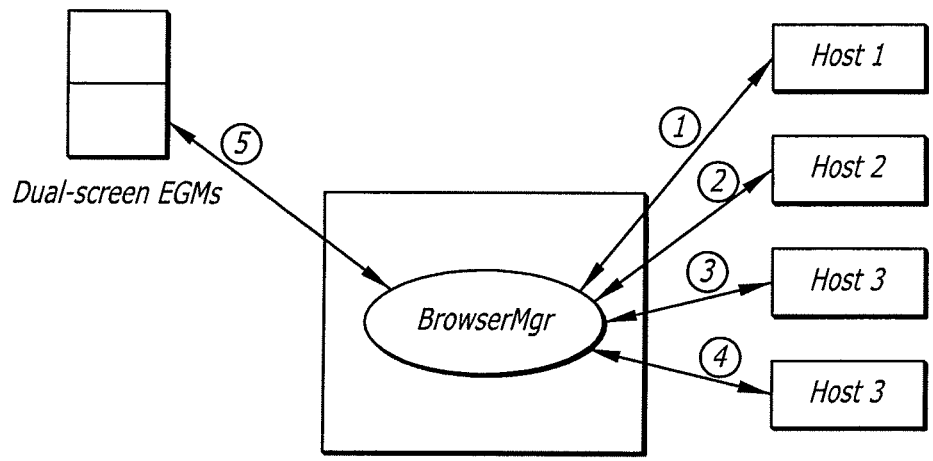
FIG. 5F illustrates the Browser Manager looking up a layout from multiple hosts.

As shown in FIG. 5F, the Browser Manager 100 looks up a layout as follows: (1). Browser Manager asks Host1 (CasinoServices) if it is up. Response Y. (2). Browser Manager asks Host2(Bingo) if it is up. Response Y. (3). Browser Manager asks Host3(Keno) if it is up. Response Y. (4). Browser Manager asks Host4(SlotStats) if it is up. No Response Browser Manager marks SlotStats record in database as offline. (5). Browser Manager forms message with layout and URLs and sends to Player Terminal: Browser Manager.

In this example, of the four stacked application windows, the first three would be live URLs pointing to the application/Game Servers. The fourth window for the offline applications (SlotStats) would show the predefined offline page for SlotStats.

| Numwindows | | | | | | |
|---|---|---|---|---|---|---|
| x | y | w | h | z | type | url |
| 5 0 | 70 | 100 | 30 | 10 | PANEL | apphost://app.php?player=123456&NumApps=4&App1=Casino%20Services&App2=Bingo&App3=Keno&App4=SlotStats |
| 0 | 0 | 100 | 70 | 10 | PANEL_CHILD1 | svcshost://services.php?player=123456 |
| 0 | 0 | 100 | 70 | 0 | PANEL_CHILD2 | bingohost://bingo.cgi |
| 0 | 0 | 100 | 10 | 0 | PANEL_CHILD3 | kenohost://keno.php |
| 0 | 0 | 100 | 70 | 0 | PANEL_CHILD4 | apphost://stats_offline.html |

In one embodiment of a Browser Manager operating system, the panel window would execute apphost://apps.php, which would present the application buttons in a customized web page. If the player is identified through their player card, the player's info, pulled up from the Player Tracking database could also be used for custom, player-specific presentations in the Browser windows. Browser Manager 100 would keep track of sessions and Browser windows through the tables 'tblSession' and 'tblSessionApps'.

TABLE tblSession

Session ID: Unique session identifier
PT-ID: PT the session was played at
Start-Time: Time the session began
End-Time: End time of session
Layout-ID: Layout used in session

| Session-ID | PT-ID | PlayerID | Start-Time | End-Time | Layout-ID |
|---|---|---|---|---|---|
| 1 | 4 | | Apr. 3, 2006 11:25 am | | 1 |

TABLE-continued tblSession

Session ID: Unique session identifier
PT-ID: PT the session was played at
Start-Time: Time the session began
End-Time: End time of session
Layout-ID: Layout used in session

| Session-ID | PT-ID | PlayerID | Start-Time | End-Time | Layout-ID |
|---|---|---|---|---|---|
| 2 | 1 | | Apr. 3, 2006 12:25 pm | | 1 |
| 3 | 20 | | Apr. 2, 2006 8:00 am | | 0 |

TABLE tblSessionApps

Session ID: Unique session identifier
AppName: Name of application
SessionWnd-ID: Zero based ID assigned to window
Game ID: If available, a unique GameID obtained from the app/Game Server
Z-Level: The Z level the window is currently at
Following example shows entries for 3 Player Terminals:
Session 1 with panel and 4 apps,
Session 2 with panel and 3 apps,
Session 3 with one banner window.

| SessionID | AppName | SessionWnd-ID | Z-Level | GameID |
|---|---|---|---|---|
| 1 | PANEL | 0 | ACTIVE_Z | |
| 1 | Casino Services | 1 | ACTIVE_Z | |
| 1 | Bingo | 2 | 0 | |
| 1 | Keno | 3 | 0 | |
| 1 | SlotStats | 4 | 0 | |
| 2 | PANEL | 0 | ACTIVE_Z | |
| 2 | Casino Services | 1 | ACTIVE_Z | |
| 2 | Bingo | 2 | 0 | |
| 2 | SlotStats | 3 | 0 | |
| 3 | BANNER | 0 | ACTIVE_Z | |

[e.g. ACTIVE_Z = 100 INACTIVE_Z = 0]

Application Comes Back Online

In one embodiment of a Browser Manager operating system, when SlotStats comes online again, it sends a Register message to apphost/Browser Manager 100. The Browser Manager 100 performs a handshake, and may exchange some data with SlotStats. It updates the Status field in the 'tblApps' table; searches the 'tblSessionApps' table, finds all instances of SlotStats, and sends a LoadURL message for the appropriate windows for each of those Player Terminals. For example:

10.10.3.31 LoadURL(4 statshost://stats.html)
10.10.3.55 LoadURL(3 statshost://stats.html)

Application Goes Offline

In the reverse situation where the applications have been loaded in ready state and one of them goes down, a similar process takes place. The Browser Manager 100 expects a Heartbeat from each application regularly. However, if SlotStats goes down, then the Browser Manager 100 gets no Heartbeat from SlotStats a few times in succession. In response, the Browser Manager 100 updates the SlotStats records in 'tblApps' table with Status 'Down/0', searches the 'tblSessionApps' table for all instances of SlotStats and sends the LoadURL message to each of the Player Terminals with the offline URL. For example:

10.10.3.31 LoadURL(4 apphost:/stats_offline.html)
10.10.3.55 LoadURL(3 apphost:/stats_offline.html)

Application Selection/Switching

In another embodiment of a Browser Manager operating system, when the player presses a button on the panel, that application's window is raised in the child panel, and the other windows are sent behind it or made invisible. This allows easy, fast switching between applications. This can be done by the Javascript function attached to each button, sending a message to the Browser Manager 100.

For example, if on Player Terminal ID-1, the keno button was pressed, the Javascript function attached to the button would send a message like 'Keno/App2 selected'. The Browser Manager 100 would receive the message, lookup the mapping of the appname/appID(Keno/2) to Browser window for Player Terminal ID-1 in the tblSessionApps table, and see that the keno window's ID is three. It would raise the keno window's Z level to ACTIVE_Z and lower the Z level for the other child windows.

TABLE 35 tblSessionApps

| SessionID | AppName | SessionWnd-ID | Z-Level | GameID |
|---|---|---|---|---|
| 1 | PANEL | 0 | ACTIVE_Z | |
| 1 | CasinoServices | 1 | 0 | |
| 1 | Bingo | 2 | 0 | |
| 1 | Keno | 3 | ACTIVE_Z | 1234 |
| 1 | SlotStats | 4 | 0 | |

A message is then sent to the Browser Manager 100 on the Player Terminal ID-1 to raise the window id:three, or hide the other windows.

10.10.3.31 SetZOrders (3 ACTIVE_Z   1 INACTIVE_Z 2 INACTIVE_Z 4 INACTIVE_Z)

Multiple Browser Windows Per Application

In an embodiment, browser applications may be able to perform all foreseen operations within a single browser window using various web technologies like DHTML, and the like. There are cases where a browser application may find the need to open a new browser window to display a message like a promotion, a win, and the like. The Browser Application designers will need to define whether they can do it with just one window or multiple windows.

However, for now, to accommodate the possibility that an AppServer may need to open multiple browser windows, we may consider that each AppServer may maintain a sequential list of window Ids. On the Browser Manager side, the table tblSessionApps may contain a mapping of the application's windowIDs (AppWndID) and the session's windowIDs (SessionWndID). For example, the keno application, may open a new window (ID:1) with Z-order 10 at a later stage. The Browser Manager 100 adds that window to the tblSessionApps table and assigns it the next available ID (e.g. 5). For keno's third window, the Browser Manager 100 would assign ID 6, and so on.

TABLE 36 tblSessionApps

| SessionID | AppName | Session WndID | Z-Level | App WndID | GameID |
|---|---|---|---|---|---|
| 1 | PANEL | 0 | ACTIVE_Z | 0 | |
| 1 | Casino Services | 1 | 0 | 0 | |
| 1 | Bingo | 2 | 0 | 0 | |
| 1 | Keno | 3 | ACTIVE_Z | 0 | 1234 |
| 1 | SlotStats | 4 | 0 | 0 | |

TABLE 36-continued tblSessionApps

| SessionID | AppName | Session WndID | Z-Level | App WndID | GameID |
|---|---|---|---|---|---|
| 1 | Keno | 5 | ACTIVE_Z + 10 | 1 | |
| 1 | Keno | 6 | ACTIVE_Z + 15 | 2 | |

When the player switches from keno to Bingo in the panel, all of keno's windows may have their z orders moved back.

Third Party Browser Based Game Play

In one embodiment of a Browser Manager operating system and method, when the player starts a game (e.g. by pressing a button on the keno page), the page requests a game from the Game Server. The Game Server requests approval from the Transaction Manager. The Transaction Manager in turn queries the Player Terminal (OS-gamemgr) for credits. If the Player Terminal has the credits, it deducts the credit meter and sends a response (ACK/yes) to the Transaction Manager. The Transaction Manager records the transaction in its database and sends the approval message to the Game Server.

The Game Server starts a game and sends a StartGame message with the GameID (e.g., 1234) to the Browser Manager 100. The Browser Manager 100 records the GameID in the tblSessionApps table. This allows the Browser Manager 100 to resume the game, if the player cashes out before seeing the game complete, and returns at a later time. When the game is completed, the game server sends an EndGame message with the GameID. The Browser Manager 100 erases the GameID field of that session.

Figure 5G:
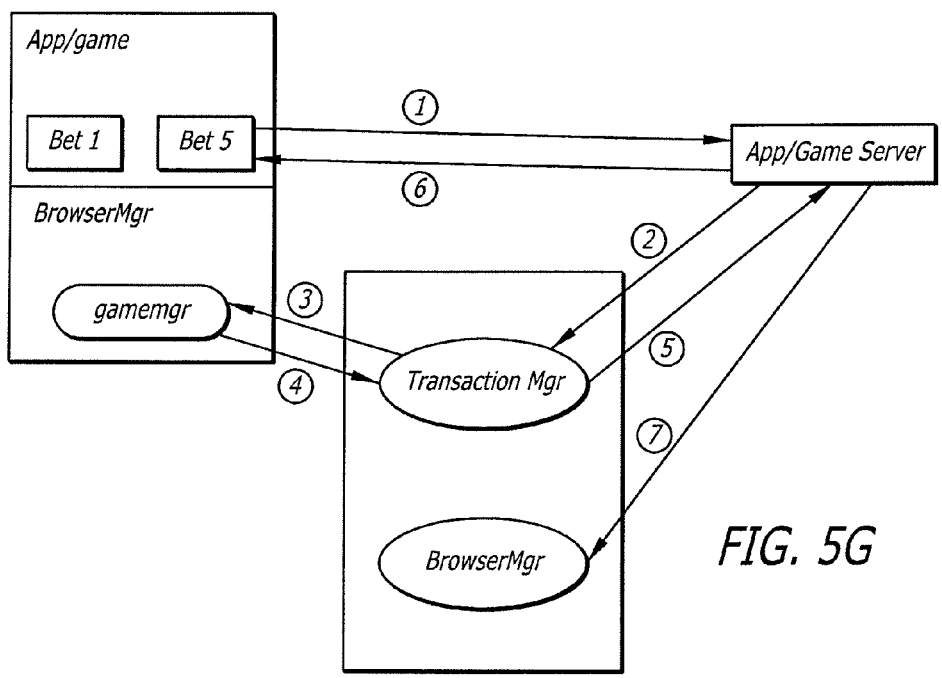
FIG. 5G illustrates the Game Server initiating a game with the Browser Manager and the Transaction Manager.

As shown in FIG. 5G, the Game Server initiates a game with the Browser Manager as follows: (1) Bet 5. Player hits a bet 5 button placing a wager/play a game. The message is sent to the originating Game Server. (2) Debit 5. The Game Server asks the Transaction Manager if the credits are available and claimed for game play. (3) Transaction Manager sends a message to the Player Terminal asking for 5 credits. (4) Gamemgr tries to deduct credits by 5 and sends status to Transaction Manager. (5) Transaction Manager records the transaction in its database and sends Y,N to Game Server. (6) Game Server either commences game or disallows it. (7) If game is started, GameServer sends GameID to Browser Manager 100 which records it in the table.

Alerting a Player Through the Panel

In one specific, non-limiting embodiment, the player is playing keno, makes a wager, and is waiting for the result. He switches to another application, for example News/Bingo. When the keno game needs to catch the player's attention, it may send a command via the Browser Manager 100, to red flash the keno button in the panel or something similar. This can be done by a Javascript function on the page that changes the background color of the specified button in a pre-specified color loop.

For example, there may be an event at the Keno Application Server that needs the attention of all the Player Terminals playing keno. The players may not have the keno screen active at that moment. The keno server sends a message to the Browser Manager 100 requesting the attention of players who may not have the keno window active.

The Browser Manager 100 looks through its tblSessionApps table, and for every Player Terminal that has its keno application at an INACTIVE_Z, sends a message containing the appID, to Browser Manager 100 to execute a generic JavaScript function on the page. The Javascript function may use the appID, match it to a button, and could flash that button in red.

The Player sees the flashing keno button in the panel, clicks on the keno button and sees an updated keno page. The button stops flashing when it is clicked. Another approach could be to use an animated gif instead of the colors changing.

Using this technique, multiple application/game servers can send messages through Browser Manager 100 to red flash their applications on the panel. For less urgent alerts, different colors (green/yellow) could also be used.

Session Termination

To end a player's sessions, in response to some event (e.g., player cashing out, player taking card out, host determined event), the Browser Manager 100 may send a new layout to the Player Terminal, such as a Browser Manager 100 with just one window displaying a banner (e.g., a marketing screen on the top screen in Idle mode, with for example, "Coming Soon" titles).

| Numwindows | | | | | | |
|---|---|---|---|---|---|---|
| x | y | w | h | z | type | url |
| 1 0 | 70 | 100 | 30 | ACTIVE_Z | BANNER | apphost//welcome.php |

Referring now to a session termination event (e.g., cashout), the player may be asked if he would like to save his session. If player chooses "Yes," the session tables are updated with the end time. If the player has not been identified by PlayerID, the session identifier can be printed on a ticket. The ticket may be deemed good for a predetermined (30/60/ etc) number of days. If player chooses "No," the session entries may be deleted from the session tables.

Alternatively, if there is any game/application in use that is in a 'waiting for completion' state, the ticket may be printed. If there is no such game/application for which the player is waiting, the sessions may be ended without asking for player input. Further, the session entries from the session tables are deleted.

With respect to session resumption, when the player returns at a later time and inserts the ticket at any Player Terminal, the SessionID is read from the ticket, and sent to the Browser Manager 100. The Browser Manager 100 looks at the session tables, pulls the information for the session, and prepares a message to the Player Terminal with the Browser layout and URL information. If the player had been waiting for a game result when he cashed out; there should be a GameID for that game session in the tblSessionApps table. The Browser Manager 100 may include that GameID in the URL message. The Browser windows then load the URLs with GameIDs, pointing to the Game Servers. The Game Servers pull up the results for that game and present it in the Browser windows.

An example message for resuming a session: Suppose the keno game was in waiting mode when the session termination/cashout occurred. On resumption, the Browser Manager 100 would see a GameID is present for the keno session and include that in the keno URL.

| Numwindows | | | | | | |
|---|---|---|---|---|---|---|
| x | y | w | h | Z | type | url |
| 5 0 | 70 | 100 | 30 | 10 | PANEL | apphost://apps.php?player=123456&NumApps=4&App1=Casino%20Services&App2=Bingo&App3=Keno&App4=SlotStats |

-continued

| Numwindows | | | | | | |
|---|---|---|---|---|---|---|
| x | y | w | h | Z | type | url |
| 0 | 0 | 100 | 70 | 0 | PANEL_CHILD1 | svchost://services.php?player=123456 |
| 0 | 0 | 100 | 70 | 0 | PANEL_CHILD2 | bingohost://bingo.cgi |
| 0 | 0 | 100 | 70 | 10 | PANEL_CHILD3 | kenohost://keno.php?gameId=1234 |
| 0 | 0 | 100 | 70 | 0 | PANEL_CHILD4 | apphost://stats_offline.html |

In this example, the keno window is the active window, and its URL would contain the GameID from the last session. The keno server would look up its database for the results for that particular game and prepare a page with the results.

Messages in the Browser Application System

Figure 5H:
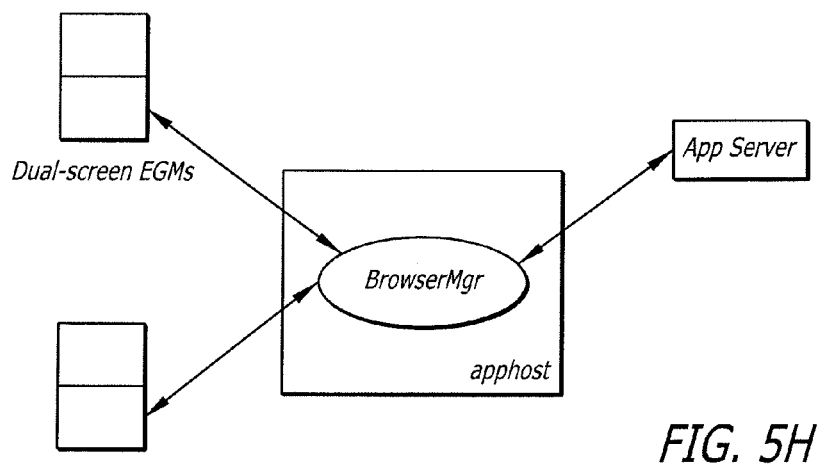
FIG. 5H illustrates the Browser Manager operating system and the messages used in the Browser application system between the Player Terminals, the Browser Manager, the Transaction Manager, and the AppServers.
Figure 6:
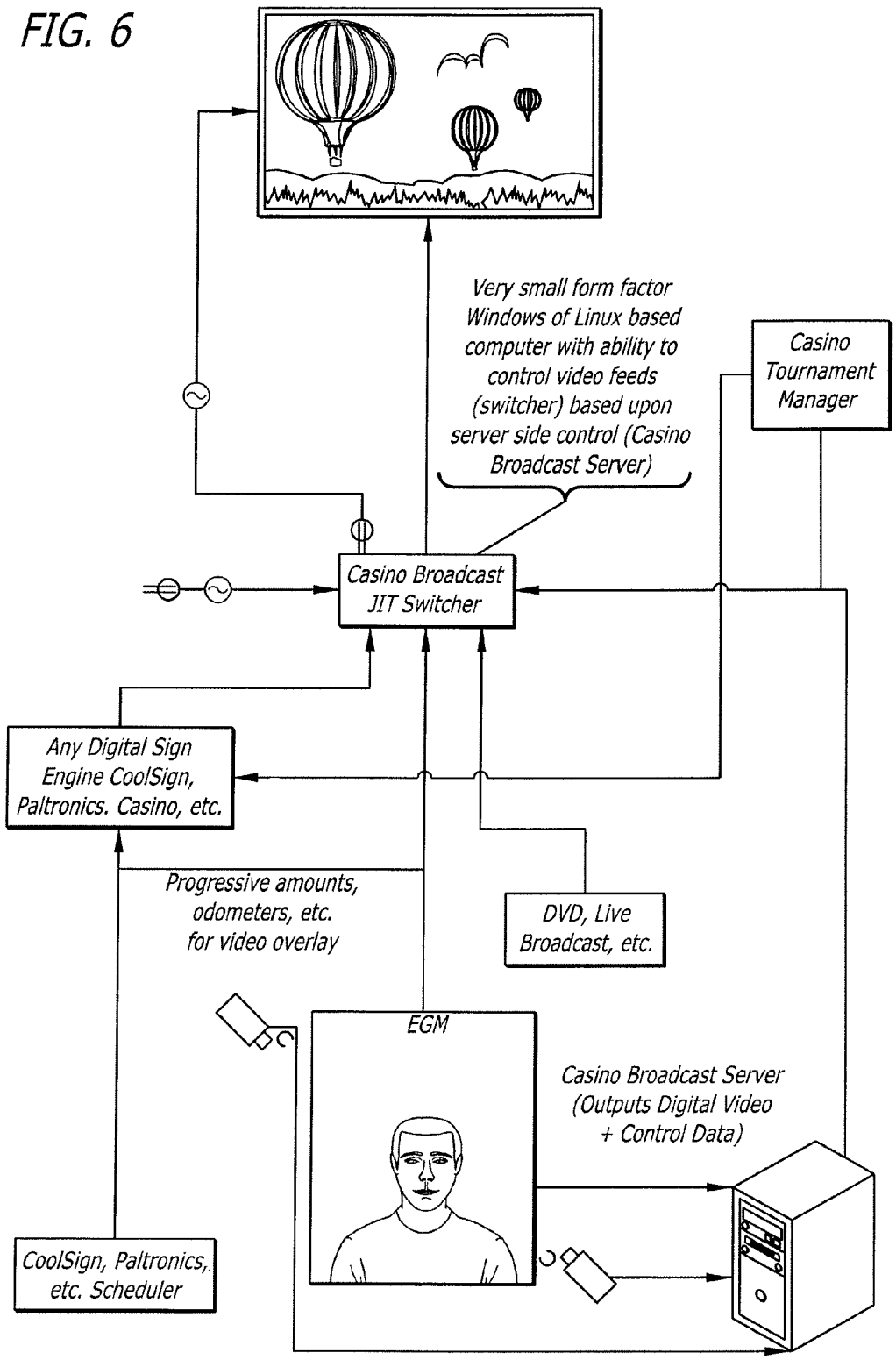
FIG. 6 illustrates a block diagram of a preferred broadcast server and its interconnections to the electronic gaming machine, overhead signage, and the tournament manager server.
Figure 7:
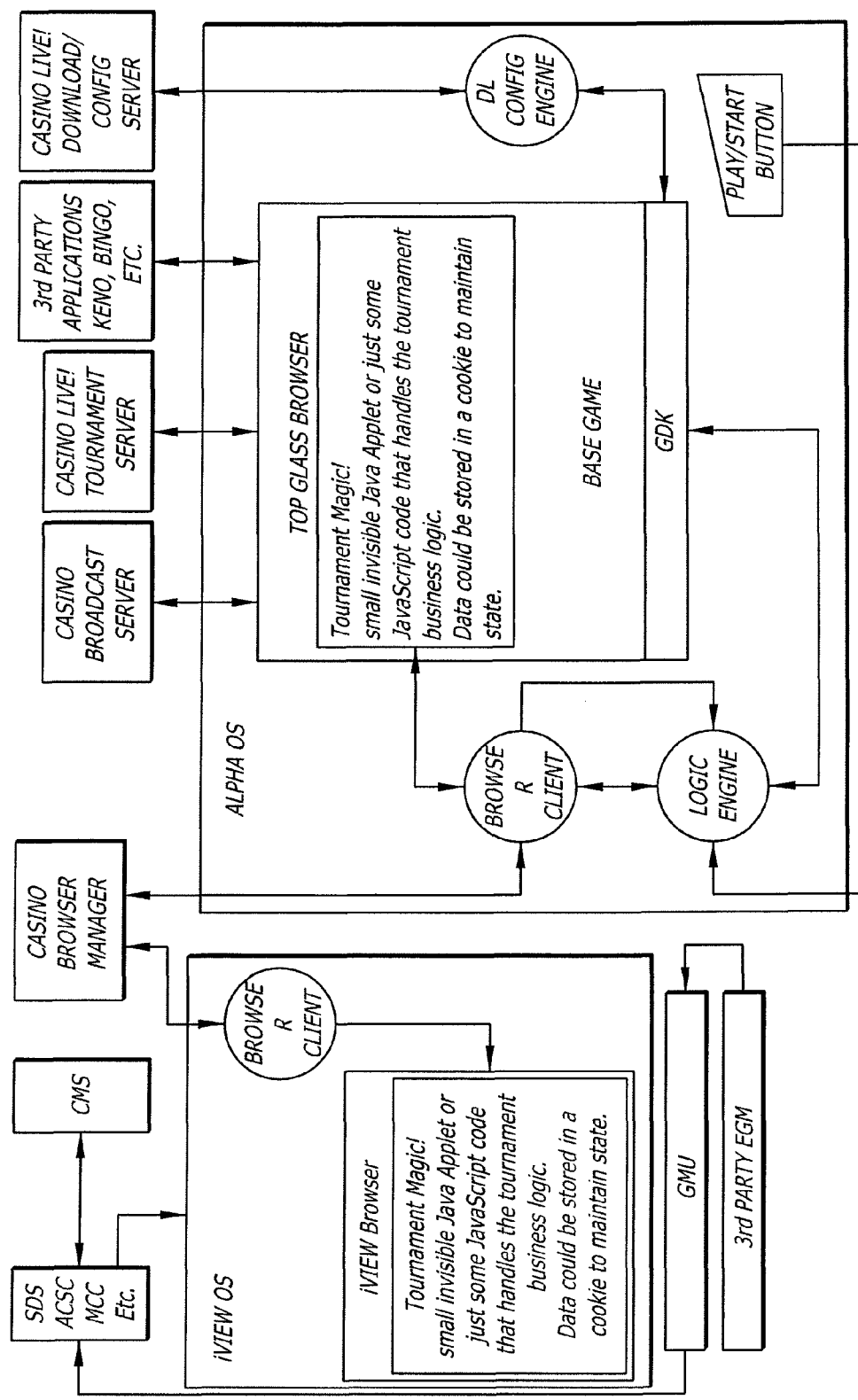
FIG. 7 illustrates a block diagram of the system and client components and the JavaScript bridge that enables communication between the gaming device OS and the Browser page without going through the G2S browser class, which allows for direct and nearly instantaneous updates of the browser screen without having to do round trips to the server.
Figures 1, 8:
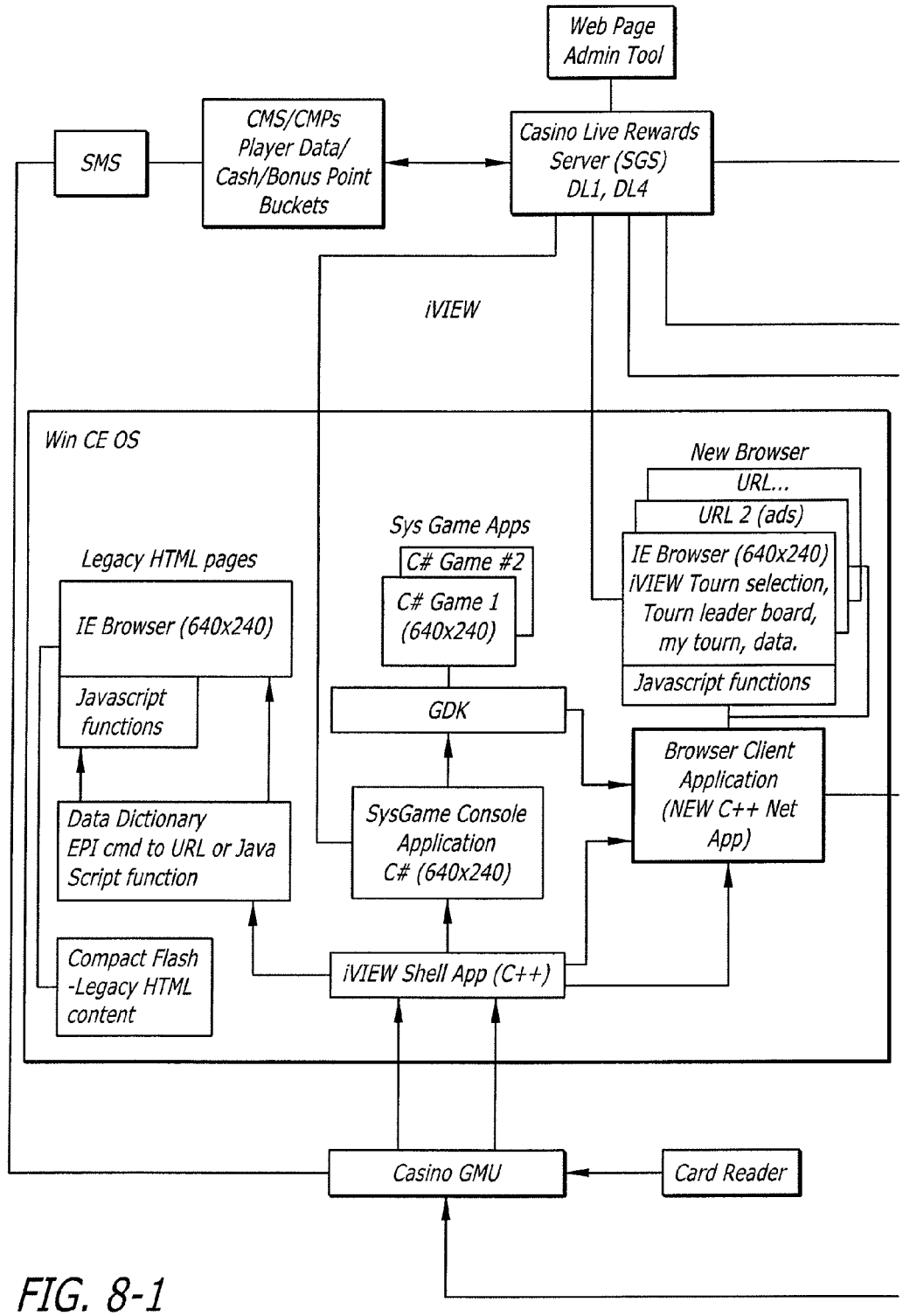
Figures 2, 8:
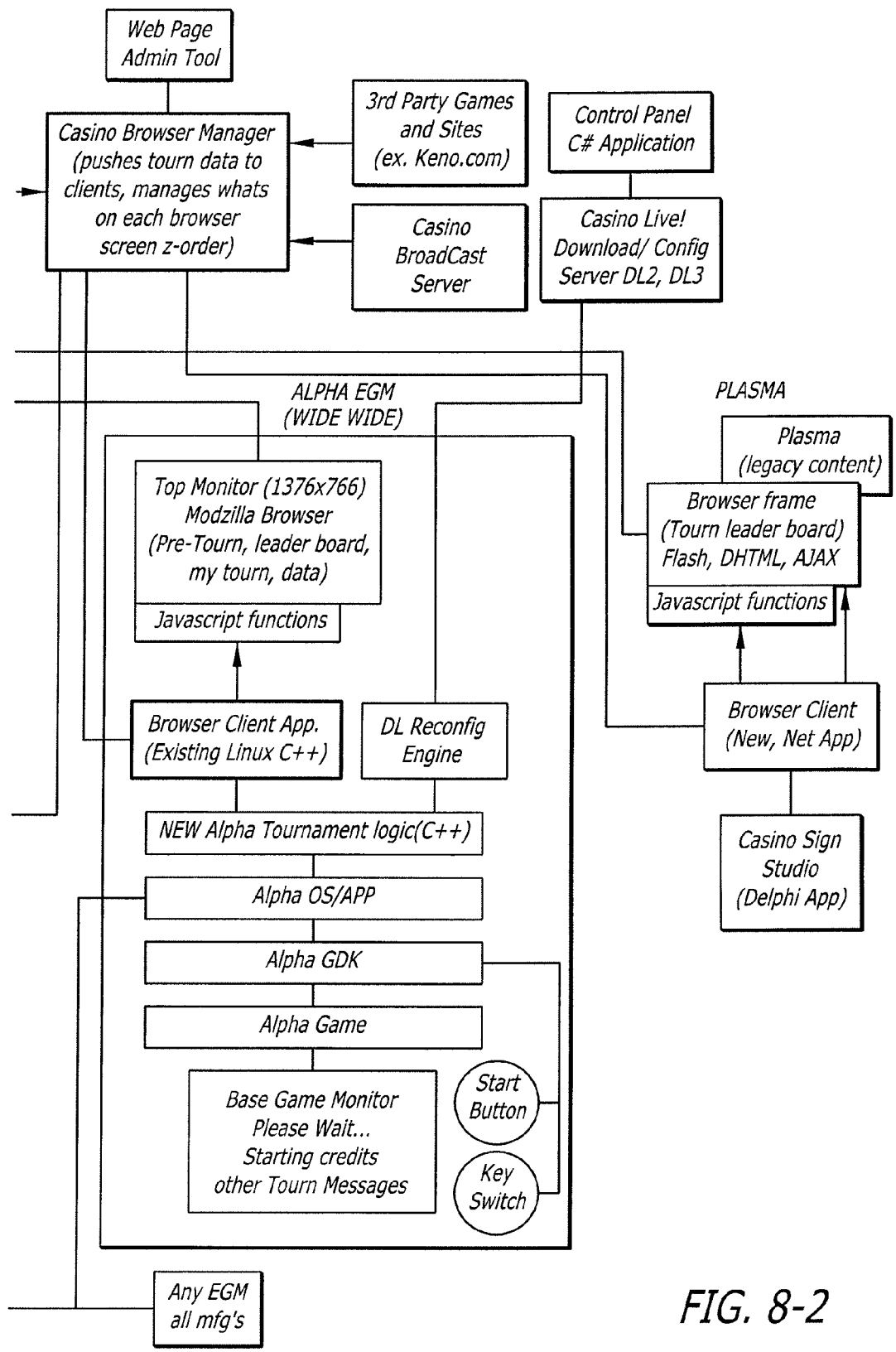
Figure 9:
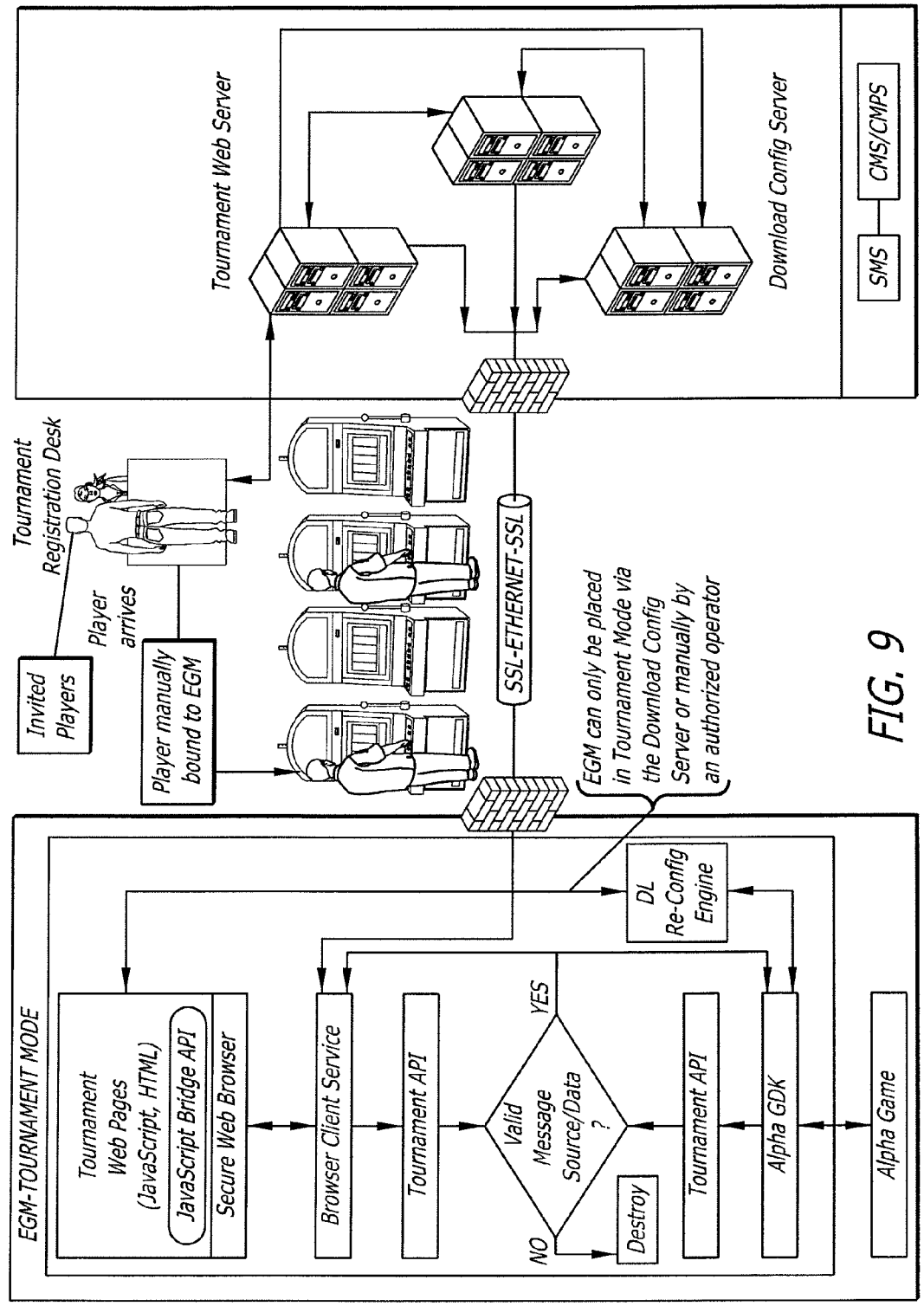
Figures 1, 10:
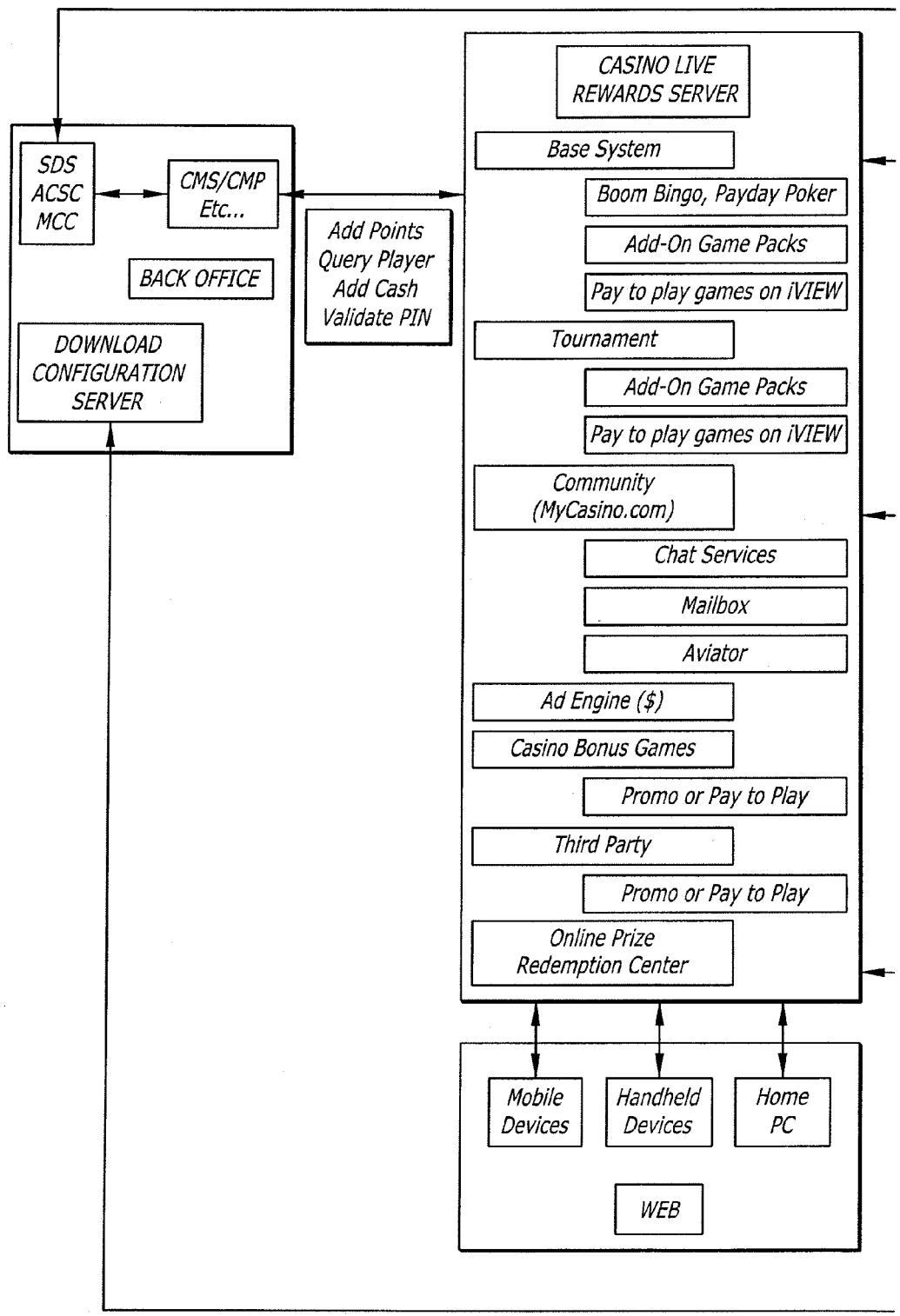
Figures 2, 10:
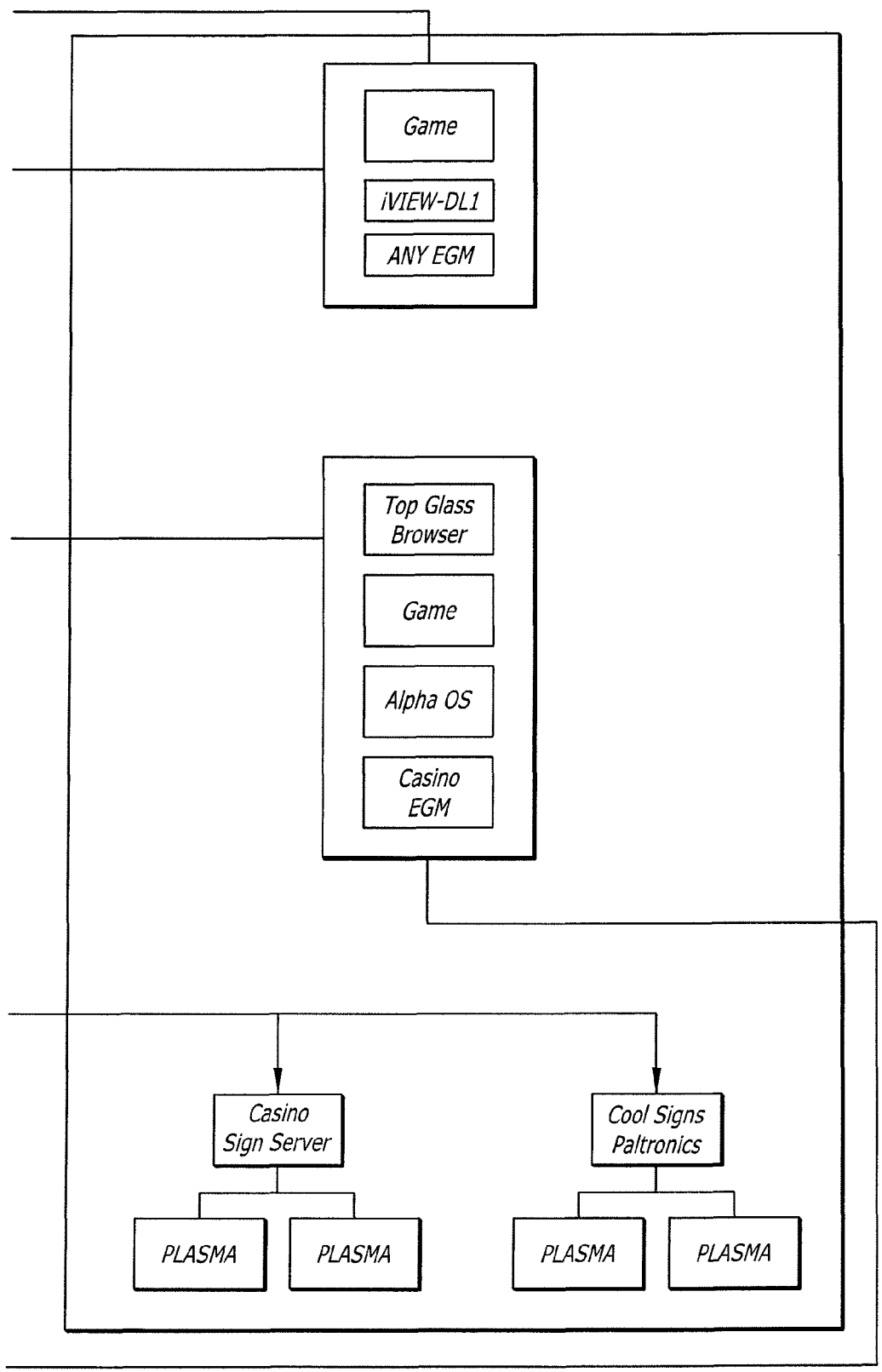
Figures 1, 11:
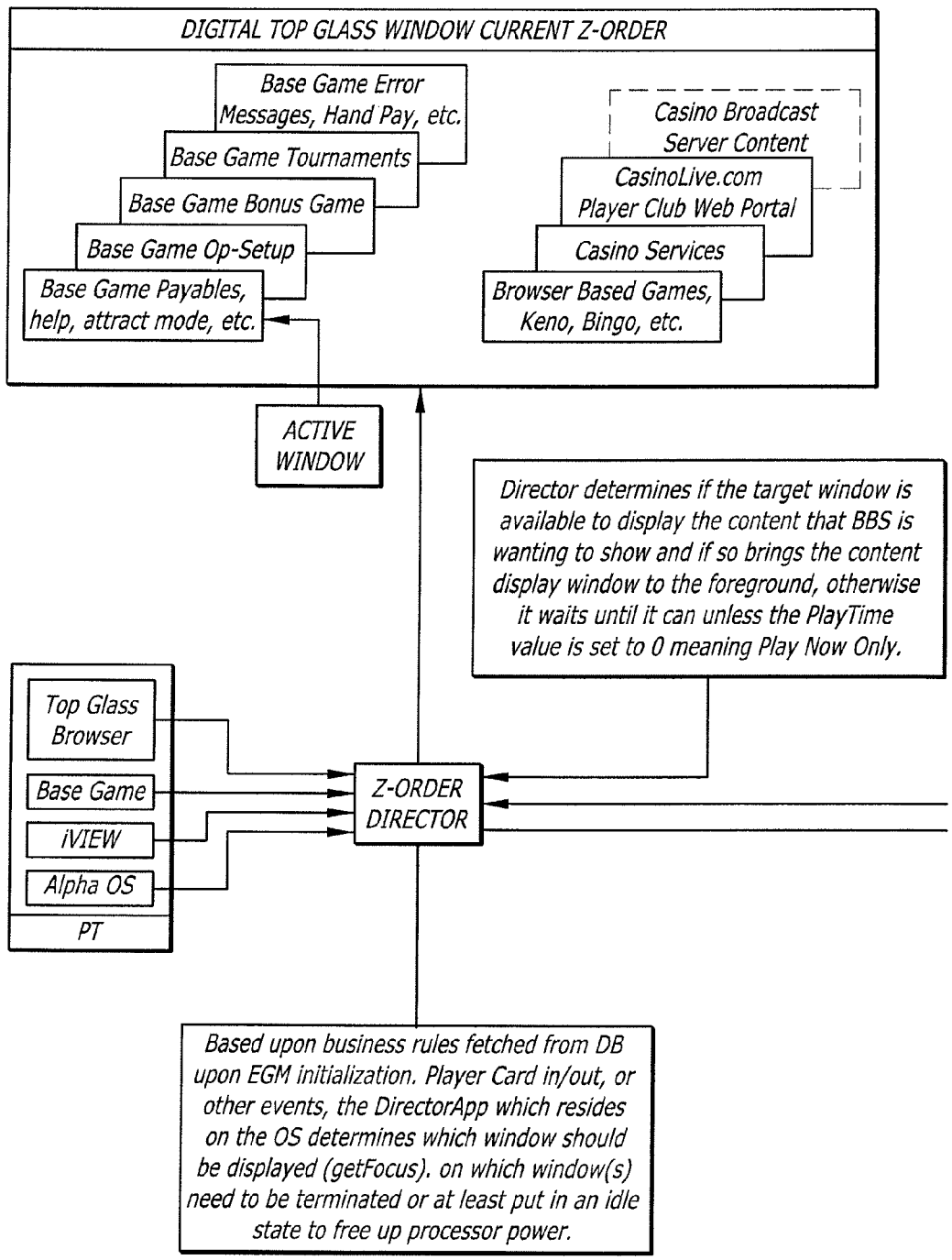
Figures 2, 11:
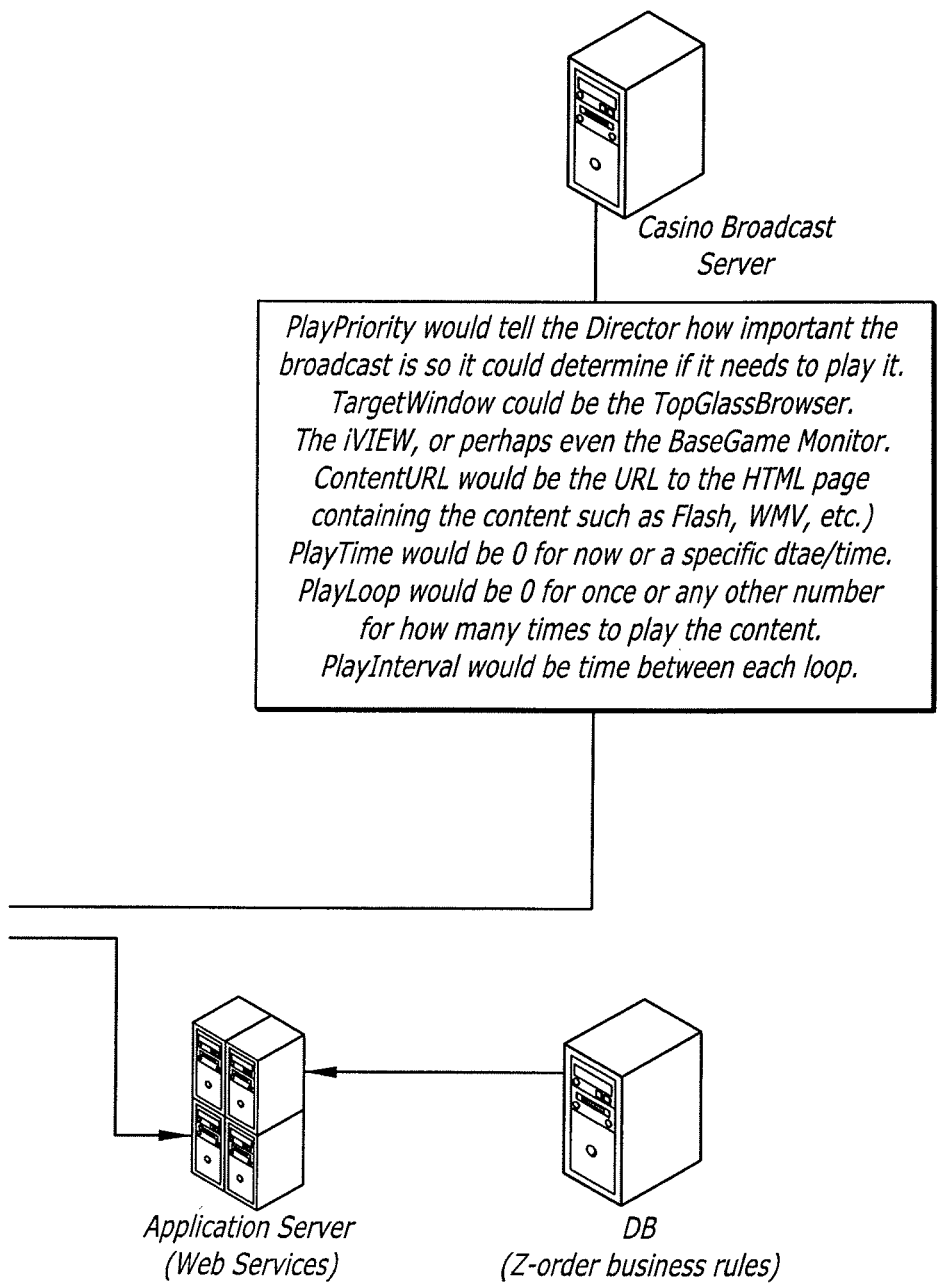

As shown in FIG. 5H, in another aspect of the Browser Manager operating system outlines the messages used in the Browser application system between the Player Terminals, the Browser Manager 100, Transaction Manager, and the AppServers. Where applicable, the messages may allow multiple target items to be affected, to facilitate more effectiveness per message and less messaging traffic.

Player Terminal to Browser Manager Messaging—Register

In one embodiment of the Browser Manager operating system, the Player Terminal to Browser Manager message gets sent by the Player Terminal on boot up to the Browser Manager 100.

Parameters:

| PT ID | The unique ID assigned to the PT |
|---|---|
| Primary Game | The primary AGP game running on the PT |
| Resolution width, height | The screen resolution the PT is configured for |
| Browser Area W, H | The Browser area in W, H |

Playercardinsert

The playercardinsert message gets sent when a player inserts their card at the Player Terminal.

Parameters:

| PT ID | The unique ID assigned to the PT |
|---|---|
| PlayerID | Unique player tracking ID |

Playercardremove

The playercardremove message gets sent when a player removes their card at the Player Terminal.

Parameters:

| PT ID | The unique ID assigned to the PT |
|---|---|
| PlayerID | Unique player tracking ID |

Buyin/Cashin

The buyin/cashin message gets sent when credits are inserted at the Player Terminal.

Parameters:

| PT ID | The unique ID assigned to the PT |
|---|---|
| PlayerID | Unique player tracking ID if available |

Cashout

The cashout message gets sent when a cashout occurs at the Player Terminal.

Parameters:

| PT ID | The unique ID assigned to the PT |
|---|---|
| PlayerID | Unique player tracking ID if available |

Heartbeat/Keepalive

The Heartbeat/Keepalive message is sent by the Player Terminal to the Browser Manager 100 to inform Browser Manager that Player Terminal is still alive.

Application Specific Messages

Sendslotsdata

The sendslotdata message is sent by the Player Terminal, on the primary game end event, and carries some accounting meters.

Parameters:

| PT ID | The unique ID assigned to the PT |
|---|---|
| gamesWon | Number of games won |
| gamesLost | Number of games lost |
| MoneyWon | Total money won |
| MoneyPlayed | Total money played |

Browser Manager to Player Terminal

Setlayout

The Setlayout message is used to send down a predefined screen layout with multiple windows with content URLs. This message is variable length depending on the number of windows. This message can be used for a single or multiple windows.

Parameters:

| NumWindows | Number of windows |
|---|---|
| [for each window] | |
| WndID | Window ID |
| X | Window Left |
| Y | Window Top |
| W | Window Width |
| H | Window Height |
| Z | Z order of the window |
| url | URL the window needs to display |

Setwindowurls

The Setwindowurls message is used to set the URLs for the browser window(s).

Parameters:

| NumWindows | Number of windows |
|---|---|
| [for each window] | |
| WndID | Window ID |
| url | URL the window needs to display |

Showbrowserwindows

The Showbrowserwindows message is used to set the visibility of the browser window(s).

Parameters:

| NumWindows | Number of windows |
|---|---|
| [for each window] | |
| WndID | Window ID |
| Show | Flag indicating whether the window is to be shown or not |

Movebrowserwindows

The Movebrowserwindows message is used to reposition the browser window(s).

Parameters:

| NumWindows | Number of windows |
|---|---|
| [for each window] | |
| WndID | Window ID |
| x | Window Left |
| y | Window Top |
| w | Window Width |
| h | Window Height |
| z | Z order of the window |

Closebrowserwindows

The Closebrowserwindows message is used to close the browser window(s).

Parameters:

| NumWindows | Number of windows |
|---|---|
| [for each window] | |
| WndID | Window ID |

Setzorders

The Setzorders message is used to set the Z-orders of the browser window(s)

Parameters:

| NumWindows | Number of windows |
|---|---|
| [for each window] | |
| WndID | Window ID |
| Z order | Z-order of window |

Execjavascriptfunction

The Execjavascriptfunction message is used to execute a Javascript function on the page. It is powerful in the sense that the host can send commands to execute predefined functions on the page when it needs to. For example, when the AppServer needs to catch the attention of all its players, it can send a RequestAttention( ) message to the Browser Manager 100. The Browser Manager 100 may identify which Player Terminals are currently using that application and send this message with a function (e.g., StartFlash( )) to execute. This function may have been previously written to flash(/color-loop) the application button in the panel.

Parameters:

| WndID | Window ID |
|---|---|
| function | String containing the function to execute with parameters |

Browser Manager to Appserver Messaging is Ready

This message is used by the Browser Manager 100 to query the AppServer if it is online and ready to take on another player. The AppServer needs to respond within a predefined amount of time (ms).

Registerpt

After the Browser Manager 100 instructs the Player Terminal to load an application, it sends the Registerpt message to the AppServer to have it register/add the Player Terminal to its list.

Parameters:

| PT-ID | Unique identifier for the PT. |
|---|---|
| Player ID | Player tracking ID, if available. |

Unregisterpt

At the end of a Player Terminal session, the Browser Manager 100 sends the Unregisterpt message to the AppServer to have it unregister/remove the Player Terminal from its list.

Parameters:

| PT-ID | Unique identifier for the PT. |
|---|---|

Updateptstatus

The Browser Manager 100 can use the Updateptstatus message to the AppServer to update the status of the Player Terminal. For example, if a Player Terminal goes down, Browser Manager 100 realizes the Player Terminal went offline and informs the AppServer that the Player Terminal is offline using this message.

Parameters:

| PT-ID | Unique identifier for the PT. |
|---|---|
| Player ID | Player tracking ID, if available. |
| status | Online/offline. |

Appserver to Browser Manager Messaging—Register

This message is sent by the AppServer on startup to register itself with the Browser Manager 100 and announce its availability.

Heartbeat

The Heartbeat message is sent by the Player Terminal to the Browser Manager 100, to inform Browser Manager that Player Terminal is still alive.

Requestattention

The Requestattention message is sent by the AppServer to the Browser Manager 100 to get the attention of any/all players using the application. The Browser Manager 100 in turn may use the ExecJavascriptFunction message to flash the application button in the panels of the specified Player Terminal(s) currently using the application. If a Player Terminal-ID is specified, the message may be sent to the specified Player Terminal. If it is absent, the message may be sent to all Player Terminals.

Parameters:

| | |
|---|---|
| appID | Unique ID identifying the application |
| PT-ID | Unique ID identifying the PT |

Execjavascriptfunction

The Execjavascriptfunction message is sent by the AppServer to the Browser Manager 100, to execute a Javascript function on the page. If the Player Terminal-ID is present, Browser Manager 100 may send the message to the specified Player Terminal. If the Player Terminal-ID is absent, Browser Manager 100 may forward the message to all Player Terminals. An example of this is when events occur at the AppServer, and say it has a new total value that it needs to have updated on every Player Terminals browser. It may send this message to the Browser Manager 100 with a blank Player Terminal-ID parameter and function string "updateTotal(total)." The Browser Manager 100 may then send this message out to all the Player Terminals who are running that application.

Parameters:

| | |
|---|---|
| appID | Unique ID identifying the application. |
| PT-ID | Unique ID identifying the PT. |
| Function | String containing full script function with parameters. |

Newbrowserwindows

The Newbrowserwindows message may be sent by the AppServer to the Browser Manager 100, to open a new browser window in the CHILD_PANEL. For example, if the AppServer wants to popup a window with a promotional page or have the user make some selections, it could request the Browser Manager 100 to open a new browser window. If no Player Terminal-ID is specified, the message may be sent to all Player Terminals currently displaying the application.

The Z order may be relative to the Z order of the parent window and may be in the range 2-ACTIVE_Z. The coordinates of the new window may be contained by Browser Manager 100 to within the panel of the parent application.

Parameters:

| | |
|---|---|
| appID | Unique ID identifying the application |
| PT-ID | Unique ID identifying the PT |
| NumWindows | Number of windows |
| [for each window] | |
| WndID | Window ID generated by the AppServer |
| X | Window Left |
| Y | Window Top |
| W | Window Width |
| H | Window Height |
| Z order | Z order of the window relative to parent window |
| url | URL the window needs to display |

Movebrowserwindows

The Movebrowserwindows message may be sent by the AppServer to the Browser Manager 100, to reposition a browser window in the CHILD_PANEL. The coordinates of the new window may be contained by Browser Manager 100, to within the panel of the parent application. If no Player Terminal-ID is specified, the message may be sent to all Player Terminals currently displaying the application.

Parameters:

| | |
|---|---|
| appID | Unique ID identifying the application |
| PT-ID | Unique ID identifying the PT |
| NumWindows | Number of windows |
| [for each window] | |
| WndID | Window ID as determined by the AppServer |
| X | Window Left |
| Y | Window Top |
| W | Window Width |
| H | Window Height |

Setwindowsurls

The Setwindowsurls message is used to set the URL in the Window ID specified. If no Player Terminal-ID is specified, the message may be sent to all Player Terminals currently displaying the application.

Parameters:

| | |
|---|---|
| appID | Unique ID identifying the application |
| PT-ID | Unique ID identifying the PT |
| NumWindows | Number of windows |
| [for each window] | |
| WndID | Window ID |
| url | URL the window needs to display |

Showbrowserwindows

The Showbrowserwindows message is used to set the visibility of the browser window. If no Player Terminal-ID is specified, the message may be sent to all Player Terminals currently displaying the application.

Parameters:

| | |
|---|---|
| appID | Unique ID identifying the application |
| PT-ID | Unique ID identifying the PT |
| NumWindows | Number of windows |
| [for each window] | |
| WndID | Window ID |
| show | Flag indicating whether the window is to be shown or not |

Setzorders

The Setzorders message is variable length depending on the number of windows. If no Player Terminal-ID is specified, the message may be sent to all Player Terminals currently displaying the application.

Parameters:

| | |
|---|---|
| appID | Unique ID identifying the application |
| PT-ID | Unique ID identifying the PT |
| NumWindows | Number of windows |
| [for each window] | |
| WndID | Window ID |
| Z order | Z-order of window |

Closebrowserwindows

The Closebrowserwindows message may be sent by the AppServer to the Browser Manager 100, to close browser windows in the CHILD_PANEL. If no Player Terminal-ID is specified, the message may be sent to all Player Terminals displaying the application at that moment.

Parameters:

| | |
|---|---|
| appID | Unique ID identifying the application |
| PT-ID | Unique ID identifying the PT |

-continued

| | |
|---|---|
| NumWindows [for each window] | Number of windows |
| WndID | Window ID as determined by the AppServer |

Startgame

The Startgame message is sent by the AppServer to Browser Manager 100 to let it know a game indicated by gameID has started.

Parameters:

| | |
|---|---|
| appID | Unique ID identifying the application |
| PT-ID | Unique ID identifying the PT |
| gameID | ID of the game |

Endgame

The Endgame message is sent by the AppServer to Browser Manager 100 to let it know a game indicated by gameID has ended.

Parameters:

| | |
|---|---|
| appID | Unique ID identifying the application |
| PT-ID | Unique ID identifying the PT |
| gameID | ID of the game |

The following are messages used to update the items representing the AppServer in the Browser Manager's database.

Setdescription

The Setdescription message is sent by the AppServer to Browser Manager 100 to set the description of the application in Browser Manager's table 'tblApps.'

Parameters:

| | |
|---|---|
| appID | Unique ID identifying the application |
| Description | New description string to set in the table |

Seticonurl

The Seticonurl message is sent by the AppServer to Browser Manager 100 to set the URL of the icon representing it in the Browser Manager's table 'tblApps.'

Parameters:

| | |
|---|---|
| appID | Unique ID identifying the application |
| IconURL | New URL of icon to set in the table |

Seticontext

The Seticontext message is sent by the AppServer to Browser Manager 100 to set the text of the icon representing it in the Browser Manager Table 'tblApps.'

Parameters:

| | |
|---|---|
| appID | Unique ID identifying the application |
| IconText | New icon text string to set in the table |

Setappurl

The Setappurl message is sent by the AppServer to Browser Manager 100 to set the URL of the application in the Browser Manager Table 'tblApps.'

Parameters:

| | |
|---|---|
| appID | Unique ID identifying the application |
| appURL | New URL that points to the live application to set in the table |

Transaction Messaging: Appserver to Transaction Manager—Requesttransaction

This message is used by the AppServer to request the TransactionMgr for a transaction with a specified Player Terminal.

Parameters:

| | |
|---|---|
| PT-ID | Unique ID identifying the PT |
| TransactionRequestID | Unique ID generated by the AppServer identifying the Transaction request. The Transaction Manager 110 may use this in its response to the AppServer. |
| TransactionType | Type of transaction, Debit, Credit |
| Amount | Money amount |

Transaction Manager to Appserver—Transactionresponse

This message is used by the TransactionMgr to respond to AppServer's RequestTransaction message.

Parameters:

| | |
|---|---|
| TransactionRequestID | Unique ID identifying the Transaction request previously sent by the AppServer. |
| Status | Completed, Denied |

Figure 12:
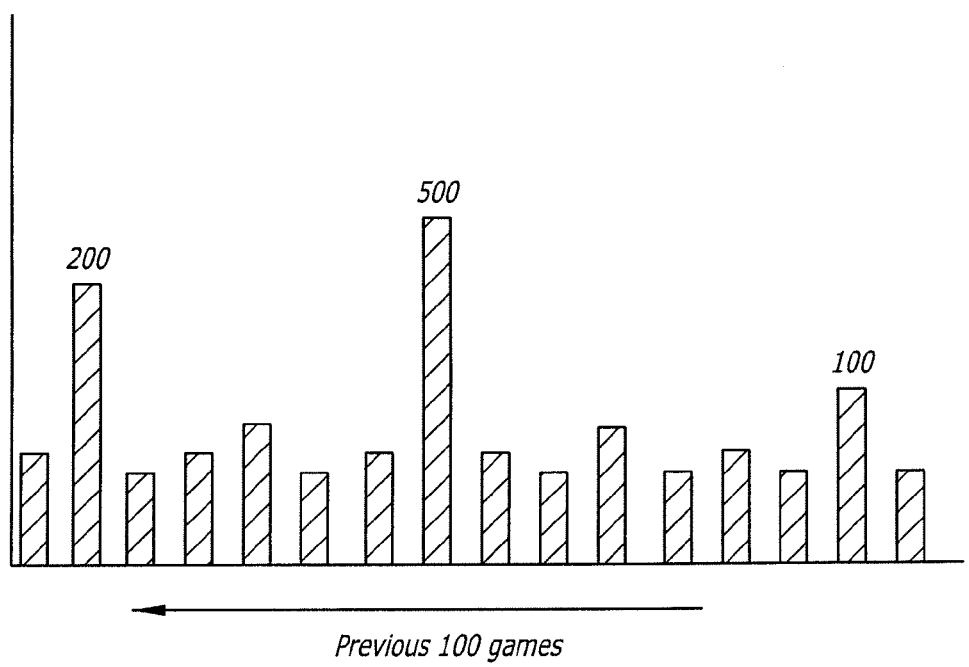
FIG. 12 is a user interface for a player who selects the Slot Stats application showing recent win/loss activity on the gaming device through the browser interface.

FIG. 12 illustrates a Browser Application entitled Slot-Stats. SlotStats is a server application that generates a chart based on game data of individual Player Terminal/electronic gaming machines 120. The chart may be displayed on a browser window on the Player Terminal.

When a game is played on a Player Terminal, the results (e.g., money played, money won, games played, games won, and the like) are sent to a server that records it in a database with a timestamp. The amount of information to be sent/stored depends on what is to be displayed. For example, the diagram below shows the last 100 games played on the Player Terminal and certain wins have icons displayed on them. This presentation uses just the MoneyWon data field. Additionally, FIG. 1 displays the browser button interface for the player to launch the SlotStats data viewer.

In one embodiment of the Browser Manager operating system, GnuPlot, a freeware charting tool is used to generate charts via several web sites (e.g., Yahoo Finance). Additional embodiments have also implemented GnuPlot, MySQL and Apache. In one specific, non-limiting embodiment, when a game ends, gamemgr sends the meter data to a client program, which calls a PHP script on the server with the data. The PHP script writes the data into a MySQL table and sends a URL server://draw_chart.php back to the client program. The client program instructs the browser to load the URL server://draw_chart.php with some parameters. On the server side, the draw_chart.php script runs the gnuplot program with the parameters, generates the chart as a PNG image, and the output is fed directly into the page. No images are saved on the server and since the logic to generate the charts resides on the server, any number of different presentations and styles could be used.

One operation that the GnuPlot is unable to do at the time of writing is generate the icons on a plot. To accomplish this operation, a feature request has to be sent to the GnuPlot project. Alternate approaches could be used in other embodiments that utilize MACROMEDIA FLASH, or other charting tools.

Player Initiated "View Base Game" Interface

Referring again to FIG. 1, in one embodiment of the Browser Manager operating system and method, there is a button on the task bar at the bottom of the display screen that reads "View Base Game." This button enables a player to navigate back to the base game screen upon his selection of the button. In this manner, a player may recover the typical top monitor game art in either full screen or in a panel at the top of the display screen. Additionally, in one embodiment, the content may be maximized or displayed within one of the browser windows on the top of the page, in a Picture-in-Picture type format. Accordingly, a player may select any button on the bottom task bar of FIG. 1 and take over any browser window on the display screen (e.g., top, bottom, or display content simultaneously over multiple windows).

Taskbar/Button Bar Minimization

Referring again to FIG. 1, in one embodiment of the Browser Manager operating system and method, there is a button on the task bar at the bottom of the display screen that reads "Min/Max Window." This button may be utilized to either minimize or maximize the selected active window on the display screen. In one embodiment, this task bar may "auto-hide" itself after a period of no user interfacing with the display screen or gaming machine base game input/output (I/O).

Thus, the "Min/Max Window" button may be utilized to provide a full screen view of the content on the upper portion of the display screen. The ability of the task bar to auto-hide provides a non-obstructed view of the browser content on the display screen. The auto hide feature may be driven by the Browser Manager 100 and may be based upon business rules, data it receives from the gaming machines 120, commands from the gaming machine or a back-end server, or combinations thereof Base Game Capture Focus In another embodiment of the Browser Manager operating system and method, in a situation when the base game requires focus on the top monitor to run an application (e.g., a bonus round), the system enables the base game to take over the entire screen or the top panel of the screen automatically. In one embodiment, the content shown is rendered by native Linux graphics technology (driven from the C++ Linux AGK or OS). In this regard, the game knows its own game state and is capable of selectively taking control of an active window on the display screen. In one embodiment, this is due to the game having master control as a result of being a regulated gaming machine 120. Additionally, the game may give up control of the active window on the display screen when the game has completed its priority content (e.g., it is only showing the game marquee logo).

Drag/Drop/Resize/Re-Position by Player

In one embodiment of the Browser Manager operating system and method, the player has the ability to drag and drop the browser windows in various positions around the display screen. In one specific, non-limiting embodiment, this may be achieved by using a player's finger to drag the windows. In such an embodiment, this feature overrides the default browser or window configuration of the Browser Manager 100. Additionally, in one embodiment, the player has the ability to resize each window with controls that are displayed around the corner of a window, upon selection of the window by the player. In one embodiment, the content within the window is scaled accordingly. Alternatively, the content in a smaller window remains at the original size, and the player then may only view a portion of the content in the smaller window at a time. In such an embodiment, the player may slide the original size content around within the smaller window using a hand/finger gesture and a slider bar. Such an embodiment enables a player to view the content in its original size and complexity, in comparison to a scaled version of the content.

Save Browser State Per Player

In one embodiment of the Browser Manager operating system and method, the browser window state, size, orientation may be stored in a player-specific "Save State" account. In such an embodiment, a player may visit another gaming machine 120 (or the same gaming machine) at a later time/day, and recover the browser state information upon player identification at the gaming machine 120. This may be achieved using system controls, biometric identification, a player card reader attached to the gaming device or system control, proximity detection of a player ID from a wireless PDK personal digital key, a smart card, the player entering username/password or casino player ID into the gaming device using a keyboard or touchscreen, facial recognition, a ticket/voucher that is associated with the player, or combinations thereof.

Once the browser state information is recovered, the entire screen browser configuration may be set to the players preferred presentation mode. In one embodiment, this is controlled by the Browser Manager 100, which overrides the defaults for this specific player. Preferably, the content is identical if the subsequent visited game screen configuration-size-orientation is the same as the previous one that was configured. If screen orientations/sizes/resolutions are different on different gaming machines 120, the Save State server can save the player browser preferences for each of the various cabinet configurations.

Save Browser State Information for A Selected URL Per Player

In another embodiment of the Browser Manager operating system and method, the "Save State" feature of the browser windows may also save the XML string of the state of the HTML page in that window. Thus, a third party server that is driving this window may use the gaming machine manufacturer to maintain the state of any content in the window by calling a Javascript function that the manufacturer provides to the third party. In this regard, the XML string may be saved in the "Save State" server file of the casino Browser Manager 100 that is specific to this player. Such an embodiment enables a patron to start a browser session at a specific URL at another gaming machine 120 with the same state where the player left off on a previously used gaming machine.

For example, in one specific, non-limiting embodiment for an e-commerce shopping application, a casino patron may add items to a virtual shopping basket on one gaming machine 120, leave this gaming machine, go to another machine, and upon identifying himself continue shopping right where the player left off on the previous gaming machine. In an alternative embodiment, the third party server may use a S2S (server to server) "Save State" message into the manufacturer's "Save State" server to save any browser state-related data it requires. In one embodiment, this is preformed in XML format. In this regard, the gaming machine manufacturer can return this data to the third party server once the player is identified. The third party server may use this recovered browser state data to update its web page state. This is typically performed through AJAX (Asynchronous JavaScript and XML) updates.

Browser Recovery to Normal State

In still another embodiment of the Browser Manager operating system and method, when the player session ends (e.g., credits go to zero for a period of time, or the player card is pulled) then the browser content returns back to its original Browser Manager controlled frames and sizes. This typically provides the base game focus of the main portion of the top monitor. In yet another embodiment, the Browser Manager 100 or Z-order director server may "auto-flip" through various content and URLs on the top monitor including the natively-rendered, base game content.

Base Game Rendered Native Content

In one embodiment of the Browser Manager operating system and method, the base game operating system may provide a HTML page for the Browser Manager 100 to render. This HTML page contains the top box monitor content, such as the marquee artwork. It may have animated graphics and data fields like paytables and progressives. This data may be updated by AJAX and Dynamic HTML. In this manner, the gaming machine operating system (e.g., an Alpha OS) also acts a web server to provide the base game content to the browser window running on the top display screen. These operating system HTML pages may be pre-entered into the Browser Manager 100 and may be different for each gaming machine 120, since each machine has different directory paths to its content.

Browser Window Transparency

In another embodiment, the Browser Manager operating system and method enables a player to select the level of transparency for each browser window via the user interface. This enables the player to see content on one browser window that is behind another browser window. In this manner, the player may be sure to see all of the information the player believes is important. For example, the player may see an active keno game being played on the foremost window and also watch the base game content in the second window back that is completely or partially behind the front-most keno window. In one embodiment, the player is provided a slider bar user interface or dropdown user interface component to set the level of transparency per window or for the level of transparency for all windows. Alternatively, there may be a control panel user interface that allows the player to configure all windows or specific windows to the player's preferences. Additionally, this information can also be saved in a player-centric database that may be recovered in the player's next gaming session on the same or a different gaming machine 120.

Picture-In-Picture

In one specific, non-limiting embodiment of the Browser Manager operating system and method, a windows-based iVIEW drives either a smaller iVIEW 640×240 window or the entire top box display screen using Microsoft Direct X APIs, which are contained in Windows Vista embedded. In other embodiments, other components with equivalent functionality may be utilized. This feature enables picture-in-picture functionality in conjunction with variable browser window transparency, which is selectable by the player and is savable in a central "Save State" server per player and gaming machine configuration. Moreover, in some embodiments, the Browser Manager 100 also has the ability to configure the transparency per window or for a group of windows.

Various embodiments are directed to a Browser Manager 100 integrated with a networked gaming system. In one or more aspects, the integrated system provides server based dynamic content onto the secondary display of gaming machines 120. The embodiments are illustrated and described herein, by way of example only, and not by way of limitation.

Referring now to the drawings, and more particularly to FIG. 13-20I, there are shown illustrative examples of a gaming network with a Browser Manager server, processes, and various GUI displays which may be generated on a user control station, such as to facilitate the development and delivery of Browser Manager server services, in accordance with various aspects of the invention.

In a preferred embodiment, the system provides server-based dynamic content onto the secondary display of gaming machine 120. This design allows multiple gaming machines 120 to be able to connect Browser Manager Application through the G2S server component to process the request and sends back the response to gaming machines.

Various S2S clients connect to Browser Manager 100 through S2S server component and web service. S2S clients send requests to BMS to execute commands on one or more gaming machines 120. BMS validates and processes the requests, sends the commands to gaming machines, waits for the response, builds the S2S responses, and sends the responses back to the S2S clients. The system is implemented in service oriented architecture with various services (web services) required to fulfill the business requirements. Both gaming machine 120 and S2S client communicates to web services and exchange information.

Figure 13:
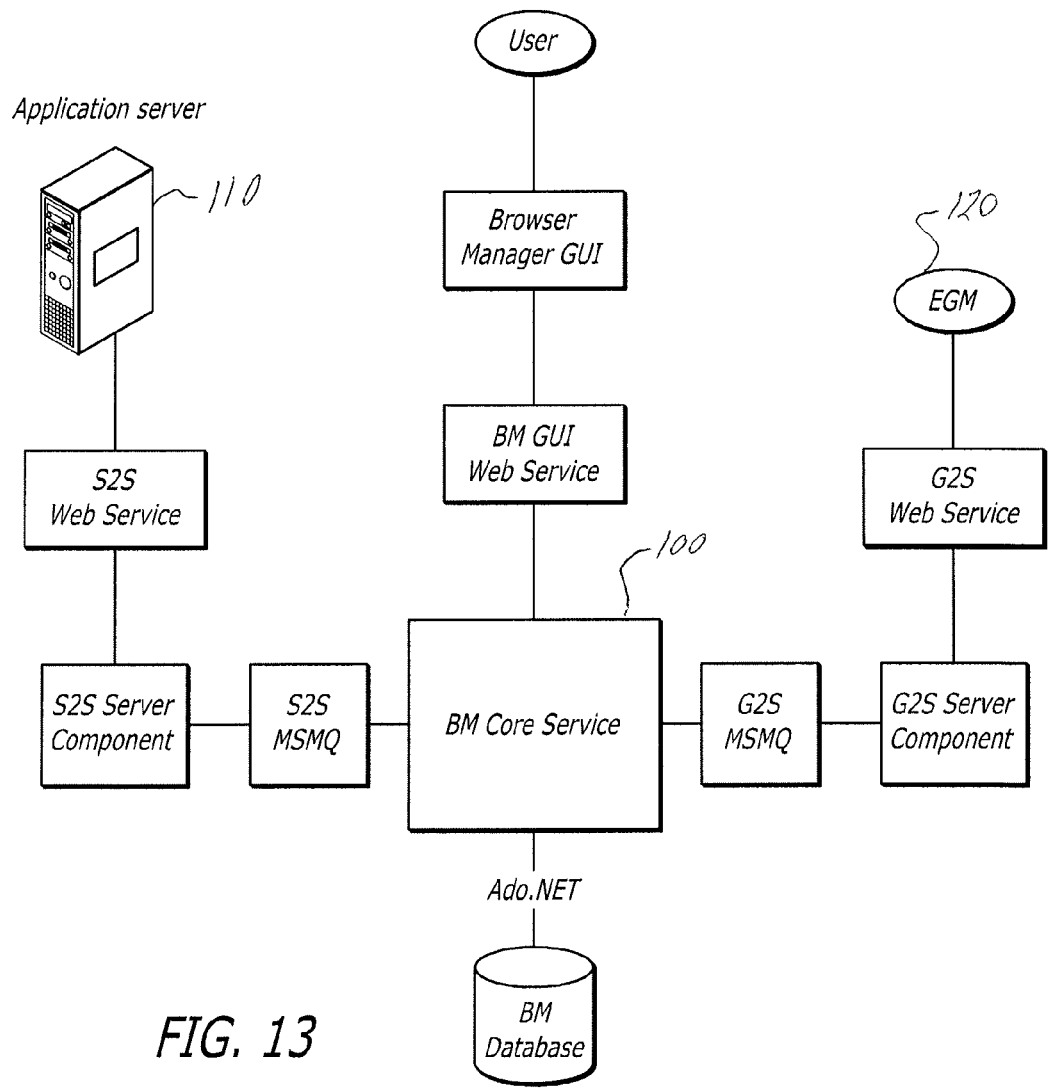
FIG. 13 illustrates a high-level design implementation of example gaming network with a Browser Manager in accordance with one or more embodiments.

Referring to FIG. 13, a high-level design implementation of example gaming network 101 is shown, such as may be integrated within a Bally Technologies SMS (Slot Management System) and/or CMS (Casino Management System). In the figures, the servers or server applications are shown representatively. When implemented, the functions of the respectively shown servers and/or applications may be integrated with various servers commonly found in a CMS or SMS. For example, the Bally SMS and CMS networked systems generally include at least one host computer and at least one user control station (Bally Control Panel). The Browser Manager server and application may be integrated with the host computer and the Browser Manager GUI (Graphical User Interface) may be integrated in the user control station.

The Browser Manager Core Service (BMS) receives the message requests from the S2S and G2S message queues. Next, the BMS validates the data, performs the required processing, and stores the information to the database, if required. Each gaming machine 120, such as a Bally Technologies Alpha platform-based gaming machine with an iView player interface unit, may display the dynamic content from third party application servers 110 in a pre-defined layout in the secondary display unit (such as a touch panel display that may be provided with a player interface unit) that comprises a control panel page and content page in browser frames, which would be served from an internet (115) server.

Design and Architectural Decisions

The Browser Manager may be designed to meet the requirements of commercially available Bally/GSA 525 browser class protocol specification and Bally/GSA G2S browser class protocol specification which is hereby incorporated by reference.

The Browser Manager Solution includes three main components: (1) The Browser Manager GUI application, (2) Browser Manager web service, and (3) Browser Manager core windows service. The Browser Manager GUI application implements the smart client windows forms, which can be viewed in a browser with the functionality of managing applications, browser layouts, gaming machine summary, reports, and the like. Secondly, the Browser Manager web service connects the Browser Manager GUI application to Browser Manager core windows service to execute business functionality, database operations and provides ability to exchange messages using standard protocols like HTTP, XML, XSD, SOAP, and WSDL. Finally, the Browser Manager Core Service is the central point for processing the business logic of browser class messages. This service is responsible for the core functionality and execution of both incoming and outgoing messages from 525 and G2S server components.

The Browser Manager Core Service performs the following operations: (1) Listens to both S2S and G2S incoming message queues, once message received, message is processed and if needed sends back reply messages; (2) Converts the incoming S2S or G2S message to BMS message with respect to BMS schema and process the commands; (3) Validates incoming message data with the available data in database and if any inconsistent data found, a negative acknowledgement response would be build and sent back to S2S client; (4) Saves the S2S or G2S command data information to relevant tables in database; (5) Log information messages and error messages to log file; (6) Logging of incoming and outgoing messages of both S2S and G2S to log files. S2S messages to be logged to S2S message log file and G2S messages to G2S message log file; (7) ActivityManager data table stores information about the commands received processed and commands sent to ECM's and response received from ECM's. Contains a flag, which indicates the commands have been completed successfully. Also stores the other information like total number of G2S commands sent to one or more ECM's, total number of ECM's responded, date responded and error information. Activity process of each command is explained in detailed system design section; and (8) ID provider class provides the required new ID from the IDProvider data table by incrementing the relevant key id based on category and key name.

Database design and development would meet the best practices specified in Bally Database Best Practices and Standards Document (revision A). All the SQL queries to be coded in stored procedures and SQL transactions would be used where appropriate.

Microsoft Message Queues are used as the mechanism by which messages are passed between various processes on the server. This approach allows for asynchronous processing of messages. Two queues incoming and outgoing message queues are required for S2S MSMQ and in the same way for G2S MSMQ two queues are required for incoming and outgoing messages. BMS service listens to S2S and G2S incoming queues only.

Messages are serialized to XML before they are sent to message queues and de-serialized to objects once received from message queues. XML message formatter provided by .net framework is used to format the messages.

Figure 14:
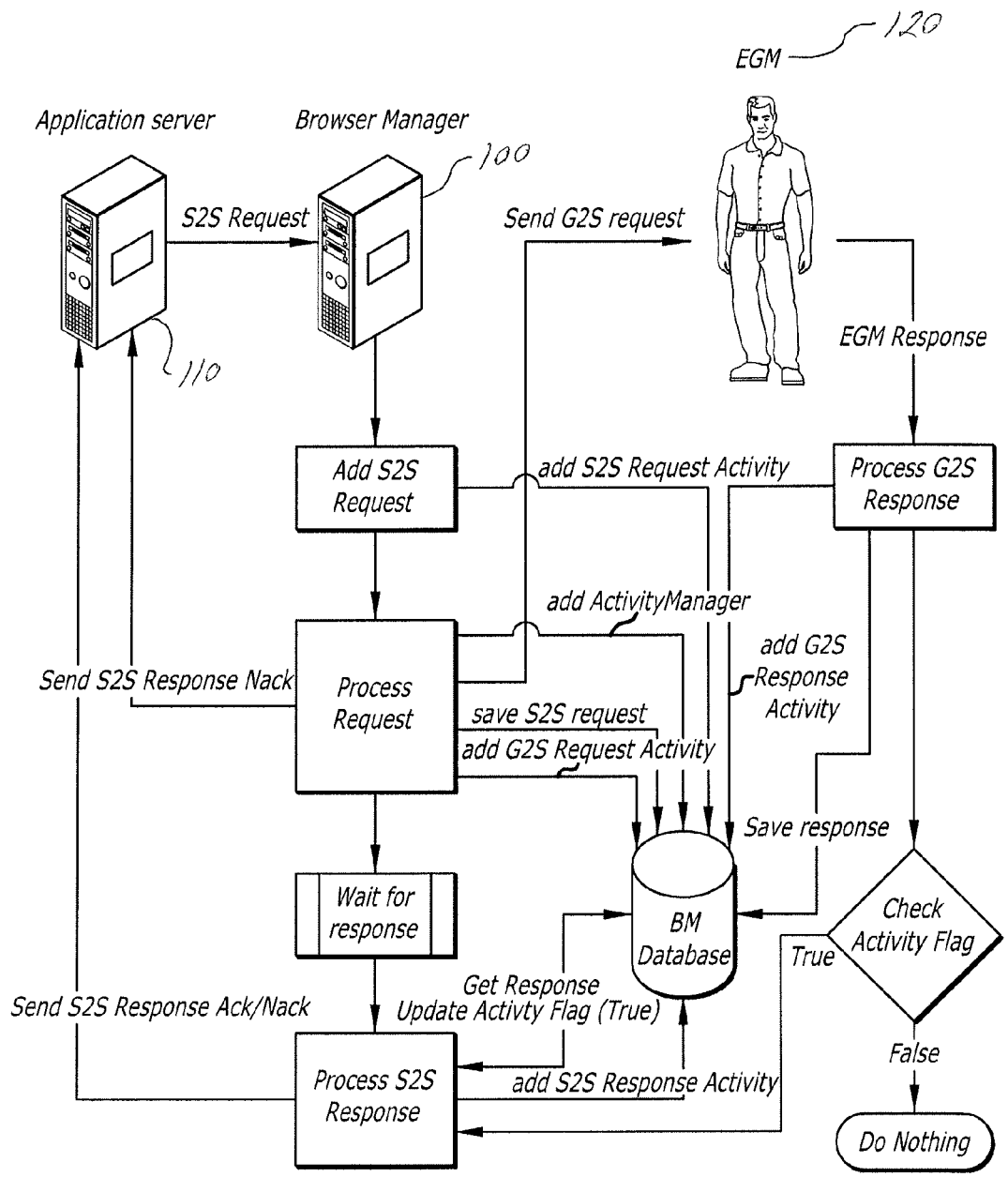
FIG. 14 illustrates an example gaming network with a Browser Manager and an associated S2S request command process flow in accordance with one or more embodiments.

Detailed System Design:

Browser Manager Core Service: S2S request command received by BMS will be saved to the BMS database and if required, related G2S request commands would be built and sent to one or more gaming machines 120. Referring to FIG. 14, example S2S request command process flow is shown.

Add S2S Request: Saves S2S request activity base information like command id, property id, date command originated, session information etc to ActivityS2Smessages data table.

Process Request: Command elements and attributes information is saved to relevant tables in BMS database. BMS checks or validates the data, if any invalid data found, BMS builds a nack with relevant information and replies to S2S client. For the successful and valid data, BMS builds G2S request command and sends to one or more gaming machines 120.

Add Activity Manager: Stores command activity information like name of the command, total gaming machine requests sent, total gaming machines responded, datetime response received, command completed flag etc in BMS database.

Add G2S Request: Saves G2S request activity base information like EGM ID, host ID, command ID, datetime command originated, session information, etc, to ActivityG2Smessages data table.

Process S2S Response: BMS waits for response based on the pre-defined period. In addition, checks the BMS database for response information. If found, gets all the response information and builds S2S response.

Add S2S Response: Saves S2S response activity base information like command ID, property ID, session information and the link to ActivityS2Smessages data table.

Process G2S Response: BMS validates and saves information to database. If the Activity flag which indicates BMS waited for response is true, then BMS builds the S2S response, and an acknowledgement is sent to the S2S client. The activity manager table is also updated with response details. If the Activity flag if false, BMS saves the information to database only.

Add G2S Response: Saves G2S response activity base information like gaming machine ID, host ID, command ID, session information to ActivityG2Smessages data table. Refer Bally GSA S2S Browser Class Protocol Specification and Bally GSA G2S Browser Class Protocol Specification for detailed information of browser class commands.

S2S commands originated from S2S clients:

| Request | Response |
| --- | --- |
| UpdateAppRegistry | ackUpdateAppRegistryList |
| GetEgmWindowList | egmWindowList. |
| SetEgmWindowList | ackSetEgmWindowList |
| AddEgmWindowList | ackAddEgmWindowList |
| DeleteEgmWindowList | ackDeleteEgmWindowList |
| update EgmWindowList | ackUpdateEgmWindowList |
| execEgmScriptFunctionList | ackExecEgmScriptFunctionList |
| updateAppStatusList | ackUpdateAppStatusList |
| requestEgmAttention List | ackRequestEgmAttentionList |

Referring to FIG. 15A-D, activity processes are shown as between an application server 110 and Browser Manager 100 in gaming network.

updateAppRegistry

Figure 15A:
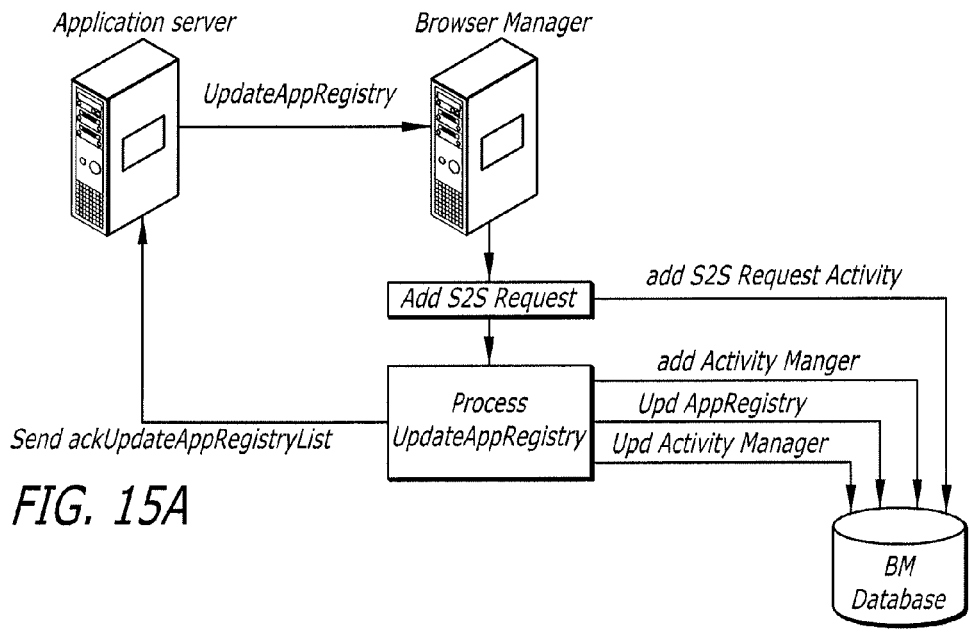
FIG. 15A-G illustrate example activity processes as between an application server and Browser Manager in gaming network in accordance with one or more embodiments.

This command shown in FIG. 15A is sent by the Application Server 110 (client) to the Application Manager (server) to update the application registry.

getEgmWindowList

Figure 15B:
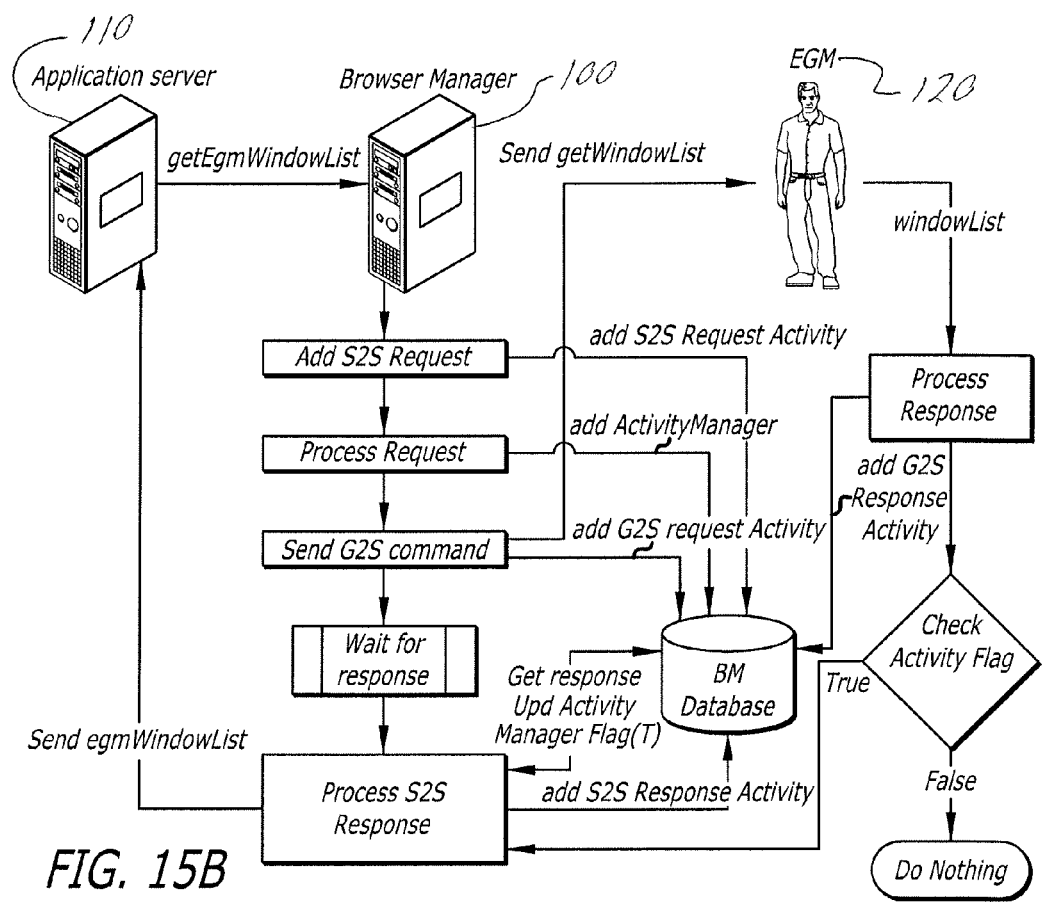

This command shown in FIG. 15B is sent by the Application Server 110 (client) to request one or more browser application windows that are active on one or more gaming machines 120. BMS process the request and sends getWindowList command to one or more gaming machines 120. Gaming machines 120 respond with windowList command and BMS process the response and sends the egmWindowList command in response to the getEgmWindowList command to the Application Server 110.

setEgmWindowList

Figure 15C:
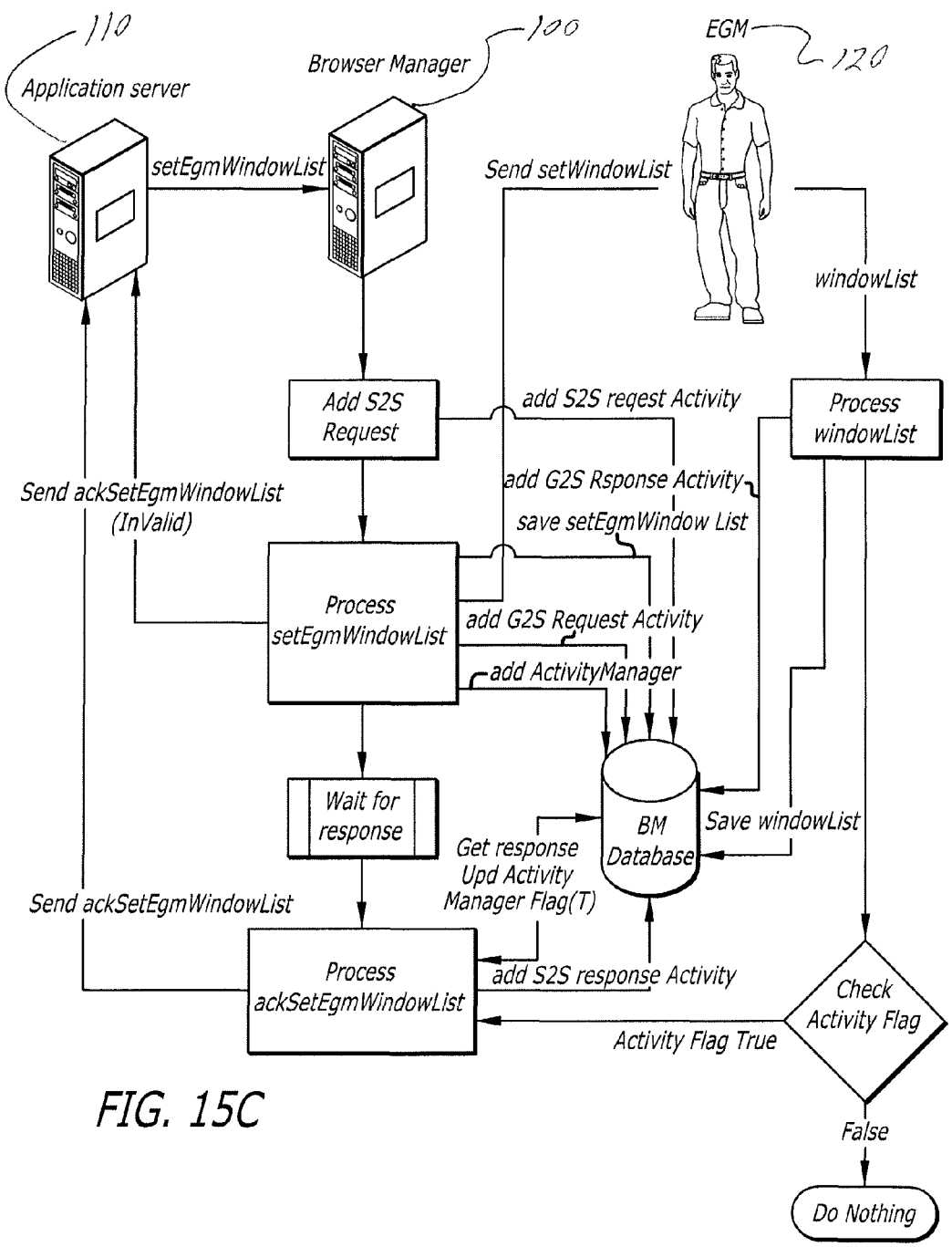

This command shown in FIG. 15C is sent by the Application Server 110 (client) to assign the one or more browser application windows to a set of gaming machines 120. When processed, a gaming machine 120 will replace all previously assigned browser application windows with the browser application windows specified in this command. The ack- SetEgmWindowList command is sent to provide either positive acknowledgment "ACK" or negative acknowledgement "NACK" of a setEgmWindowList command.

addEgmWindowList, updateEgmWindowList, deleteEgmWindowList

Figure 15D:
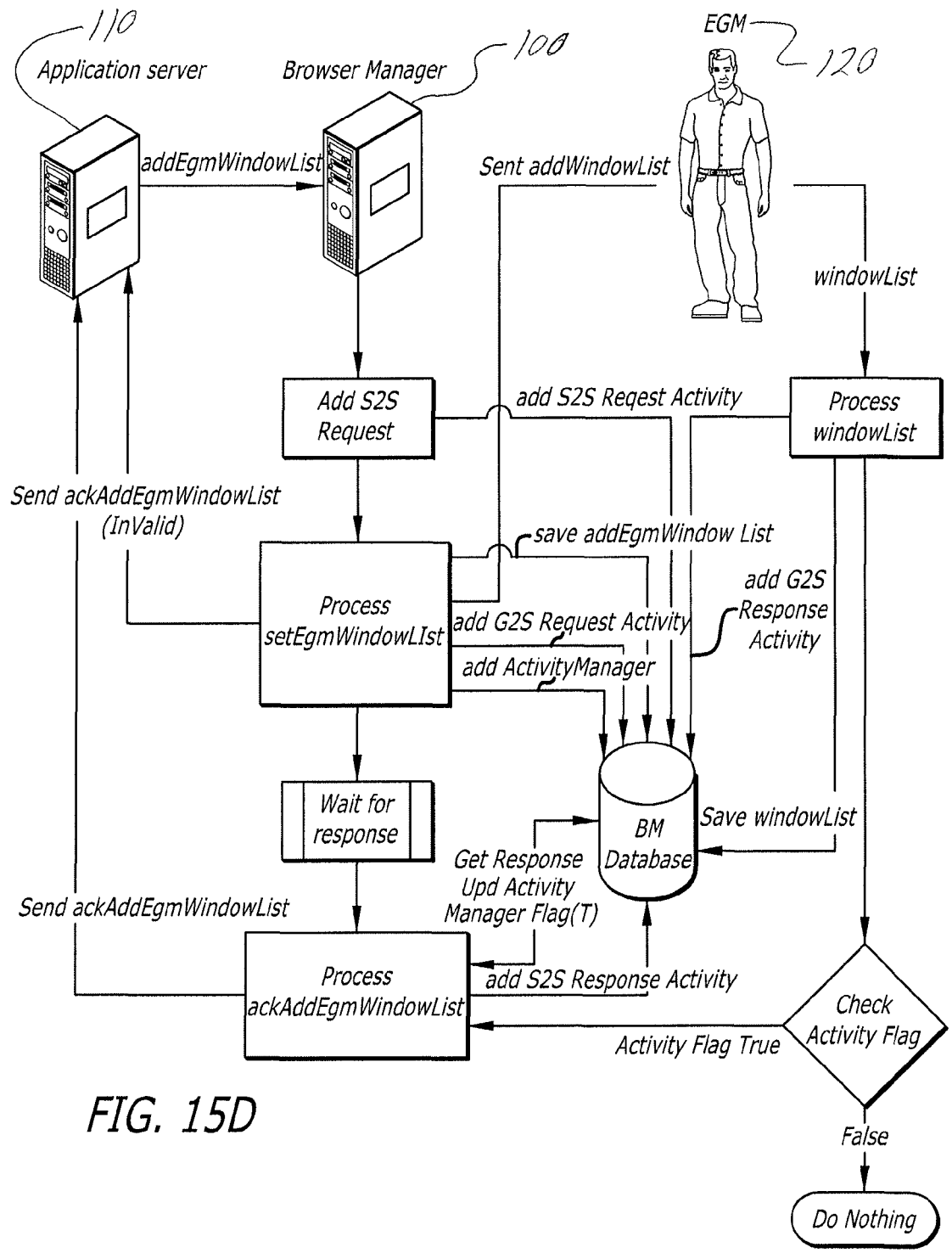

These commands shown in FIG. 15D are sent by the Application Server 110 (client) to add or update or delete browser application windows to the existing set of browser application windows in one or more gaming machine's. The ackAddEgmWindowList, updateEgmWindowList and deleteEgmWindowList commands are sent by the Application Manager (server) to the Application Server 110 (client) to provide either positive acknowledgment 'ACK' or negative acknowledgement 'NAK' of the commands. UpdateEgmWindowList, deleteEgmWindowList commands are processed same as described above.

execEgmScriptFcnList

Figure 15E:
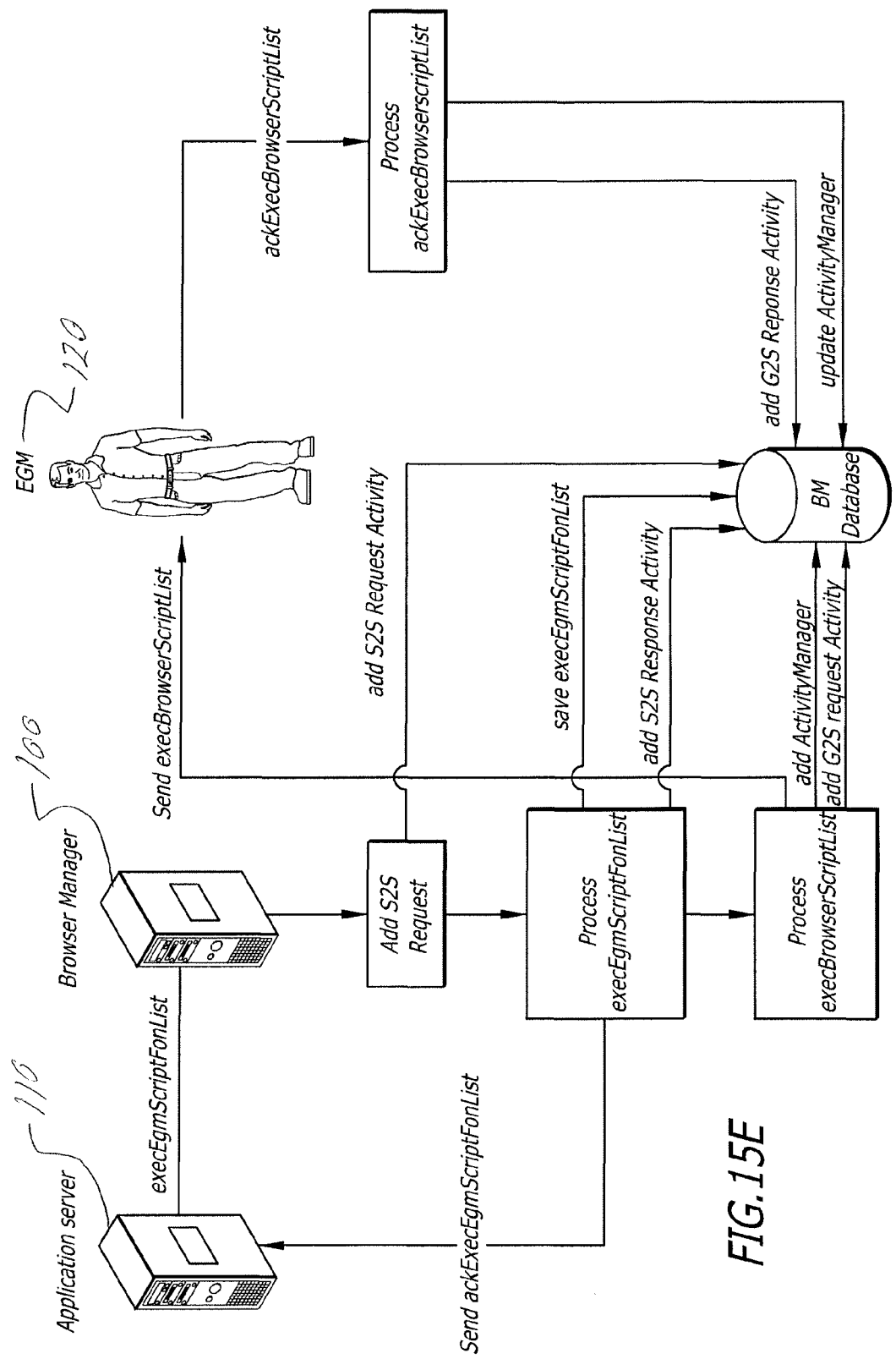

This command shown in FIG. 15E is sent by the Application Server 110 (client) to direct the Application Manager (server) to send gaming machine's corresponding script execute commands. The AckExecEgmScriptFcnList command is sent by the Application Manager (server) to the Application Server 110 (client) to provide either positive acknowledgment 'ACK' or negative acknowledgement 'NAK' of an execEgmScriptFcnList command.

updateAppStatusList

Figure 15F:
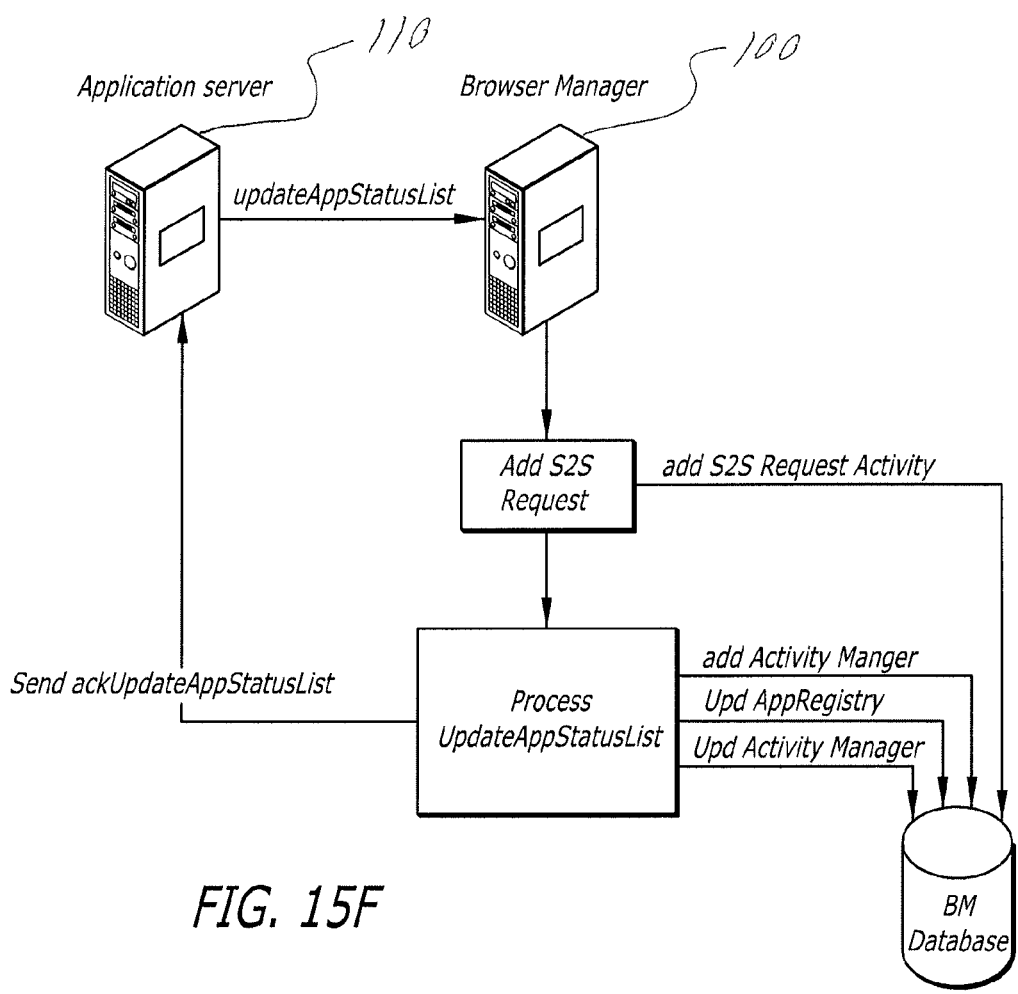

This command shown in FIG. 15F is sent by the Application Server 110 (client) to the Application Manager (server) to update the status of an application on one or more gaming machines 120.

requestEgmAttentionList

Figure 15G:
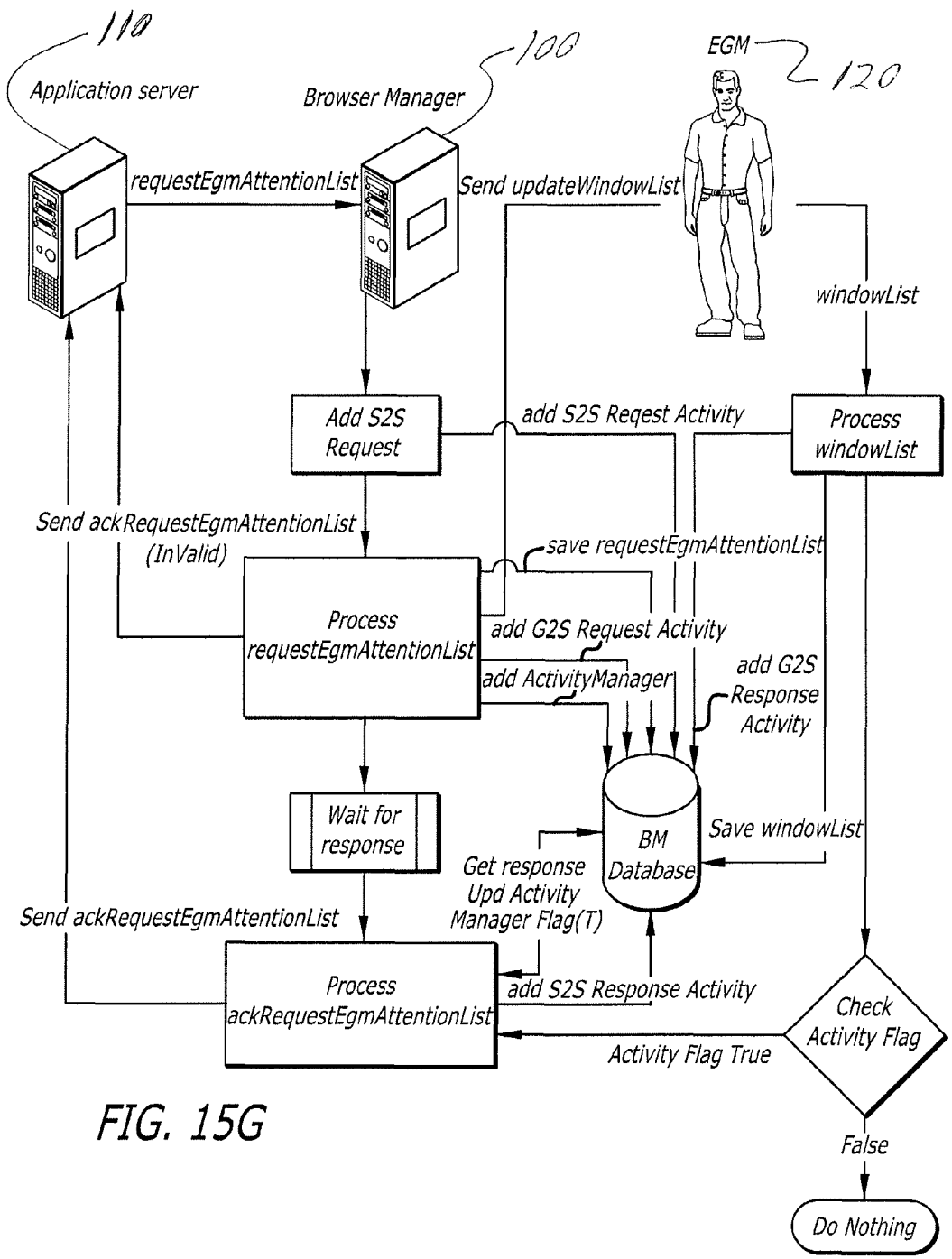

This command shown in FIG. 15G is sent by the Application Server 110 (client) to notify the Application Manager (server) that the application requests attention.

S2S Commands Originated from BMS:

| Request | Response |
|---|---|
| add Egm RegistryList | No response required. |
| deleteEgm RegistryList | No response required. |
| updateEg mRegistryList | No response required. |
| egmWindowStatusList | No response required. |

Browser Manager to S2S Clients Service:

This service is responsible for sending the messages from BMS to S2S clients. The service keeps monitors the database specific tables on a timely basis and builds messages to be sent to S2S client.

Figure 16A:
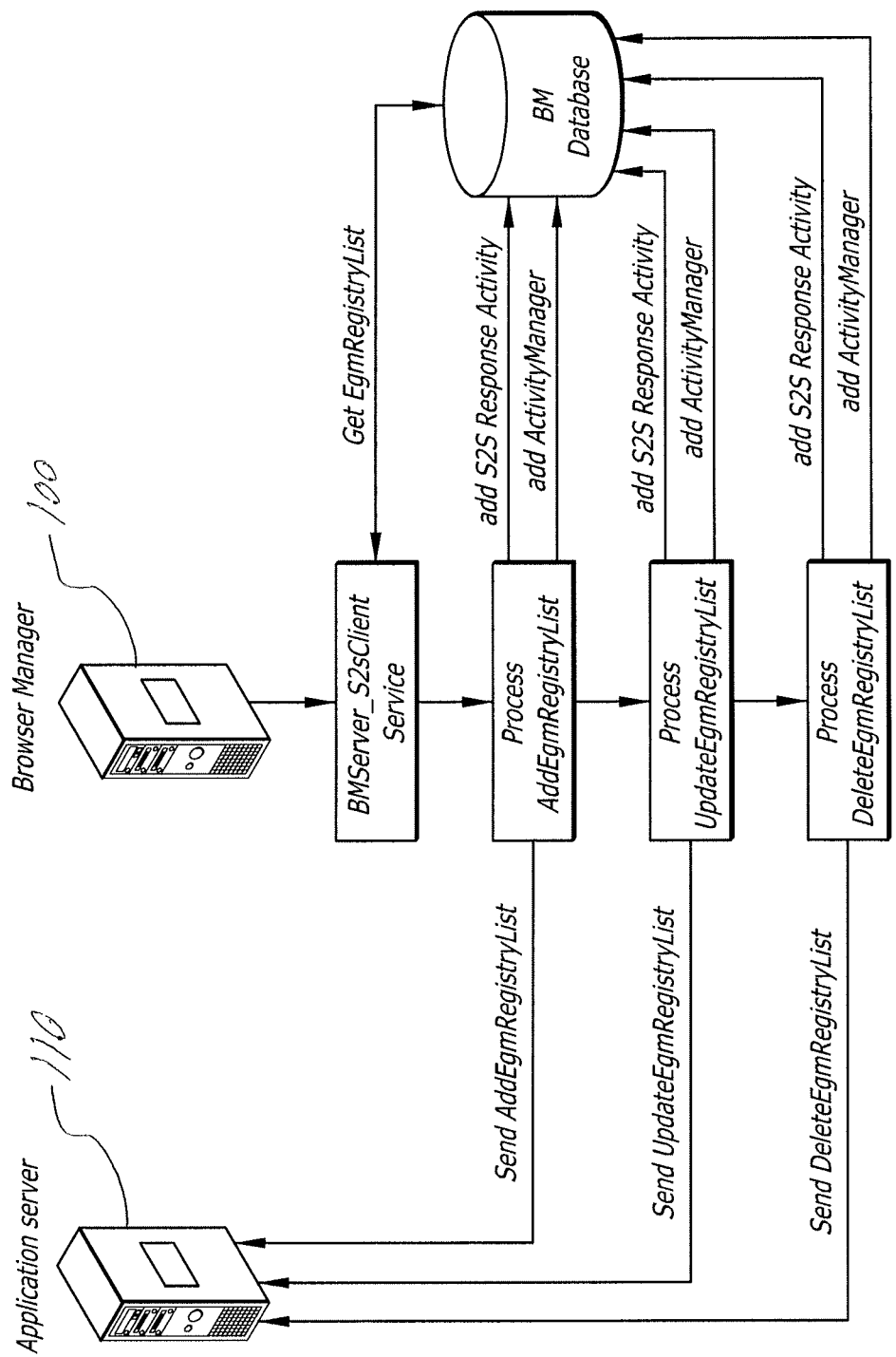
FIG. 16A-E illustrate example command processes as between an Application Manager (server) with a Browser Manager (client) in a gaming network in accordance with one or more embodiments.
Figure 16B:
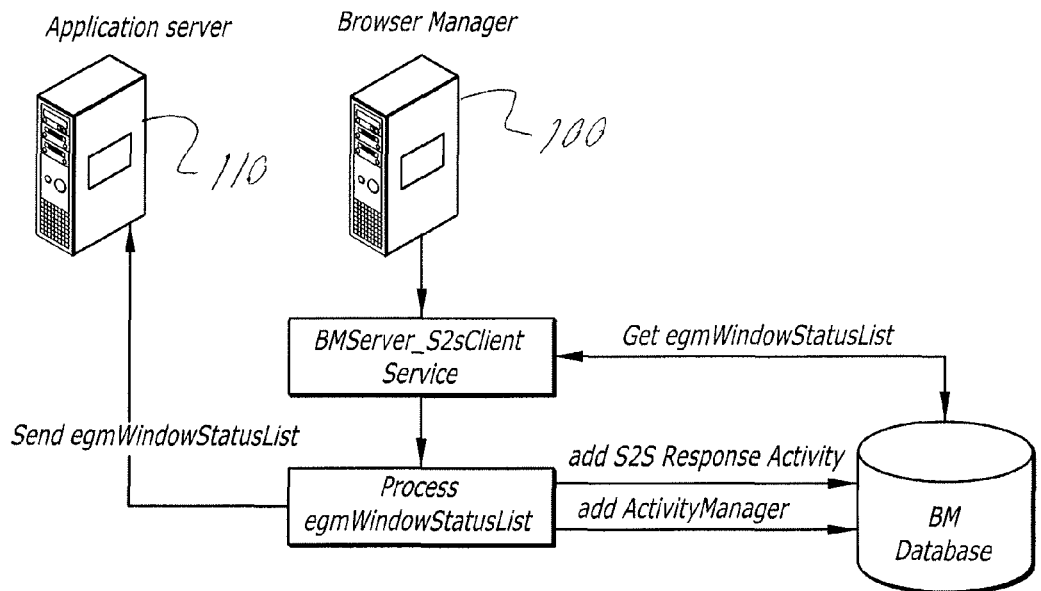

The service checks the EgmRegistryList and EgmWindowStatusList data tables for any new or modified or deleted records. If any are found, the service builds the respective messages with the data filled in as per the schema and sends the messages to S2S server component.

addEgmRegistryList, updateEgmRegistryList, deleteEgmRegistryList:

This command shown in FIG. 16A is sent by the Application Manager (server) to add or update or delete gaming machine registration(s) with the Application Server 110 (client). UpdateEgmRegistryList, deleteEgmRegistryList commands are processed same as above.

egmWindowStatusList:

This command shown in FIG. 16B is sent by the Application Manager (server) to send the current set of gaming machine browser application windows to an Application Server 110 (client).

G2S Commands Originated by Host:

| Request | Response |
|---|---|
| getBrowserStatus | browserStatus |
| setBrowserState | browserStatus |
| getBrowserProfile | browserProfile |
| getWindowList | windowList |
| setWindowList | windowList |
| addWindowList | windowList |
| deleteWindowList | windowList |
| updateWindowList | windowList |
| execBrowserScriptList | ackExecBrowserScriptList |

Figure 16C:
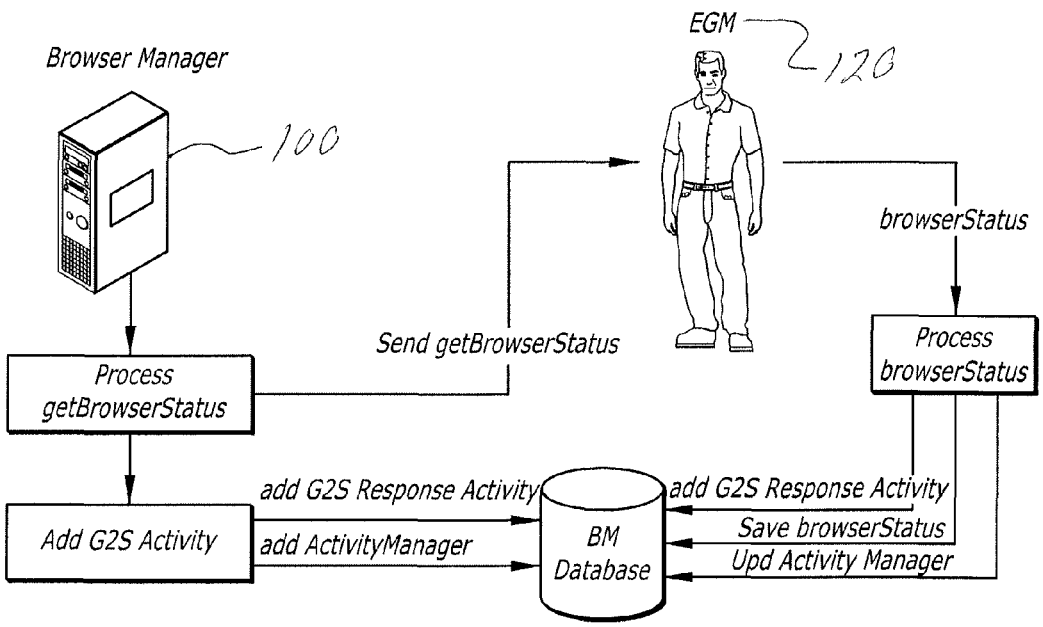

Referring to FIG. 16C, example getBrowserStatus, setBrowserState, getBrowserProfile communication processes are shown. The getBrowserStatus command is used by a host to request the current status information of the device. The BrowserStatus command is sent in response to the getBrowserStatus command. The setBrowserState command is used by a host to enable or disable the browser device. A BrowserStatus command is sent in response to a setBrowserState command. The getBrowserProfile command is used by a host to request the profile information of the device. The BrowserProfile command is sent in response to the getBrowserProfile command. SetBrowserState, getBrowserProfile commands are processed same as above.

Figure 16D:
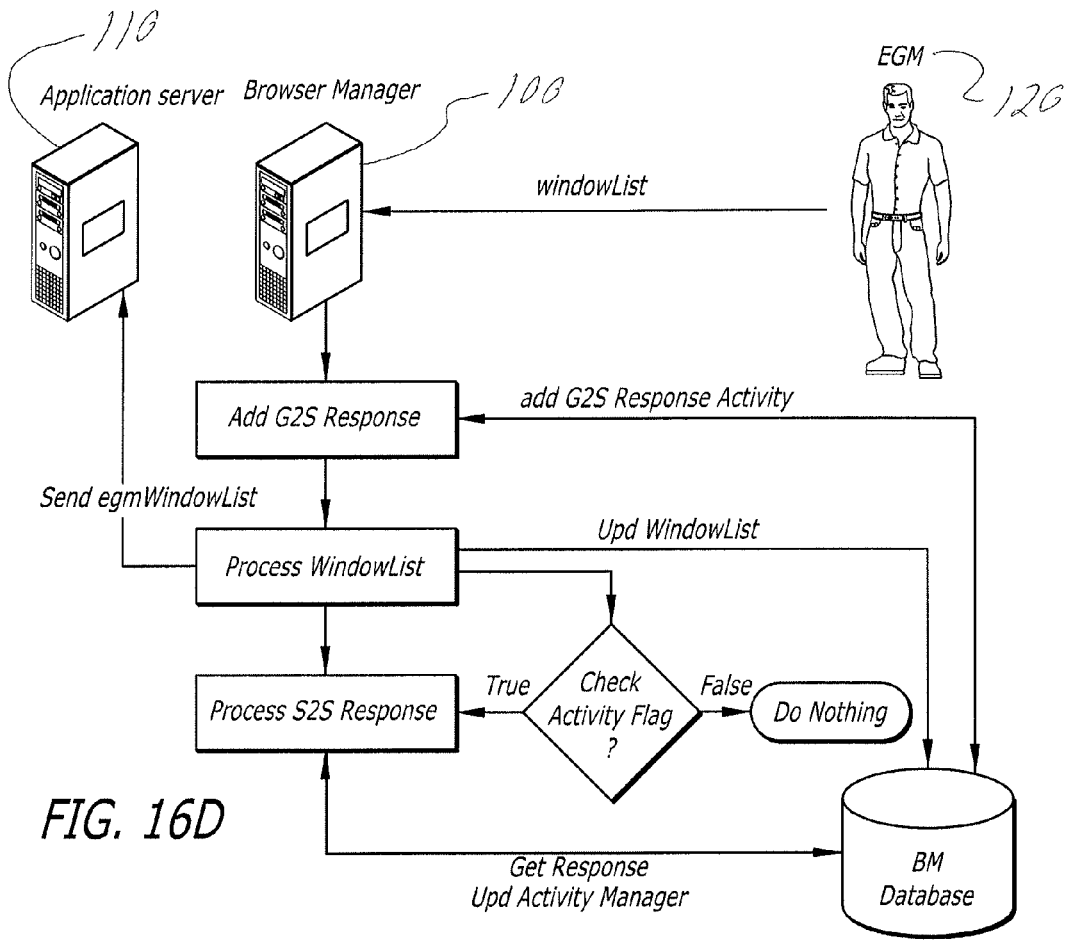

Referring to FIG. 16D, example windowList communication process is shown. The windowList command is used by gaming machine 120 to send the current set of browser windows to a host. The windowList command is sent in response to the getWindowList, setWindowList, addWindowList, deleteWindowList, and updateWindowList commands.

G2S Commands are Originated by Gaming Machine:

| Request | Response |
|---|---|
| windowStatus | None |

Figure 16E:
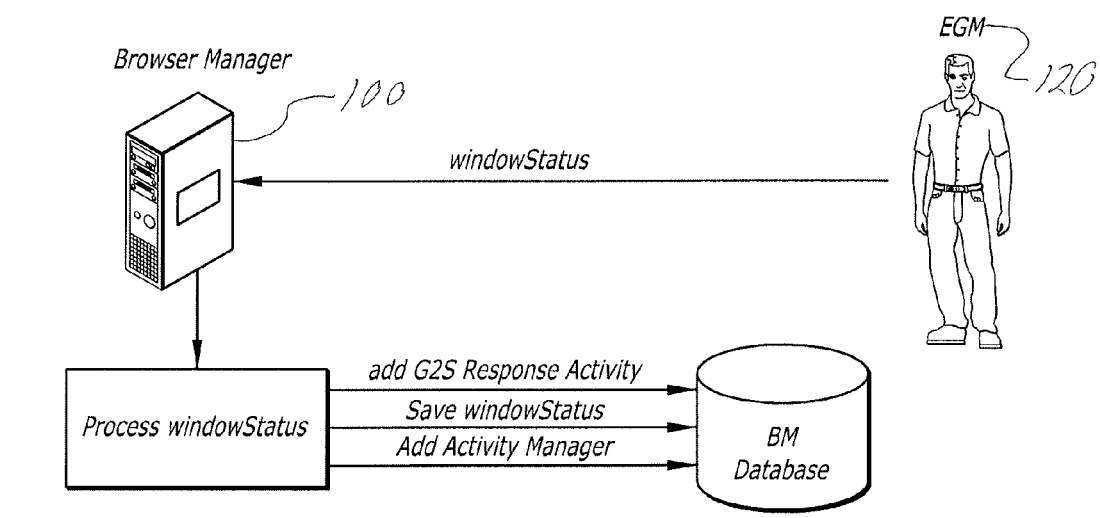

Referring to FIG. 16E, example windowStatus communication process is shown. The windowStatus command is sent by gaming machine 120 to notify the host that a browser window has changed state. The windowStatus command is a notification only command, thus has no response from the host.

Commands Request Response Pairs (S2S and G2S):

| S2S Request | S2S Response | BMS Process | G2S Request | G2S Response |
|---|---|---|---|---|
| | | BMS Process | getWindowList | windowList |
| getEgmWindowList | egmWindowList | | | |
| setEgmWindowList | ack5etEgmWindowList | | setWindowList | windowList ackExecBrowser |

-continued

| | | | |
|---|---|---|---|
| execEgm5criptFcnList | ackExecEgm5criptFcnList | execBrowserScriptList | ScriptList |
| addEgmWindowList | ackAddEgmWindowList | addWindowList | windowList |
| deleteEgmWindowList | ackDeleteEgmWindowList | deleteWindowList | windowList |
| updateEgmWindowList | ackUpdateEgmWindowList | updateWindowList | windowList |
| updateAppStatusList | ackUpdateAppStatusList | | |
| requestEgmAttentionList | ackRequestEgmAttentionList | | |
| | ackUpdateAppRegistryList | | |
| updateAppRegistry | | | |
| addEgm RegistryList | No response | | |
| delete EgmRegistryList | | | |
| | No response | | |
| updateEgmRegistryList | | | |
| | No response | | |
| egmWindowStatusList | | | |
| | No response | | |
| | | getBrowserStatus | browserStatus |
| | | setBrowserState | browserStatus |
| | | getBrowserProfile | browserProfile |
| | | WindowStatus | None |

Security:

The Browser Manager CUI Application uses Bally Desktop application for maintaining user security. The user management, group management and roles management are be performed using Bally Desktop application. The Browser Manager 100 does not store or maintain user information.

Each Browser Manager user is assigned to a group, which is associated with a set of pre-defined roles. The user enters user ID and password using Bally Login form and system verifies the data with database and displays the main form of the application. Based on the valid user ID, system gets the security group to which user belongs and generates the menu dynamically.

Data Design:

The "Bally_Browser Manager" database is responsible to store all the data related to Browser Manager applications. The applications connect to database using ADD.Net for all the data modifications and data retrievals. Data modifications and transaction queries are coded in stored procedures. The data access layer class sends requests to typed datasets and gets response, which would be sent back to the Browser Manager CUI through web services. Finally, the database design and development is based on meeting the best practices specified in Bally Database Best Practices and Standards Document (revision A). All the SQL queries have to be coded in stored procedures.

TABLE 37

Application Registry:

| Data Field Name | Type | Description |
|---|---|---|
| Application Id | integer | Unique identifier assigned to Application |
| Application Name | string | Unique name assigned to Application |
| Application Description | string | Description of the application |
| Application Host | string | Address to communicate with the application host |
| Application URL | string | URL that points to the application |
| Application Session Id | integer | Application Session Identifier |
| Icon URL | string | con image URL used to represent the application in the gaming machine top |

TABLE 37-continued

Application Registry:

| Data Field Name | Type | Description |
|---|---|---|
| | | monitor panel. Icon image could reside on application server. |
| Icon Text | string | Icon image text used to represent the application in the gaming machine top monitor panel. |
| Offline Icon URL | string | A fallback icon image URL used when application server is offline. |
| Offline Application URL | string | A fallback page URL used when application server is offline. |
| Status | string | Identifies the status of the application session |

TABLE 38

Gaming Machine

| Data Field Name | Type | Description |
|---|---|---|
| Egm Id | String | Unique gaming machine identifier |
| Egm Name | String | gaming machine Name |
| Egm Serial Number | String | gaming machine Serial Number |
| Asset Number | Integer | Asset Number |
| Egm IP Address | String | gaming machine IP Address |
| Egm Model Name | String | gaming machine Model Name |
| Currency Id | Char | |
| Locale Id | Char | |
| Area | String | |
| Zone | String | |
| Bank | String | |
| Is Online | Boolean | Indicates gaming machine online or offline |
| Browser H Position | Integer | |
| Browser V Position | Integer | |
| Browser Width | Integer | |
| Browser Height | Integer | |

TABLE 39

Game

| Data Field Name | Type | Description |
|---|---|---|
| Game Name | String | Name of the Game |
| Theme | String | |
| Pay Table | String | |
| Denomination | Integer | |

TABLE 40

Layout

| Data Field Name | Type | Description |
|---|---|---|
| Layout Id | Integer | Layout identifier |
| Layout Name | String | Name of the layout |
| Layout Description | String | Description given to the layout |
| Layout Image | String | Layout image would be stored in database table |
| Layout Pane Z | Integer | Z order of the layout pane |
| Layout Pane X | Integer | X position of layout pane |
| Layout Pane Y | Integer | Y position of layout pane |
| Layout Pane W | Integer | Width of layout pane |
| Layout Pane H | Integer | Height of layout pane |

TABLE 41

App Window

| Data Field Name | Type | Description |
|---|---|---|
| App Window Id | Integer | Unique App Window Identifier |
| Coordinate X | Integer | App Window coordinate X |
| Coordinate Y | Integer | App Window coordinate Y |
| Coordinate Z | Integer | App Window Z order |
| Size Width | Integer | App Window width |

TABLE 41-continued

App Window

| Data Field Name | Type | Description |
|---|---|---|
| Size Height | Integer | App Window height |
| Script Type | String | Type of script to be executed example: Javascript, vbscript |
| Script Function | String | Name of the script function |
| App Window URL | String | URL of the App Window |
| Visible | Boolean | Visibility of App Window true or false |
| HTTP Status Code | String | Any HTTP status code example: 404 page not found |
| Error Text | String | Error message text if any |
| Window Status | String | Status of the window |

User Interface (UI) Design

The Browser Manager UI application is presented in rich dynamic windows forms with smart client features such as easy deployment and automatic updates, ability to use local resources and use XML Web Services to support service-oriented architecture. The application provides outlook email style of navigation menu to various forms, which include managing applications, application status, gaming machine status, browser layouts, managing security permissions and reports. The UI application uses HTTPS to communicate securely with the 115 server, using SOAP protocol.

Following table lists the web method calls from UI forms to .Net web service. All the below method calls are request and response model type.

TABLE 42

Web Method Calls

| Name | Description | Input Type | Return Type |
|---|---|---|---|
| GetApplicationsList | Request for Applications list | RowSelector | ApplicationsList |
| AddAppRegistration | Request to create new App | Registration | DBResult |
| EditAppRegistration | Request to update application | AppRegistration | DBResult |
| DeleteAppRegistration | Request to delete application | RowSelector | DBResult |
| GetAllEgmList | Request for Egm List | RowSelector | EgmList |
| GetEgmSummaryById | Request for Egm Summary | RowSelector | EgmList |
| GetAllApplicationEgmList | Request for Applications and EagmList | RowSelector | ApplicationEgmList |
| GetAllSecurityGroups | Request for Security Groups | RowSelector | GroupsList |
| GetPermissionsByGroup | Request for permissions based on security group | GroupId | PermissionsList |
| UpdatePermissions | Request to update Permissions list | Permissions | DBResult |
| UserAuthenticate | Request for user Login | Login | Permissions |

Figure 17:
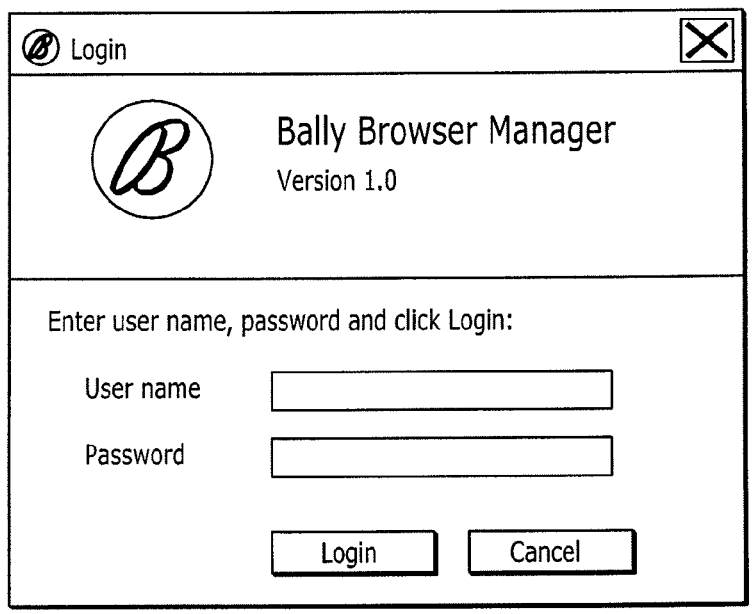
FIG. 17 illustrates an example Login Screen generated by a Browser Manager (client) in a gaming network in accordance with one or more embodiments.

Screen Images:

Referring to FIG. 17, example Login Screen is shown. Users login to the system with a previously assigned login ID and password. Based on the user security group and permissions, selective menu options for various interactive forms are presented in the left menu.

Figure 18:
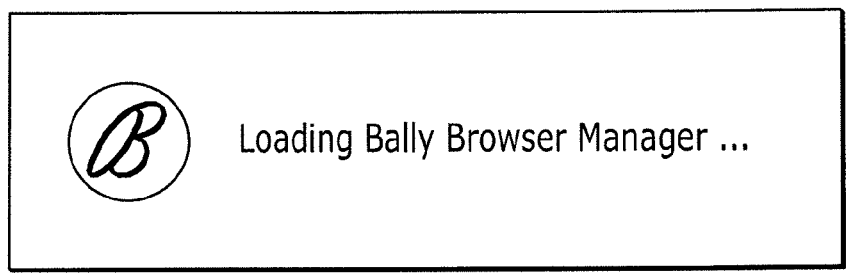
FIG. 18 illustrates an example Loading splash screen generated by a Browser Manager (client) in a gaming network in accordance with one or more embodiments.

Referring to FIG. 18, example Loading splash screen is shown (screen will be shown on successful login). The splash screen is displayed after user submits login form. Subsequently, the fully loaded splash screen is closed automatically.

Figure 19:
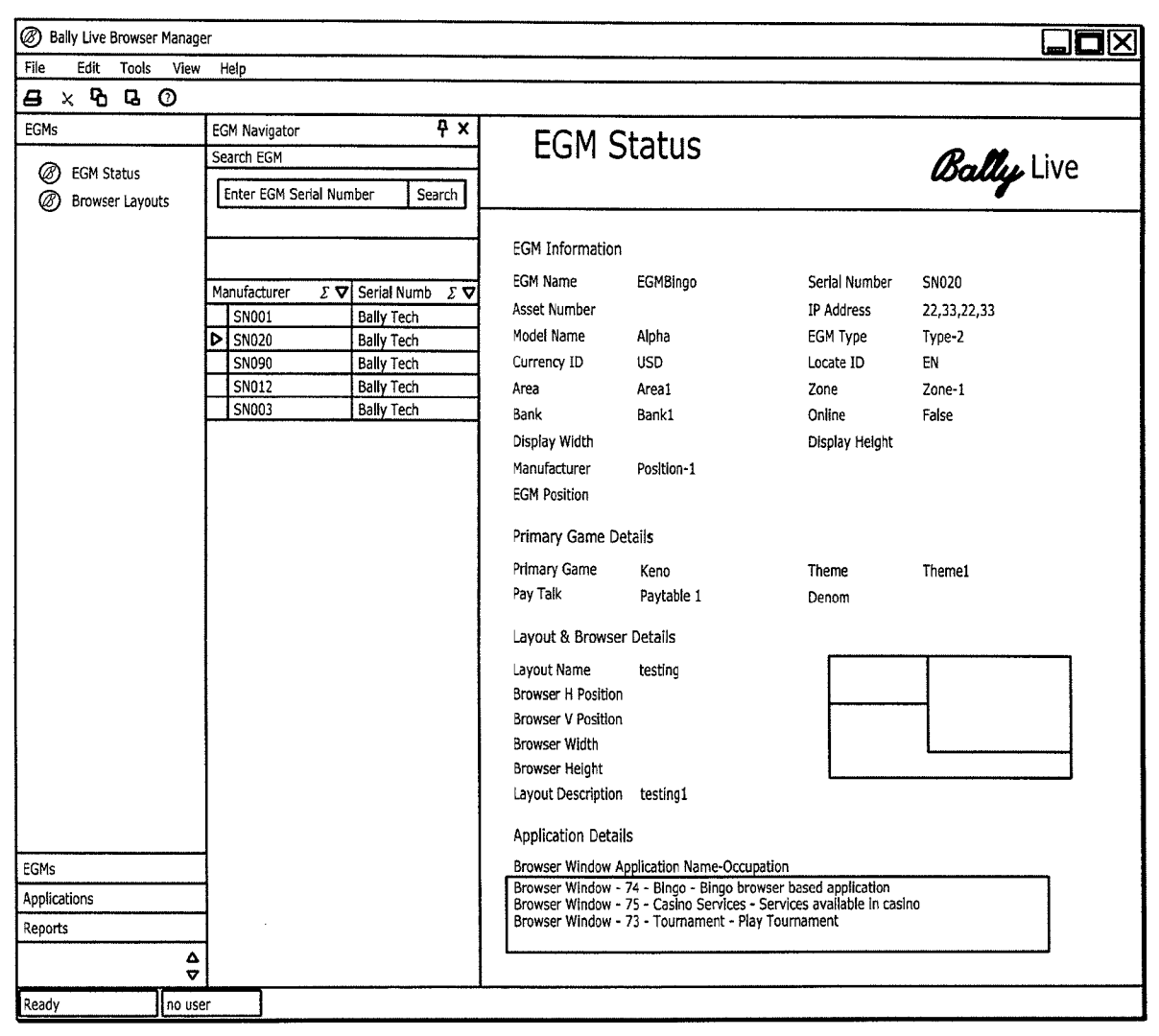

Referring to FIG. 19, example Browser Manager Main form panel is shown. Main form displays the left menu with all the available menu options (gaming machine, Application, Security and Reports) in Outlook style layout. The gaming machine Navigator displays the registered gaming machines with an option to search for a particular gaming machine based on serial number. When user selects a particular gaming machine, gaming machine status form displays full summary of gaming machine information including primary game, browser, applications and layout details.

Figure 20A:
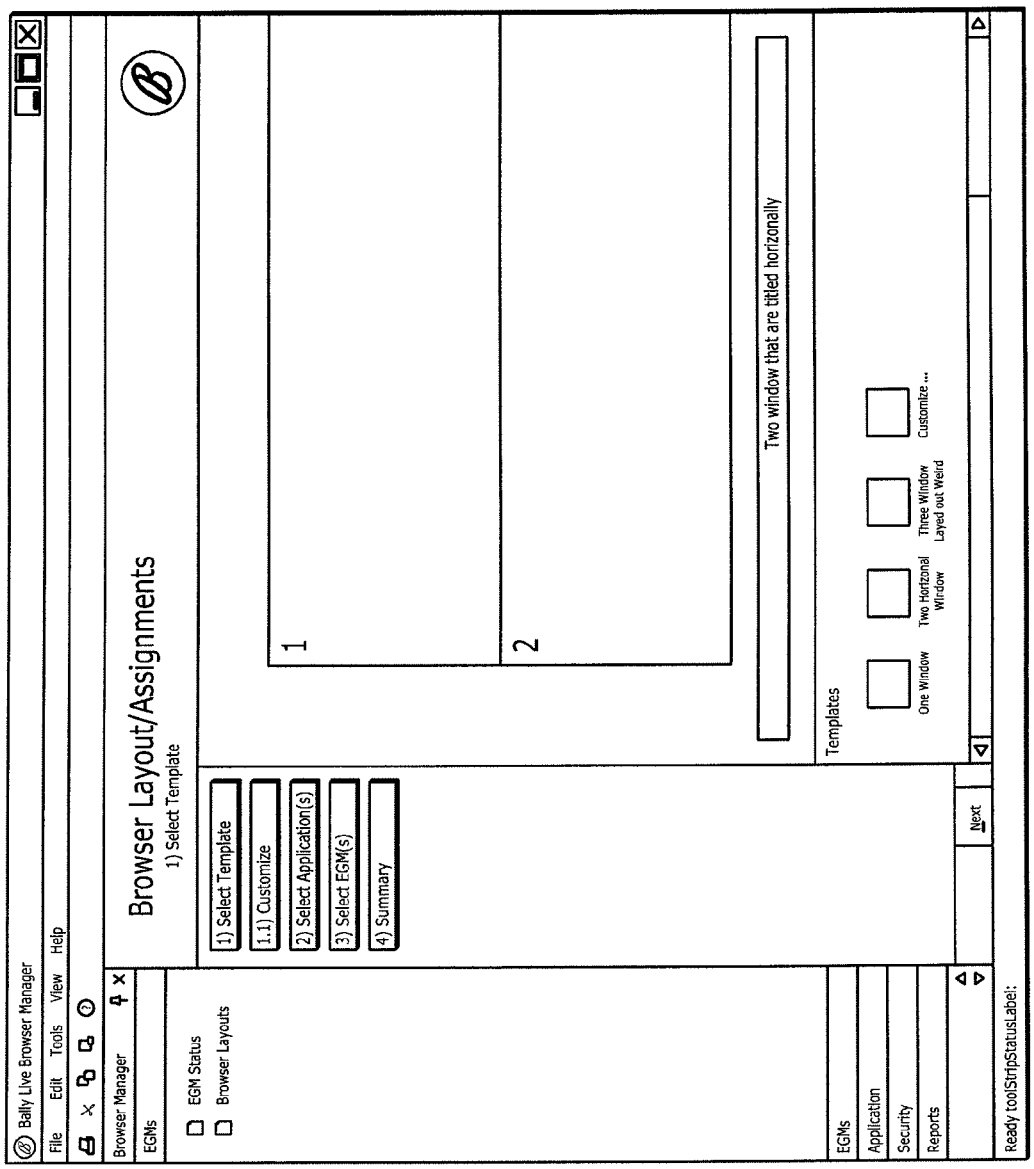
FIGS. 20A-E illustrate a series of Browser Layout/Assignments panels generated by a Browser Manager (client) in a gaming network in accordance with one or more embodiments.

Referring to FIG. 20A, Browser Layout/Assignments panel is shown. Browser Layout/Assignments: Step 1

The screen displays the available layout templates for gaming machines. The user can select the existing template or customize a new template. To modify/delete layout details right click on the layout, use the context menu to click on modify or delete options.

Figure 20B:
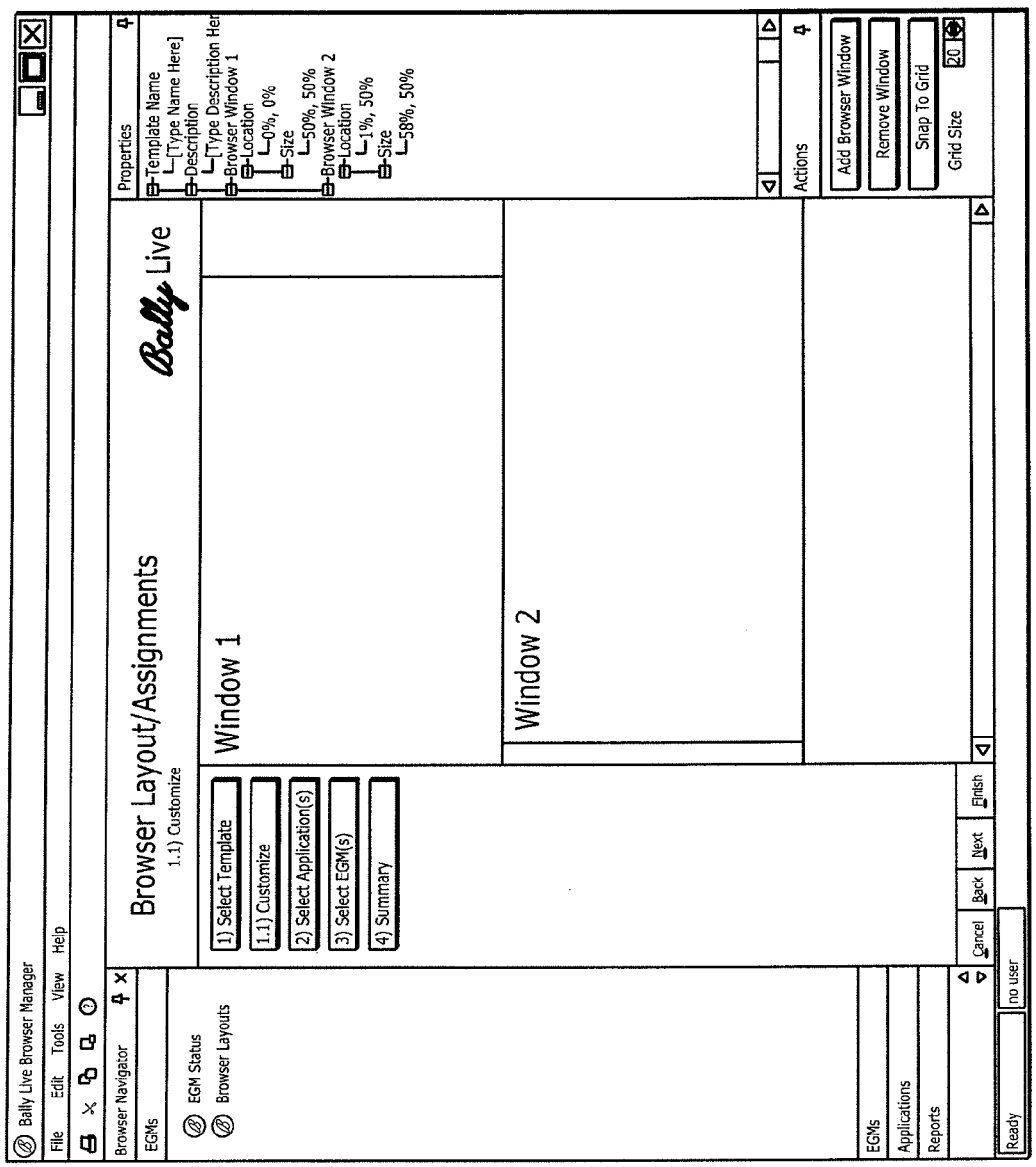

Referring to FIG. 20B, Browser Layout/Assignments: Step 1.1 is shown.

The screen generates a custom layout. The user can add/remove windows, drag and place window in desired position. The location of the windows is normalized. The template name, description, browser window location and size can be updated using the properties menu. The user clicks on next button and system generates the custom template.

Figure 20C:
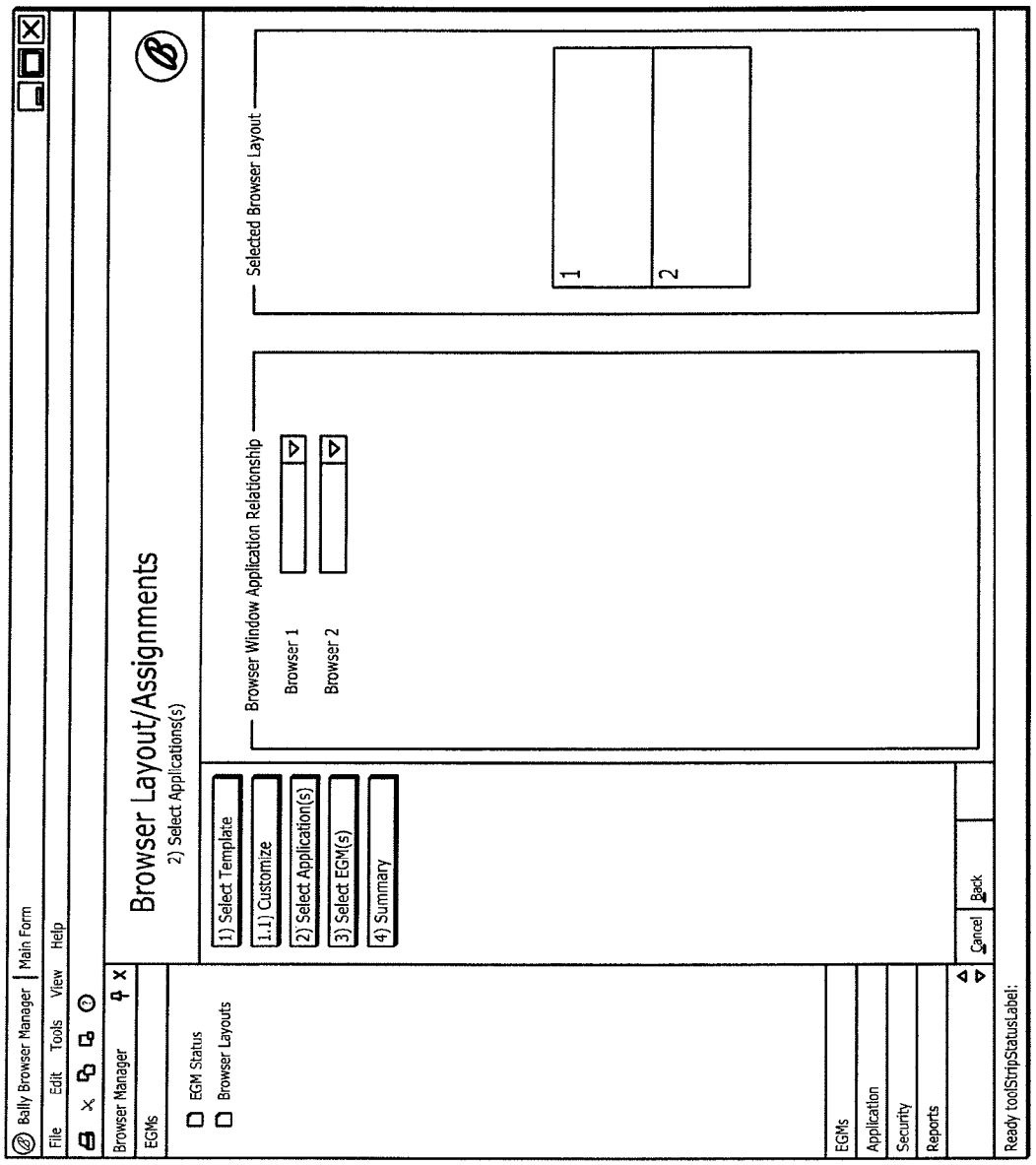

Referring to FIG. 20C, Browser Layout/Assignments: Step 2 is shown.

The user selects the application that would be displayed in each browser window. User can click on back button to go back to the previous screen.

Figure 20D:
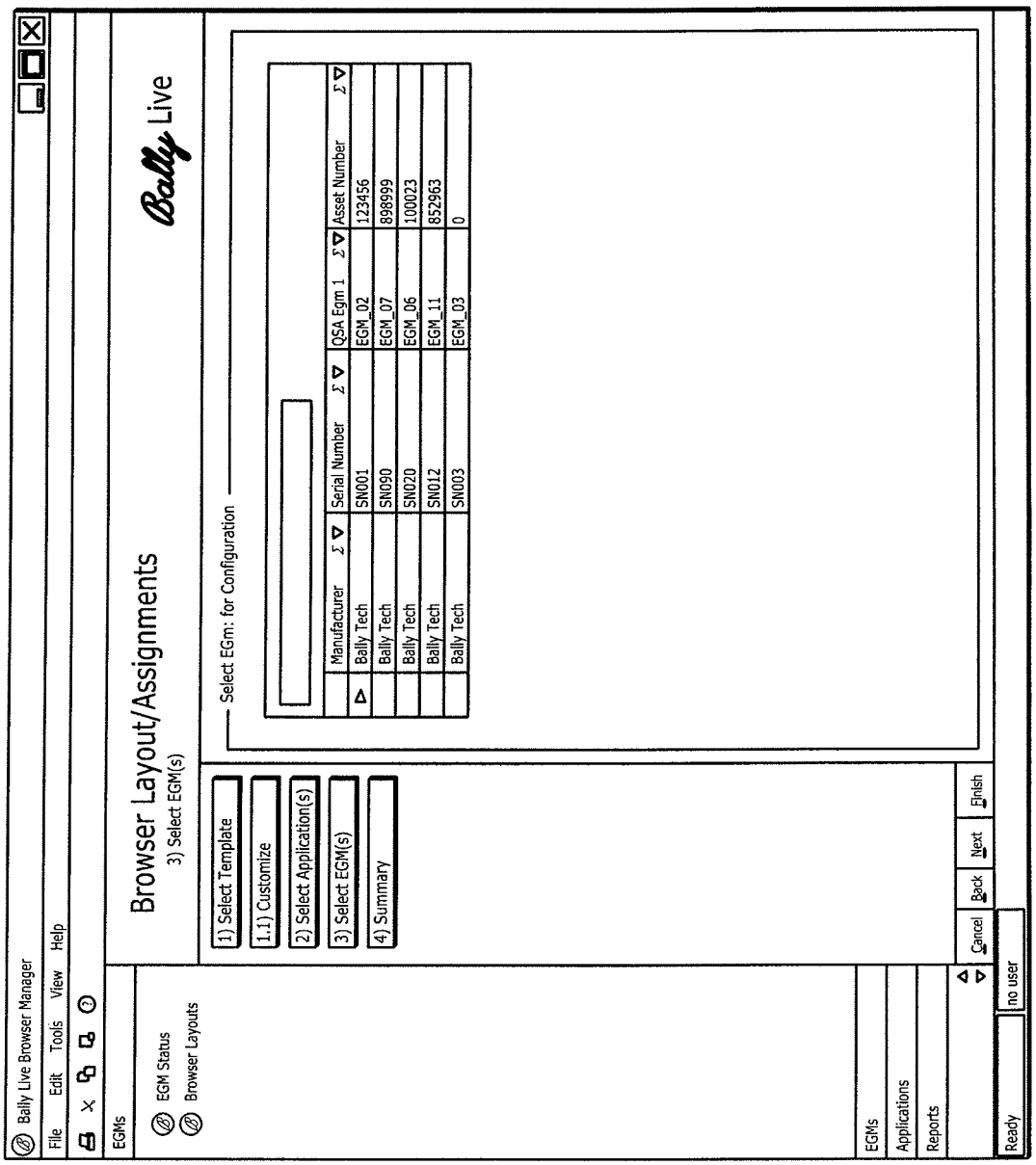

Referring to FIG. 20D, Browser Layout/Assignments: Step 3 is shown.

The following screen to assign the layout to various gaming machines. The selected gaming machines are configured with the layout chosen in previous screen.

Figure 20E:
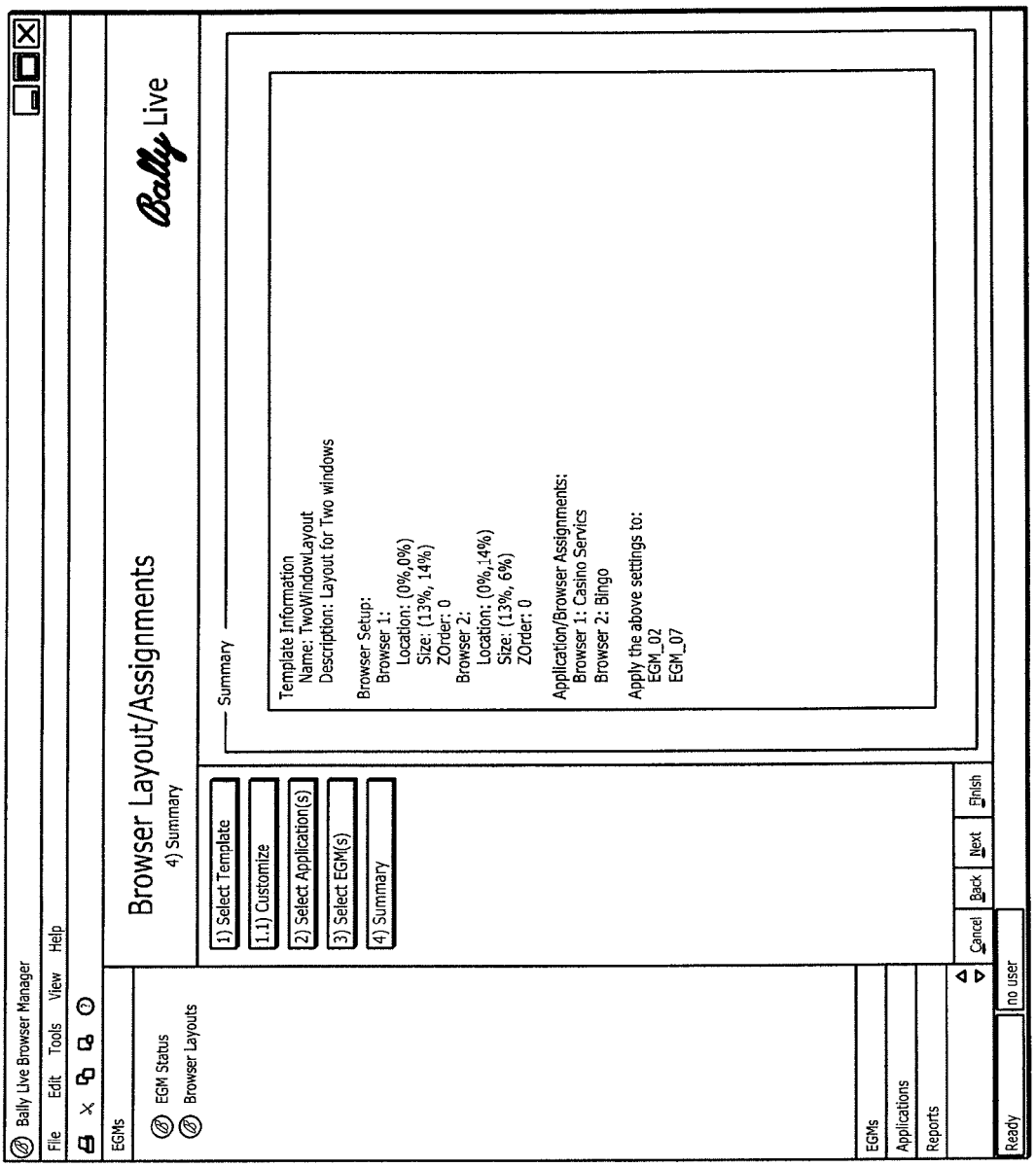

Referring to FIG. 20E, Browser Layout/Assignments: Step 4 is shown.

The summary of the browser layout configuration will be displayed.

Figure 20F:
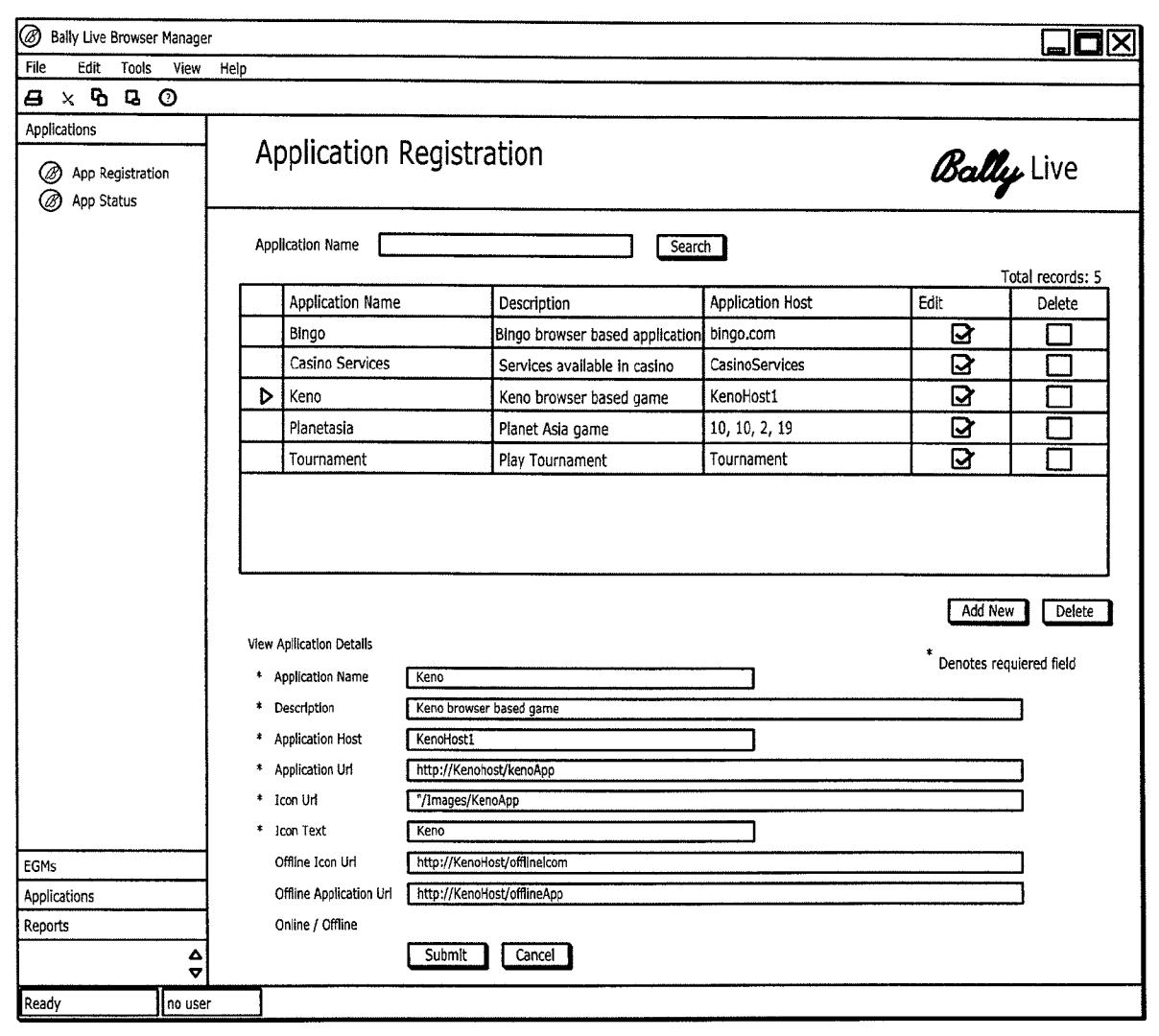

Referring to FIG. 20F, example Application Registration panel is shown.

This screen manages applications. The user can select the application from the available application list and system displays the application information in the details panel. The user has an option to search for a particular application based on the application name. The user can Add, Edit or Delete the applications.

Figure 20G:
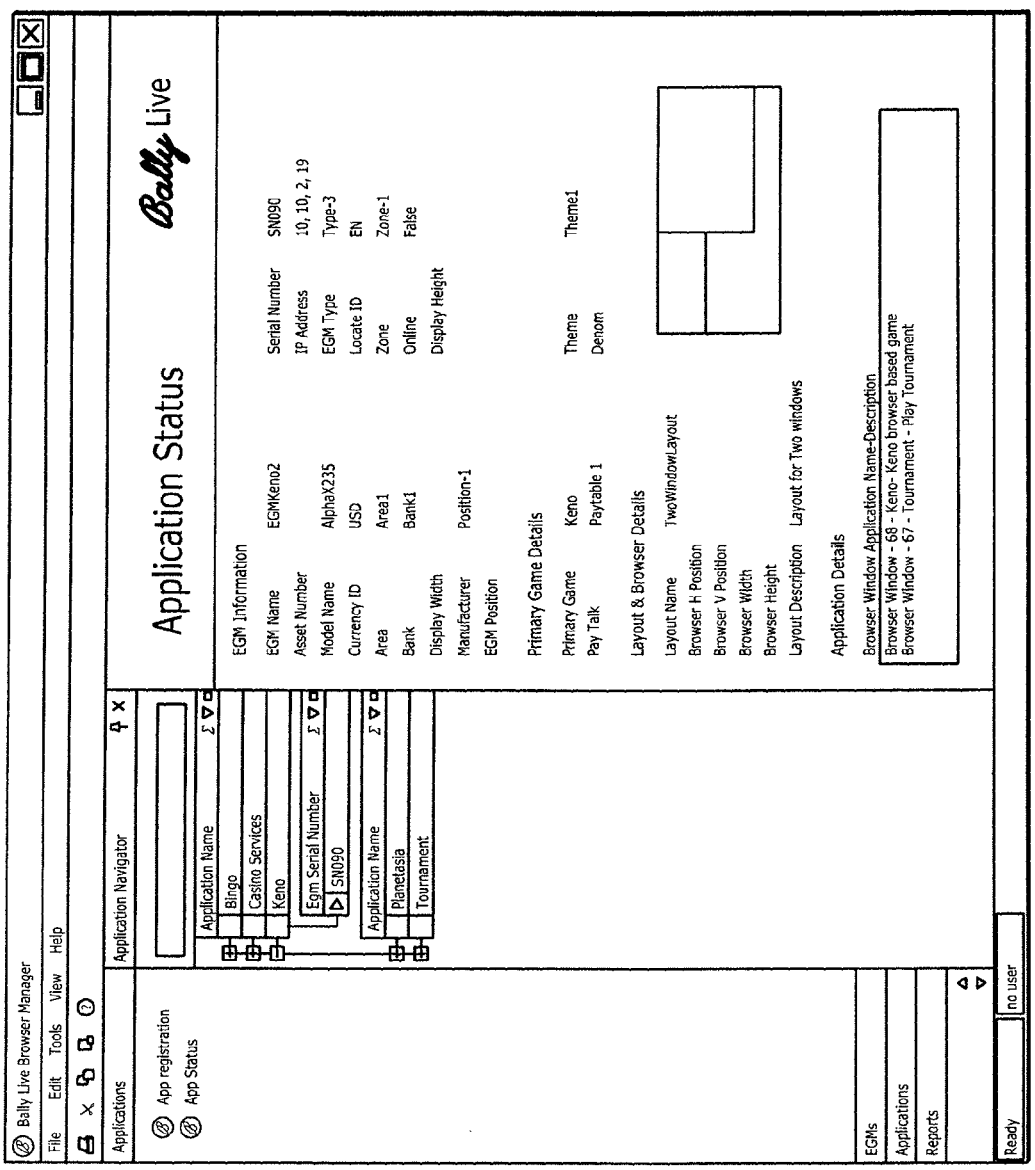
FIG. 20G illustrates an Application Status panel generated by a Browser Manager (client) in a gaming network in accordance with one or more embodiments.

Referring to FIG. 20G, example Application Status panel is shown.

The screen displays the Application Navigator with the available applications registered in BMS system and the gaming machines running the applications. The user can select a particular gaming machine by selecting the gaming machine serial number to view the full summary of the selected gaming machine.

Figure 20H:
FIG. 20H illustrates a Permissions panel generated by a Browser Manager (client) in a gaming network in accordance with one or more embodiments.

Referring to FIG. 20H, example Security: Permissions panel is shown.

The screen also manages permissions in BMS application. When the user selects a particular Security Group from the available list, the system displays the permissions associated to that selected group in the permissions panel. Only users with administrative permissions are able to view and manage this form. The users select/unselects the displayed permissions for the security group and submit the form to save the information in database.

Figure 20I:
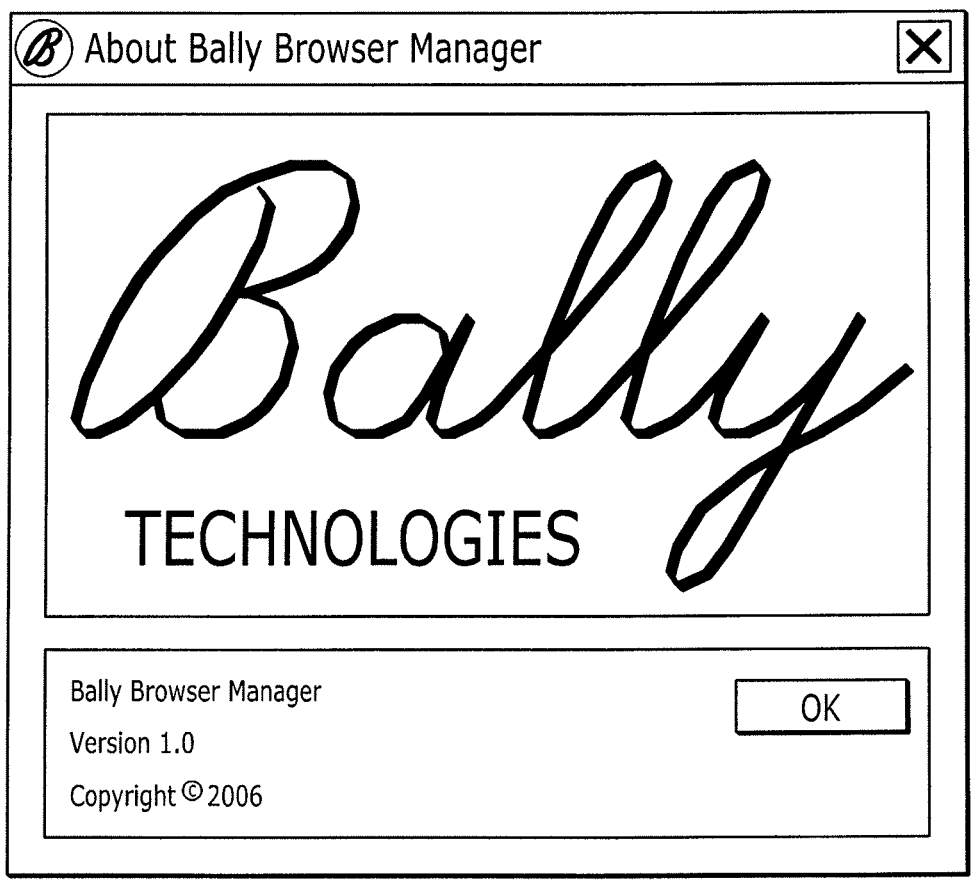
FIG. 20I illustrates a Browser Manager About panel generated by a Browser Manager (client) in a gaming network in accordance with one or more embodiments.

Referring to FIG. 20I, example About Screen panel is shown.

Example Interface Design Rules and Limitations:

The system displays the main form with navigation menu on the left side based on the login user security permissions. The user selects the desired form from the menu, and the system displays the form in main content area (not in a new window). Forms are developed as .net user controls and added to the main menu dynamically based on the user selection. Forms submitted have to be validated on the client side and connected to the .Net web service to process the request/response with secured authentication.

Example Design Limitations and Constraints:

Application requires .Net 2.0 framework to be installed in client's computer as prerequisite.

Protocol Communication:

Referring generally to the drawings and more particularly to FIG. 13, the protocol between the third party or in house application server 110 and the Browser Manager 100 provides for the communication of the player's name, address, phone, email, casino patron ID, Casino Club level, casino ID, casino name, other casino related data, player alias name, and other related demographic material that the casino has in its player tracking database (CMS/CMP). This demographic data is important so the application server 110 can be offsite and not only control what the player sees on the appropriate browser window, but can drive player centric media content to this specific player on this specific gaming machine 120. The third party application may use this information to create a unique user account at the third party database servers. Thus every time the patron selects the specific third party web portal link on the browser client application on the gaming machine 120 then the automatic login to that third party user account could occur. The third party servers may maintain state information in its application servers 110. Thus a casino patron can leave one gaming device while navigating the third party site, then identify him/herself at a second gaming device on this property or another casino property and then continue any transactions or games where they left off on the prior gaming machine 120. The third party server would be provided with player card in/out notification to ensure that they can open and close their web portal session at the same time as the gaming session is closed. Other forms of player identification at the gaming device are envisioned including biometric identification, smart card, proximity detection and identification, username and password or other supplied unique player identifier.

The Browser Manager 100 can send and receive messages to any application server 110 connected to the network. The Browser Manager 100 is also intended to drive browsers throughout the casino enterprise including on iVIEW player tracking displays, an gaming machine monitor or monitors, overhead signage, in room TV set top boxes that support browsers or can stream browser content at the server to these TVs, casino web portals, wireless gaming devices or tablets, cell phones, video table gaming devices or bartop gaming devices.

In effect the Browser Manager 100 is a secure server that controls what data can be shown on what screen in which browser window and in what order. The Browser Manager 100 forms the basis of a unified media management system for the casino enterprise. The Browser Manager 100 links authorized third party servers to the various displays throughout the property. Non-preauthorized servers are blocked from getting focus on these displays or running their applications in any way on displays throughout the enterprise. In one or more embodiments, this may be particularly important especially with highly regulated gaming devices.

Third party servers may also have the ability to request funds transfer to pay for services, games or merchandise that the player desires to obtain. The funds transfer request is received by the Browser Manager 100 with information regarding the casino ID, gaming machine ID, the player ID, the transaction ID, transaction description data, date/time stamp, Application ID, and other data to uniquely identify the person and device who are requesting the purchase. The Browser Manager 100 will communicate to the gaming machine 120 or the CMP/CMS player account for available funds. If funds are sufficient a multi-step transaction is initiated between the various servers and clients to do the electronic funds transfer or AFT funds transfer. The GSA WAT class is preferably used to move money on and off the gaming device. In one embodiment the funds come from the player's account (front money, credit account, bonus point account) and don't affect the gaming machine whatsoever. Full audit reports of these transactions are created for later regulator, casino, and patron review.

The third party can only request funds from this player or gaming machine 120 or from the casino funds. The banking servers, gaming machine meters or player accounts will debit if sufficient funds are available. Third parties will be able to issue receipts for these purchased items and these receipts will be printed out of the printer(s) inside the gaming machine 120, either by using a dual port printer, or using the G2S voucher class, or using a second printer configured to print these server originated vouchers, receipts, coupons, and the like.

This request to print a receipt is provided through an S2S protocol between the third party and the Browser Manager 100 or another casino server responsible for printing vouchers at the gaming terminals or at kiosks throughout the property.

Funds or winnings that come from these third party applications can be applied to the player account or the gaming machine meters directly whether or not the player is identified at the gaming device. There is a S2S protocol between the third party application server 110 and the Browser Manager 100 or other Casino Banking Server to implement this funds transfer to the player account or to the gaming machine credit or bonus credit meters (restricted or non-restricted credits). The third party can request a cash, point, or other voucher to be printed from the gaming device to award bonus', offers, receipts or other information from the gaming device.

The WAT class, or SAS AFT/EFT protocol to the gaming device allow for these transfers. The G2S voucher class may be used as well to directly print these bonuses, offers, receipts or other information that the third party desires the patron to have.

While the example embodiments have been described with relation to a gaming environment, it will be appreciated that the above concepts can also be used in various non-gaming environments. For example, such rewards can be used in conjunction with purchasing products, e.g., gasoline or groceries, associated with vending machines, used with mobile devices or any other form of electronic communications. Accordingly, the disclosure should not be limited strictly to gaming or arcades or to portal based game sites.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed is:

1. An integrated browser manager and networked gaming system including server based dynamic content for display of a content display area of one or more gaming machines, the system comprising:
a browser manager, wherein the browser manager includes a graphical user interface application, a web service, and a core service, wherein the graphical user interface application generates a graphical user interface display on a user control station;
one or more application servers connected to the browser manager by a first server and a first web service, wherein one or more gaming machines are connected to the browser manager by a game-to-server second server and a second web service, wherein each gaming machine including a network interface to receive external content from the application server via the browser manager, and a content display area for displaying the external content;
wherein the browser manager converts incoming messages with respect to browser manager schema, processes incoming commands, and validates incoming message data, and wherein the system enables an ID provider class to generate a required new ID from an ID provider data table, for incoming commands from gaming machines, by incrementing a relevant key ID based on category and key name.

2. The system of claim 1, wherein the browser manager enables creating one or more browser windows on a display of a gaming machine, positioning one or more browser windows next to each other on a display of a gaming machine in an X-Y plane of a coordinate system; and positioning an order of two or more browser windows on top of each other on a display of a gaming machine along a Z axis of the coordinate system, wherein the Z-axis is normal to the X-Y plane of the coordinate system.

3. The system of claim 1, wherein the browser manager enables creating and positioning one or more browser windows on a display of a gaming machine from the server in an X-Y plane of a coordinate system; and enabling server side control of two or more browser windows on top of each other along a Z axis of the coordinate system, wherein the Z-axis is normal to the X-Y plane of the coordinate system.

4. The system of claim 1, wherein the browser manager includes a director application that enables frame management of one or more browser windows on any device in the casino property.

5. The system of claim 1, wherein the browser manager includes a director application that enables determination of proper order at least partially by player requests and casino business rules.

6. The system of claim 1, wherein the browser manager includes a director application that receives requests for order of browser windows from clients and servers.

7. The system of claim 1, wherein the browser manager includes a director application that enables, if casino business rules allow, proper order of a browser window to deliver media to casino patrons.

8. The system of claim 1, wherein the browser manager includes a browser window and user interface for a player who selects a slot statistics application showing recent win/loss activity on the gaming device through the browser interface.

9. The system of claim 1, wherein the browser manager includes a main form panel generated by a browser manager client in a gaming network.

10. The system of claim 1, wherein the browser manager enables browser layout and assignments panels to be generated by a browser manager client in a gaming network.

11. The system of claim 1, wherein the browser manager is configured to:
select a customizable browser window template;
customize browser window location and size for one or more browser windows;
select an application to be displayed in each browser window;
enable selected gaming machines to be configured with the selected customized browser windows; and
display a summary of browser window configurations.

12. The system of claim 1, wherein the browser manager enables a base game to take over the entire screen or the top panel of the screen automatically.

13. The system of claim 1, wherein the browser manager enables a base game to take over the entire screen or the top panel of the screen due to the base game having master control as a regulated gaming machine.

14. The system of claim 1, wherein the browser manager enables a base game to give up control of an active window on a display screen when a base game has completed its priority content.

15. The system of claim 1, wherein the browser manager enables a player to drag and drop browser windows in various positions around a display screen.

16. The system of claim 1, wherein the browser manager enables a player resize each browser window using controls associated with the browser window.

17. The method of claim 16, wherein content within the browser window is scaled accordingly with the browser window.

18. The method of claim 16, wherein content a smaller window remains at the original size, and a player may only view a portion of the content in the smaller window at a time.

19. The method of claim 18, wherein a player may slide original sized content around within the smaller window using a finger gesture and a slider bar.

20. An integrated browser manager and networked gaming system including server based dynamic content for display of a content display area of one or more gaming machines, the system comprising:
a browser manager, wherein the browser manager includes a graphical user interface application, a web service, and a core service, wherein the graphical user interface application generates a graphical user interface display on a user control station;
one or more application servers connected to the browser manager by a server-to-server (S2S) server and S2S web service, wherein the one or more gaming machines are connected to the browser manager by a game-to-server (G2S) server and G2S web service, wherein each gaming machine including a network interface to receive external content from the application server via the browser manager, and a content display area for displaying the external content;
wherein the browser manager is configured to:
convert incoming S2S or G2S messages to a browser manager message with respect to browser manager schema;
validate incoming message data with available data in a database; and
enable an ID provider class to generate a required new ID from an ID provider data table, for incoming commands from gaming machines, by incrementing a relevant key ID based on category and key name.

21. The system of claim 20, wherein the browser manager enables creating one or more browser windows on a display of a gaming machine from the server, positioning one or more browser windows next to each other on a display of a gaming machine from the server in an X-Y plane of a coordinate system; and positioning an order of two or more browser windows on top of each other on a display of a gaming machine from the server along a Z axis of the coordinate system, wherein the Z-axis is normal to the X-Y plane of the coordinate system.

22. The system of claim 21, wherein one of the one or more browser windows is linked to a universal resource locator (URL).

23. The system of claim 21, wherein each of the one or more browser windows is linked to a different URL.

24. The system of claim 21, wherein one of the one or more browser windows is linked to an application.

25. The system of claim 21, wherein each of the one or more browser windows is linked to an application.

26. The system of claim 21, wherein one of the one or more browser windows is a parent browser window and remaining browser windows are child browser windows, and wherein browser layout management incorporates prioritization of the parent browser window.

27. The system of claim 21, wherein parent browser window maintains the highest Z axis position on the display in an X-Y plane of a coordinate system, wherein the Z-axis is normal to the X-Y plane of the coordinate system.

28. The system of claim 21, wherein parent browser window status can be changed to child browser window status by the server via the network, and wherein child browser window status can be changed to parent browser window status by the server via the network.

29. The system of claim 21, wherein child browser window positioning is based off of parent window position as a frame of reference.

30. The system of claim 21, wherein a new browser window is creatable on the display screen at a highest Z axis position in an X-Y plane of a coordinate system, wherein the Z-axis is normal to the X-Y plane of the coordinate system, relative to other browser windows, to alert a player of priority information.

31. The system of claim 21, wherein a new browser window is creatable on the display screen of a gaming machine to deliver a message to a player.

32. The system of claim 21, wherein a child browser window is emphasized on the display screen to alert a player of priority information relating to the child browser window, and encourage a player to re-designate the child browser window as the parent browser window.

33. An integrated browser manager and networked gaming system including server based dynamic content for display of a content display area of one or more gaming machines, the system comprising:
- a browser manager, wherein the browser manager includes a graphical user interface application, a web service, and a core service, wherein the graphical user interface application generates a graphical user interface display on a user control station;
- one or more application servers connected to the browser manager by a server-to-server (S2S) server and S2S web service, wherein the one or more gaming machines are connected to the browser manager by a game-to-server (G2S) server and G2S web service, wherein each gaming machine including a network interface to receive external content from the application server via the browser manager, and a content display area for displaying the external content;
- wherein the browser manager converts incoming messages with respect to browser manager schema, processes incoming commands, and validates incoming message data, and wherein the system enables an ID provider class to generate a required new ID from an ID provider data table, for incoming commands from gaming machines, by incrementing a relevant key ID based on category and key name.

34. The system of claim 33, wherein an application server sends a request to the browser manager to execute commands on one or more gaming machines, and wherein the browser manager validates the request, processes the request, sends corresponding commands to gaming machines, waits for a response from the gaming machines, builds a response to the application server, and sends back to the application server.

35. The system of claim 33, wherein the browser manager core service is enabled to receives message requests from S2S and G2S message queues, wherein the message requests include data.

36. The system of claim 35, wherein, in response to receiving message requests from S2S and G2S message queues, the browser manager core service validates the data, performs associated processing, and stores the data to a browser manager database, if required.

37. The system of claim 33, wherein each gaming machine displays dynamic content from third party application servers in a pre-defined layout in the lay area that includes a control panel page and a content page in browser frames, which is served from an Internet server.

38. The system of claim 33, wherein the browser manager GUI implements a smart client windows form, which can be viewed in the display area and enables managing applications, browser layouts, gaming machine summary, and reporting.

39. The system of claim 33, wherein the browser manager web service connects the browser manager GUI to browser manager core windows service to execute business functionality, database operations and enable the exchange messages using a communication protocols.

40. The system of claim 39, wherein the communication protocols include HTTP, XML, XSD, SOAP, and WSDL.

41. The system of claim 33, wherein the browser manager core service is the central point for processing the business logic of browser class messages.

42. The system of claim 33, wherein the browser manager core service is responsible for core functionality and execution of both incoming and outgoing messages from G2S and S2S server components.

43. The system of claim 42, wherein the browser manager core service is configured to:
- receive S2S and G2S incoming message queues, and after message receipt, processing the message and sending back reply message, if needed;
- convert incoming S2S or G2S messages to a browser manager message with respect to browser manager schema and processing the commands;
- validate incoming message data with the available data in a database and if any inconsistent data found, building and sending a negative acknowledgement response back to a S2S client;
- save S2S or G2S command data information that is determined to relevant tables in the database;
- log information messages and error messages to log file;
- log incoming and outgoing S2S and G2S messages to log files, wherein S2S messages are logged to a S2S message log file and G2S messages are logged to a G2S message log file, wherein a data table stores information about commands received, commands processed, commands sent to gaming machines, and responses received from gaming machines; and
- enable an ID provider class to generate the required new ID from ID provider data table by incrementing the relevant key id based on category and key name.

* * * * *